US008310128B2

(12) United States Patent
Ferreira et al.

(10) Patent No.: US 8,310,128 B2
(45) Date of Patent: Nov. 13, 2012

(54) HIGH PRECISION SILICON-ON-INSULATOR MEMS PARALLEL KINEMATIC STAGES

(75) Inventors: Placid M. Ferreira, Champaign, IL (US); Jingyan Dong, Apex, NC (US); Deepkishore Mukhopadhyay, Chicago, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 268 days.

(21) Appl. No.: 12/437,051

(22) Filed: May 7, 2009

(65) Prior Publication Data
US 2010/0001616 A1   Jan. 7, 2010

Related U.S. Application Data

(60) Provisional application No. 61/051,298, filed on May 7, 2008.

(51) Int. Cl.
 *H02N 1/00* (2006.01)
(52) U.S. Cl. ........................................................ 310/309
(58) Field of Classification Search .............. 310/300, 310/308, 309
See application file for complete search history.

(56) References Cited

U.S. PATENT DOCUMENTS

| 4,976,582 | A | 12/1990 | Clavel |
| 5,140,242 | A | 8/1992 | Doran et al. |
| 5,267,818 | A | 12/1993 | Marantette |
| 5,294,757 | A | 3/1994 | Skalski et al. |
| 5,321,217 | A | 6/1994 | Traktovenko et al. |
| 5,322,144 | A | 6/1994 | Skalski et al. |
| 5,501,893 | A | 3/1996 | Laermer et al. |
| 6,614,605 | B2 | 9/2003 | Auracher et al. |
| 6,624,548 | B1 | 9/2003 | Miller et al. |
| 6,675,671 | B1 * | 1/2004 | Jokiel et al. ............... 74/490.09 |
| 6,688,183 | B2 | 2/2004 | Awtar et al. |
| 6,734,598 | B2 * | 5/2004 | Shibaike et al. ............. 310/309 |
| 6,860,020 | B2 | 3/2005 | Pahk et al. |
| 7,196,454 | B2 | 3/2007 | Baur et al. |
| 7,239,107 | B1 * | 7/2007 | Ferreira et al. ............. 318/649 |
| 7,240,434 | B2 | 7/2007 | Lee et al. |
| 7,260,051 | B1 * | 8/2007 | Rust et al. ..................... 369/126 |
| 2002/0021480 | A1 | 2/2002 | Auracher et al. |

(Continued)

OTHER PUBLICATIONS

Tung, Y.C. et al, A Single-Layer Multiple Degree-of-Freedom PDMS-on-Silicon Dynamic Focus Micro-Lens, Jan. 2006, 19th International Conference on Micro Electro Mechanical Systems, pp. 838-841.*
Xu, Y. et al, Integrated Micro-Scanning Tunneling Microscope, Oct. 1995, Appl. Phys. Lett., vol. 67, pp. 2305-2307.*
Kim, Che-Heung et al, Micro XY-Stage Using Silicon on a Glass Substrate, Feb. 2002, Journal of Micromechanics and Microengineering, pp. 103-107.*

(Continued)

*Primary Examiner* — Quyen Leung
*Assistant Examiner* — Eric Johnson
(74) *Attorney, Agent, or Firm* — Greenlee Sullivan P.C.

(57) ABSTRACT

MEMS stages comprising a plurality of comb drive actuators provide micro and up to nano-positioning capability. Flexure hinges and folded springs that operably connect the actuator to a movable end stage provide independent motion from each of the actuators that minimizes unwanted off-axis displacement, particularly for three-dimensional movement of a cantilever. Also provided are methods for using and making MEMS stages. In an aspect, a process provides a unitary MEMS stage made from a silicon-on-insulator wafer that avoids any post-fabrication assembly steps. Further provided are various devices that incorporate any of the stages disclosed herein, such as devices requiring accurate positioning systems in applications including scanning probe microscopy, E-jet printing, near-field optic sensing, cell probing and material characterization.

16 Claims, 29 Drawing Sheets

U.S. PATENT DOCUMENTS

| | | | |
|---|---|---|---|
| 2004/0138766 | A1 | 7/2004 | Pahk et al. |
| 2004/0149067 | A1 | 8/2004 | Pahk et al. |
| 2005/0198844 | A1 | 9/2005 | Lee et al. |
| 2006/0245027 | A1* | 11/2006 | Epitaux .................. 359/290 |

OTHER PUBLICATIONS

Battiston et al. (2001) "A Chemical Sensor Based on a Microfabricated Cantilever Array with Simultaneous Resonance-Frequency and Bending Readout," *Sens. Actu. B* 77(1-2):122-131.

Binnig et al. (Jan. 15, 1982) "Tunneling Through a Controllable Vacuum Gap," *Appl. Phys. Lett.* 40(2):178-180.

Binnig et al. (Jul. 5, 1982) "Surface Studies by Scanning Tunneling Microscopy," *Phys. Rev. Lett.* 49(1):57-61.

Binnig et al. (Mar. 3, 1986) "Atomic Force Microscope," *Phys. Rev. Lett.* 56(9):930-933.

Bonev, I. (2001) "Delta Parallel Robot—The Story of Success," http://www.parallemic.org/Reviews/Review002.html.

Bullen et al. (2006) "Electrostatically Actuated Dip Pen Nanolithography Probe Arrays," *Sens. Actu A: Phys.* 125(2):504-511.

Chen et al. (Web Release Jan. 18, 2006) "Design of a Sic-Axis Micro-Scale Nanopositioner-µHexFlex," *Precision Engineering* 30(3):314-324.

Choi et al. (2001) "Electromagnetic Micro X-Y Stage with Very Thick Cu Coil for Probe-Based Mass Data Storage Device," *Proc. SPIE—Int. Soc. Opt. Eng.* 4334:363-371.

Dong et al. (2008) "A Novel Parallel Kinematics Mechanism for Integrated, Multi-Axis Nano-Positioning. Part 2: Dynamics, Control and Performance Analysis," *Precision Eng.* 32(1):20-33.

Dong et al. (2008) "Simultaneous Actuation and Displacement Sensing for Electrostatic Drives," *J. Micromech. Microeng.* 18(3):035011.

Dong et al. (2007) "Design, Fabrication and Testing of Silicon-on-Insulator (SOI) MEMS Parallel Kinematics XY Stage," *J. Micromech. Microeng.* 17(6):1154-1161.

Epitaux et al. (2005) "Micro-Machined XY Stage for Fiber Optics Module Alignment," *IEEE Conference on Optical Fiber Communication*, Anaheim, CA, United States, pp. 131-133.

Gu et al. (May 26, 2006) "Single-Wafer-Processed Nano-Positioning XY-Stages with Trench-Sidewall Micromachining Technology," *J. Micromech. Microeng.* 16:1349-1357.

Harness et al. (Mar. 2000) "Characteristic Modes of Electrostatic Comb-Drive X-Y Microactuators," *J. Micromech. Microeng.* 10(1):7-14.

Huang et al. (2004) "Micro NiTi-Si Cantilever with Three Stable Positions," *Sens. Actu. A: Phys.* 114(1):118-122.

Indermühle et al. (Mar.-Apr. 1995) "AFM Imaging with an XY-Micropositioner with Integrated Tip," *Sens. Acta. A Phys.* 47(4):562-565.

Indermuehle et al. (1994) "Design and Fabrication of an Overhanging XY-Microactuator with Integrated Tip for Scanning Surface Profiling," *Sens. Actu. A* 43:346-350.

Jaecklin et al. (Feb. 1992) "Novel Polysilicon Comb Actuators for XY-Stages," *Proc. IEEE Micro Electro Mech. Syst. Workshop* :147-149.

Kim et al. (Aug. 2003) "Silicon Micro XY-Stage with a Large Area Shuttle and No-Etching Holes for SPM-Based Data Storage," *IEEE J. Microelectromechanical Syst.* 12(4):470-478.

Kim et al. (Feb. 2002) "Micro XY-Stage Using Silicon on a Glass Substrate," *J. Micromech. Microeng.* 12(2):103-107.

Kim et al. (Oct. 1999) "Integration of a Micro Lens on a Micro XY-Stage," *Proc. SPIE Int. Soc. Opt. Eng.* 3892:109-117.

King et al. (Feb. 26, 2001) "Atomic Force Microscope Cantilevers for Combined Thermomechanical Data Writing and Reading," *Appl. Phys. Lett.* 78(9):1300-1302.

Lee et al. (2007) "A Piezoelectric Micro-Cantilever Biosensor Using the Mass-Micro-Balancing Technique with Self-Excitation," *Microsystems Technol.* 13:563-567.

Lee et al. (1996) "Self-Excited Piezoelectric Cantilever Oscillators," *Sens. Actu. A: Phys.* 52(1-3):41-45.

Lee et al. (Dec. 2000) "High-Speed Imaging by Electro-Magnetically Actuated Probe with Dual Spring," *J. Microelectromechanical Syst.* 9(4):419-4124.

Lee et al. (2000) "Single Crystal Silicon (SCS) XY-Stage Fabricated by DRIE and IR Alignment," *Proc. IEEE Micro Electro Mech. Syst. (MEMS)* :28-33.

Legtenberg et al. (Sep. 1996) "Comb-Drive Actuators for Large Displacements," *J. Micromech. Microeng.* 6(3):320-329.

Lia et al. (2005) "A Two Dimensional Self-Aligning System Driven by Shape Memory Alloy Actuators," *Opt. Laser. Technol.* 37:147-149.

Lu et al. (Jul. 2005) "Design, Fabrication and Control of a Micro X-Y Stage with Large Ultra-Thin Film Recoding Media Platform," *Proceedings of the 2005 IEEE/ASME International Conference on Advanced Intelligent Mechatronics* AIM 2005, pp. 19-24.

Marti, O. (1999) "AFM Instrumentation and Tips," In; *Handbook of Micro/Nanotechnology*, CRC Press pp. 81-144.

Meyer et al. (2003) "Force Microscopy," Ch.3, In; *Scanning Probe Microscopy: The Lab on a Tip*, Springer, 1st ed. pp. 45-95.

Mukhopadhyay et al. (2008) "A SOI MEMS-Based 3-DOF Planar Parallel-Kinematics Nanopositioning Stage," *Sens. Actu. A Phys.* 147(1):340-351.

Mukhopadhyay et al. (Jan. 2008) "Parallel Kinematic Mechanism Based Monolithic XY Micro-Positioning Stage," *SPIE Photonics West, MOEMS-MEMS Conference*, San Jose, California.

Park et al. (2005) "Fabrication of Microcantilever Sensors Actuated by Piezoelectric $Pb(Zr_{0.52}Ti_{0.48})O_3$ Thick Films and Determination of their Electromechanical Characteristics," *Adv. Funct. Mater.* 15(12):2021-2028.

Paros et al. (1965) "How to Design Flexure Hinges," *Machine Design* 37:151-156.

Piner et al. (Jan. 29, 1999) "Dip Pen Nanolithography," *Science* 283:661-663.

Quate, C.F. (1997) "Scanning Probes as a Lithography Tool for Nanostructures," *Surface Sci.* 386:259-264.

Sun et al. (Nov. 2002) "A Bulk Microfabricated Multi-Axis Capacitive Cellular Force Sensor Using Transverse Comb Drives," *J. Micromech. Microeng.* 12(6):832-840.

Sun et al. (Dec. 1, 2002) "A High-Aspect-Ratio Two-Axis Electrostatic Microactuator with Extended Travel Range," *Sens. Actu. A : Phys.* 102(1-2):49-60.

Takahashi et al. (Nov. 10, 2005) "A Two-Dimensional $f$-$\theta$ Micro Optical Lens Scanner with Electrostatic Comb-Drive XY-Stage," *IEICE Electronics Exp.* 2(21):542-547.

Takashi et al. (May 10, 2006) "A High Fill-Factor Comb-Driven XY-Stage with Topological Layer Switch Architecture," *IEICE Electron. Exp.* 3(9):197-202.

Vettiger et al. (May 2000) "The 'Millipede'—More than one Thousands Tips for Future AFM Data Storage," *IBM J. Res. Dev.* 44(3):323-340.

Wang et al. (Nov./Dec. 2004) "Thermally Actuated Probe Array for Parallel Dip-Pen Nanolithography," *J. Vac. Sci. Technol. B Microelectron. Nanometer Struct.* 22(6):2563-2567.

Wright et al. (1997) "A Large Force, Fully-Integrated MEMS Magnetic Actuator," *1997 International Conference on Solid-State Sensors and Actuators*, Chicago, Jun. 16-19.

Wu et al. (Mar. 2002) "An Electro-Thermally Driven Microactuator with Two Dimensional Motion," *Microsyst. Technol.* 8(1):47-50.

Yangmin et al. (Jul. 2006) "A Novel Design and Analysis of a 2-DOF Compliant Parallel Micromanipulator for Nano Manipulation," *IEEE Trans. Autom. Sci. Eng.* 3(3):248-253.

Yao et al. (Web Release Mar. 31, 2007) "A Novel Parallel-Kinematics Mechanism for Integrated, Multi-Axis Nano-Positioning. Part 1: Kinematics and Design for Fabrications," *Precision Eng.* 32(1):7-19.

Yao et al. (Web Release Sep. 26, 2006) "Design, Analysis, Fabrication and Testing of a Parallel-Kinematic Micropositioning XY Stage," *Int. J. Machine Tools Manufac.* 47(6):946-961.

Yao et al. (2005) "Development of a Novel Piezo-Derived Parallel-Kinematics Single Crystal Silicon Micropositioning XY Stage," *Proc. SPIE—Int. Soc. Opt. Eng. Smart Sens. Actu. MEMS II* 5836:56-66.

Yu et al. (Oct. 3, 2002) "Bulk Microfabricated Multi-Axis Capacitive Cellular Force Sensor Using Transverse Comb Drives," *J. Micromech. Microeng.* 12:832-840.

Zhang et al. (2003) "Advanced Fiber Optical Switched Using Deep RIE (DRIE) Fabrication ," *Sens. Actu. A* 102:286-295.

* cited by examiner

A

B

HIGH PRECISION SILICON-ON-INSULATOR MEMS PARALLEL KINEMATIC STAGES

CROSS-REFERENCE TO RELATED APPLICATIONS

This application claims the benefit of U.S. Provisional Application No. 61/051,298, filed May 7, 2008, herein incorporated by reference to the extent not inconsistent with the present disclosure.

STATEMENT REGARDING FEDERALLY SPONSORED RESEARCH OR DEVELOPMENT

This invention was made at least in part from the United States government through the National Science Foundation grant nos. 0328162 and 0422687. The U.S. government has certain rights in this invention.

BACKGROUND OF INVENTION

Disclosed herein are various micro electromechanical stage systems that provide flexible positioning with high precision that are readily manufactured using silicon-on-insulator processing techniques.

MEMS is the technology of the very small and are made up of components between 10 to 100 micrometers in size (i.e. 0.01 to 0.1 mm) and MEMS devices generally range in size from a 20 micrometers (20 millionth of a meter) to a millimeter (thousandth of a meter). MEMS include a central unit that processes data, the microprocessor and several components that interact with the outside. Due to MEMS' large surface area to volume ratio, surface effects such as electrostatics and wetting dominate volume effects such as inertia or thermal mass. MEMS are practical because they are fabricated using modified semiconductor fabrication technologies, normally used to make electronics. These include molding and plating, wet etching and dry etching (RIE and DRIE), electro discharge machining, and other technologies capable of manufacturing very small devices. MEMS technology can be implemented using a number of different materials such as silicon and different processing techniques. Silicon has significant advantages due to its material properties. In single crystal form, when silicon is flexed there is virtually no hysteresis and almost no energy dissipation. Silicon is also very reliable because it suffers very little fatigue and can have service lifetimes in the range of billions to trillions of cycles without breaking. Basic production techniques for producing silicon-based MEMS devices include deposition of material layers, patterning of layers by photolithography and/or etching to produce patterns and desired shapes.

MEMS and NEMS (nano-electromechanical systems) have been used in various positioning devices such as in microscopy, micro-assembly, nano-assembly and in probing, characterization, imaging, testing, manipulation and assembly. Accurate, reliable, and fast positioning can be critical in these applications. Provided herein are various positioning systems that achieve these goals that are also relatively straight-forward to produce and use.

SUMMARY OF THE INVENTION

Provided herein are micro and nano-positioning micro-electro-mechanical system (MEMS) stages and related methods such as fabrication processes for manufacturing the stages and methods of using the stages. MEMS XY stages deliver translational motion along the X and Y axes and optionally rotational motion around the Z axis. MEMS XYZ stages deliver translational motion along the X, Y and Z axis. These stages are driven by the force generated by an integrated electrostatic comb drive actuators and/or other actuators including, but not limited to, tilt-plate actuators. These MEMS stages are optionally manufactured on Silicon-on-Insulator (SOI) wafers using a combination of micro-fabrication technologies. Optionally, force, position, velocity and acceleration are sensed by using the same or other sets of electrostatic comb drive actuators.

These MEMS stages have high bandwidth, large motion ranges and up to nanometer-scale resolutions. The stages are useful in many different applications such as within a platform for micro or nano-manipulation and various manufacturing systems such as high speed, compact, high precision and accurate positioning systems in scanning probe microscopy, E-jet-printing, near-field optic sensing, cell probing, material characterization, to name a few. In an aspect, higher scan rates may be achieved by reducing the scan area and range-of-motion. For example, for applications related to video imaging requiring relatively high scan frequency, on the order of kHz to MHz, the range of motion of the end-effector, and more specifically a cantilever connected to the end effector, may be decreased from the order of tens of microns (e.g., about 20 μm) to the order of microns (e.g., about 5 μm).

The MEMS stage is driven by the force generated by a linear comb drive actuator or a plurality of linear comb drive actuators. In an aspect, the MEMS stage is used in a sensing or data acquisition device. In these embodiments, at least one linear comb drives senses a physical parameter, such as a physical force due to a force generated by a plurality of linear comb drives, a position due to the force generated by the plurality of linear comb drives, a velocity due to the force generated by the plurality of linear comb drives, acceleration due to the force generated by the plurality of linear comb drives. In an embodiment, the sensing actuator is different than the force-generating actuator. In an embodiment, the sensing actuator is the force-generating actuator.

In an aspect, the MEMS stage provides controlled positioning over an XY plane. In an aspect, the MEMS stage provides controlled positioning over the Z axis, such as by positioning a cantilever-type probe. The Z-direction positioning is accomplished by any means known in the art. In one aspect, the Z-direction positioning is by a tilt-plate actuator that provides controllable Z-positioning of a cantilever tip. The tilt plate actuator may comprise a parallel plate capacitor or electrode that is positioned underneath the cantilever or a portion thereof. In this configuration, the Z-positioning may be relatively rapid, such as at frequencies greater than 1500 Hz, greater than about 6000 Hz and less than about 20 kHz. Such frequencies provide the capacity for video image acquisition, such as video imaging of AFM, for example. In an aspect, the MEMS stage provides controlled positioning of an angular position relative to the Z axis. In an aspect, the MEMS stage provides controlled positioning over an XY plane and rotational motion around a corresponding Z axis.

In an embodiment, the plurality of four bar linkage mechanisms restricts all rotational degree of freedom of said end effector. In an aspect the direction of force application or end effector motion is uncoupled from the direction of force application or end effector motion associated with the other actuator. For example, motion in the X-axis direction is uncoupled from motion the Y-direction axis. "Uncoupled" refers to unwanted movement that is not statistically different from zero as measured by optical microscopy having a 1 μm resolution over the complete range of motion.

Any of the MEMS stages may use an actuator that is a linear comb actuator, a rotary comb drive actuator, or both.

In an embodiment, the invention is a method for positioning an element of the end effector, such as the tip of a probe arm that is connected to the end effector. Such probes are useful in manipulation, positioning and testing. For example, a cantilever type tip can be incorporated into a probe that measures hardness, durability, or as a scribe used in printing. In an embodiment, the invention is a method of testing a physical parameter of a material. For example, the material may be a biological component such as a cell having a physical parameter with an unknown value that a user of the system desires to measure. For example, the material property may be one or more of stiffness, force tension, elasticity, hardness, etc. Providing a plurality of stages facilitates these measurements such as by reliably positioning a probe arm relative to the material, reliably exerting a force on the material, and reliably detecting the physical parameter with one or more MEMS stages used for sensing, detecting or otherwise measuring the physical parameter or a property from which the physical parameter is calculated. Controllably positioning the end effector has many different applications including, but not limited to, probes, cantilevers, nozzles, grippers, holders and positioners.

In an embodiment, provided herein is a MEMS stage comprising an end effector, a plurality of rotary comb drives actuators for translating the end effector in a first direction, wherein the plurality of rotary comb drive actuators are mechanically connected to the end effector, a plurality of rotary comb drive actuators for translating the end effector in a second direction, wherein the plurality of rotary comb drive actuators are mechanically connected to the end effector, a plurality of flexure hinges, wherein the plurality of flexure hinges is mechanically connected to the end effector; and a plurality of four bar linkage mechanisms, wherein the plurality of four bar linkage mechanisms is mechanically connected to the plurality of flexure hinges. In an aspect, the plurality of rotary comb drives for actuation is mechanically connected to the plurality of flexure hinges.

Any of the MEMS stage further comprise a plurality of rotary comb drive actuators for translating the end effector in a third direction, wherein the plurality of rotary comb drive actuators are mechanically connected to the end effector. As used herein, each of the three directions is optionally orthogonal to each other. In an embodiment, the three directions are not orthogonal, but provide for controllable spatial positioning (e.g., in one, two or three-dimensions).

Optionally, any of the MEMS stage further comprise a plurality of rotary comb drives for sensing. In an embodiment, the plurality of four bar linkage mechanisms delivers translational motion of the end effector.

In an embodiment, the invention is a method of making any of the MEMS stages disclosed herein. For example, by manufacturing the MEMS stage using micro fabrication techniques as known in the art.

In another embodiment, the invention provides methods for fabricating a MEMS stage, such as by dicing a silicon on insulator wafer into square dies, wherein the silicon on insulator wafer contains a thick device layer on top of a buried oxide layer and the silicon on insulator wafer contains an underlying handle layer. A pattern is fabricated on a device layer to provide the electrical connections to the device in the form of electrical contact pads, wherein the electrical contact pads are patterned and the electrical contact pads are composed of gold on top of a chrome layer. The device layer aligned with the pad layer is patterned to serve as a deep reactive ion etching mask for etching the device layer, wherein the device pattern is transferred from photo resist to an aluminum film by sputtering and lifting off aluminum from a praseodymium patterned substrate.

Any of the methods provided herein optionally further comprise protecting the device layer by spin coating and hard baking of a thin layer of photoresist, flipping over the die, aligning the backside layer pattern with the device layer pattern, using deep reactive ion etching process to remove the handle layer from the back of the device exposing the device, removing the buried oxide layer, using deep reactive ion etching process to etch the stage pattern through the device layer, and removing the aluminum.

In an aspect, the method further comprises removing the sputtered metal from the areas other than the electrical contact pads, patterning the device layer, patterning the handle layer, wherein the handle layer is etched in deep reactive ion etching process to remove exposed silicon, releasing a stage mechanism by etching the device side in deep reactive ion etching process and removing the aluminum.

DETAILED DESCRIPTION OF THE INVENTION

Figure 1:
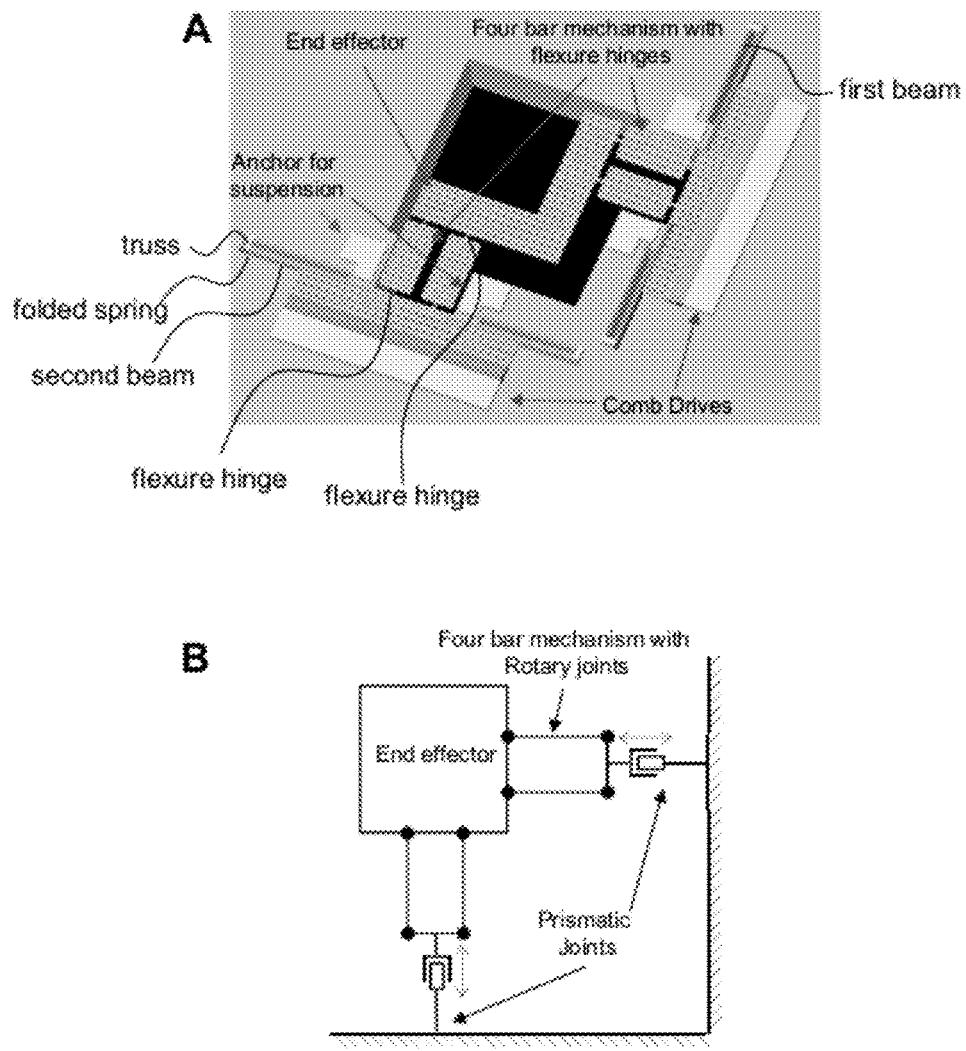
FIG. 1. Schematic diagram of parallel kinematics XY stage (A) and its kinematics model (B).

As used herein, "opposed configuration" refers to the positioning of at least two elements relative to each other and a material in a manner that facilitates reliable contact between each of the elements and the material. For example, a pair of end effectors that are on either side of a material, in an opposite configuration, are understood to be in an opposed configuration. Elements that are not directly opposite are considered to be in an opposed configuration so long as reliable contact is maintained over at least a portion of the range of motion of one of the end effectors.

"Material" is used broadly herein and refers to a biologic or non-biologic material. For example, the biologic material includes an isolated cell, an individual cell within a population of cells, tissue, or extracellular component. The biological material may be isolated and purified, isolated, in situ or in vitro, for example. Similarly, the material may be not of biologic origin, but rather artificially made.

"Senses" refers to the detection of a property in the system. Optionally, the sensing is output to a data acquisition system for either real-time analysis or post-processing analysis. The output data may be directly related to a physical parameter of the system (e.g. displacement) or may be used to calculate the physical parameter of interest.

"Mechanically connected" refers to a first element that is connected to a second element in a manner that the movement of one element results in movement on the second element. Accordingly, two elements that are mechanically connected need not be in direct contact with each other, but may be connected via one or more intervening elements. For example, an actuator may be mechanically connected to an end effector so that movement of the actuator can cause end effector movement, but flexure hinges and bar linkage mechanisms may be positioned between the actuator and the end effector.

"Operably connected" refers to a connection between two different elements that preserves the functionality of each element. For example, a beam of a spring that is operably connected to a flexure hinge refers to a connection that preserves the functionality of both the spring and the flexure hinge, to provide decoupled translational motion of an end effector in a single direction. In an aspect, operably connected elements are directly connected to each other. In an aspect, operably connected elements may have one or more intervening element disposed therebetween. In an aspect, two elements that are operably connected need not be in physical contact, such as a tilt plate actuator that deflects a cantilever by application of an electrical potential between the electrode of the tilt plate actuator and a counter electrode that is adjacent or integrated with the cantilever plate.

Example 1

Design, Fabrication and Testing of a Silicon-on-Insulator (SOI) MEMS Parallel Kinematics XY Stage This example presents the design, kinematics, fabrication and characterization of a monolithic micro positioning two degree-of-freedom translational (XY) stage. The design of the MEMS (Micro-Electro-Mechanical Systems) stage is based on a parallel kinematics mechanism (PKM). The stage is fabricated on a Silicon-On-Insulator (SOI) substrate. The PKM design decouples the motion in the XY directions. The design restricts rotations in the XY plane while allowing for an increased motion range and produces linear kinematics in the operating region (or workspace) of the stage. The trusslike structure of the PKM also results in increased stiffness by reducing the mass of the stage. The stage is fabricated on a SOI wafer using surface micromachining and deep reactive ion etching (DRIE) process. Two sets of electrostatic linear comb drives are used to actuate the stage mechanism in X and Y directions. The fabricated stage provides a motion range of more than 15 microns in each direction at the driving voltage of 45V. The resonant frequency of the stage under atmospheric conditions is 960 Hz. A high Q factor (~100) is achieved from this parallel kinematics mechanism design.

Silicon based micro positioning stages play an important role in micro/nano manipulation and probe technology. By providing controlled displacement in one or two degree-of-freedom these manipulators have been used in many applications, such as fiber optical switches [1], micro-force sensors

[2,3], actuators for scanning probe microscopy [4, 5], data storage [6-8], micro optical lens scanners [9-12]. For such micro positioning systems, size, motion range, natural frequency and cross-coupling of motion between different degrees of freedom are important characteristics that define the stage's performance and have been the focus of interest for a number of research activities.

Different technologies have been used to provide actuation to silicon based MEMS micro positioning systems, including piezoelectric-actuators [13], shape memory alloy actuators [14], electromagnetic actuators [7], electro-thermal actuator [15], and electrostatic comb-drive actuators [1-6, 8-12, 16-20]. Among these actuation technologies, electrostatic comb-drive actuators are most commonly used because of their simplicity and the ease with which their fabrication is integrated with that of the rest of the structure. Unlike the other actuation technologies, electrostatic actuators avoid extra processing steps and additional materials, such as shape memory alloys, piezoelectric film/actuators, or magnets/coils.

Many single degree-of-freedom (DOF) micro manipulators using electrostatic comb-drive actuators include two interdigitated comb structures. The fixed comb is the stator and the other, rotor, is anchored to the substrate by a compliant suspension structure. The voltage across the comb fingers generates electrostatic force that deforms the suspending spring and produces displacement in the desired direction. Comb-drive actuators are a good fit for single degree-of-freedom micro positioners. However, designing and fabricating a well-constrained, kinematically decoupled multi-axis micro positioning stage is not trivial. Previous research efforts include incorporating comb actuators along the X and Y directions that are directly connected to the moving table to generate X and Y displacement [2, 3]. In this approach the motion range is limited by the gap between orthogonal comb digits. Consequently a relatively small workspace can be achieved and side instability due to the gap change between interdigitated comb fingers can be a serious problem. The widely-used XY stage design [16-18, 5-6, 8, 10] include four identical comb actuators placed around the end effector, each perpendicular to its neighbor. The end effector is connected to the comb actuators by long slender beams. When the stage is actuated in the X direction, the long beam along the Y direction acts as a leaf spring to accommodate the motion of the Y axis and vice versa. The cross-talk between the axes is decreased by reducing the stiffness of these beams. However the reductions in stiffness of the beams lead to non-deterministic motions along with undesirable end-effector rotations in the XY plane. Additionally reduced stiffness leads to lower resonant frequencies and complex dynamics [19] with multiple modes in a fairly narrow frequency band. Besides the above designs, a serial kinematic design is introduced by [11, 12]. This design realizes two degree-of-freedom by the serial conjugation of two single DOF systems. In their design, the inner axis is embedded into the moving part of the outer axis. The actuation of the outer stage/axis moves the entire inner stage with the actuator of the inner stage producing a motion in a direction orthogonal to that produced by the outer stage. Thus, the end-effector of the inner stage can be moved in both, the X and Y directions. The disadvantage of this design is that inertial load of the outer axis is significantly larger than that of the inner axis, causing a decrease the natural frequency as well as response time of the outer axis. Additionally, electrical isolation can be a problem.

Parallel kinematic mechanisms, which have been widely used for macro and meso scale positioning systems [13, 20-22], can be designed so as to be better suited for silicon based micro positioners. A Parallel Kinematic Mechanism (PKM) consists of a fixed base and movable end-effector connected in parallel by multiple independent kinematic chains. Normally, the DOF at the end-effector is determined by the number of independent kinematic chains. Each kinematic chain actuates the end effector in one direction and accommodates or admits displacements along the other DOFs of the end-effector. Together, all the chains restrict the undesired motions (for example, rotations for a translational stage). In this way, a mechanism is realized in which the desired DOFs are spanned by the actuators and the undesired DOFs are restricted by the interaction of the kinematic chains. Parallel kinematic mechanisms generally produce high structural stiffness because of their truss-like structures resulting in fast response times. Furthermore, if appropriately designed, PKMs can result in configurations where near complete decoupling of the actuation is achieved. PKMs are criticized for small workspaces because the motion range of a PKM is restricted to the intersection of the motion range of all its kinematic chains. This is a valid criticism for macro-scale systems, where the kinematic joints and actuators have large permissible motion ranges that are largely overlapping. However for stages built by MEMS processes, the motion range of the stage is more likely to be governed by the limits of the actuators and flexure joints than the mechanism itself.

In this example, a parallel kinematic flexure based SOI-MEMS stage is designed and fabricated. The general-purpose stage can be incorporated in probe stations or systems, TEM specimen holders, direct-write manufacturing processes, material testers, biological cell and tissue testers, and sensors. "Direct write manufacturing systems" refers to nozzle-based systems that reliably eject a material in a desired spatial pattern, such as electrohydrodynamic jet writing, ink-jet writing, etc. "Probe system" refers to devices that reliably interact with a material to test a desired property, including materials that are for electronics or are biologically-based. A "material tester" is used broadly to refer to a device that determines one or more physical parameters of a material, such as tensile strength, bi-axial testing, mechanical impedance, or any other physical parameter of interest. Two kinematics chains connect the base to the end-effector in parallel. Each kinematics chain includes an actuated prismatic joint connected to the base at one end and a parallelogram 4-bar mechanism at the other. The 4-bar, in turn, is connected to the end-effector or the table. The two kinematic chains are positioned such that their actuated prismatic joints are orthogonal to each other, thus spanning the XY plane. The kinematic scheme is similar to that published in [21, 22]. Each chain allows only planar translation with actuation in a single direction. Thus together, the actuation in the chains span the plane as does the intersection of their degrees-of-freedom. Linear comb actuators are used to drive these prismatic joints. The device is fabricated on a silicon-on-isolator (SOI) die with a 50 µm thick device layer and a 2 µm thick buried oxide (BOX) layer. The high aspect-ratio structure of interdigitated comb fingers necessitates fabrication by deep reactive ion etching (DRIE). The handle layer beneath the end-effector is etched away. This increases the device yield by simplifying the BOX layer etch and eliminating the problematic stiction issues. Additionally, this enables the stage to be used in applications that require access to the positioning platform for both, the top and bottom, e.g., TEM specimen holders and transmission near field scanning optical microscopy. The fabricated stage provides a motion range of more than 15 microns in each direction at the driving voltage of 45V. The resonant frequency of the stage under atmospheric conditions is 960 Hz. A high Q factor (~100) is achieved from this parallel kinematics mechanism stage.

Parallel kinematic XY stage design and analysis: FIG. 1 illustrates the design of the parallel kinematic micro positioning XY stage. In this parallel kinematic mechanism design, there are two independent kinematics chains that connect the end effector to the base (stator). Each of these kinematic chains includes two serially-connected degrees of freedom, pure translation due to the prismatic joint and the other translation along a circular path due to the parallelogram 4-bar linkage system. The orientation of the two chains is such that the prismatic joints are perpendicular to each other, kinematically decoupling the two actuated joints to the maximum extent possible. Due to the symmetric configuration of kinematic chains, the stage has the same stiffness and bandwidth along any direction in the XY plane. The parallelogram 4-bar linkages restrict all rotational degree-of-freedom of the end-effector. A parallelogram four-bar mechanism has equal lengths for its crank and follower and maintains parallelism between the connector and its base. Thus, in spite of the rotation of the overall joint (the crank and the follower), the connector undergoes pure translation along a circular path. In FIG. 1, it can be seen that two perpendicular edges of the end-effector are the connectors of the 4-bars linkages in the two kinematic chains. Therefore, the orientation of the end-effector remains fixed. When the stage is actuated in the X direction by the prismatic joint of one chain, the resulting motion of the end-effector is accommodated by the other kinematic chain by an angular displacement at the parallelogram 4-bar mechanism and vice versa for actuation in the Y direction. To minimize the loss of motion transmitted from the actuator to the end-effector, the nominal configuration of the system is chosen so that the instantaneous displacement vector of the connector of the 4-bar link in a kinematic chain is orthogonal to the displacement of the actuator in that chain and parallel to that of the actuator in the other chain.

The relationship between actuation displacement, which is linear displacement of two prismatic joints, and the displacement of the stage, has been studied in [22]. A diagonal Jacobian matrix (Equation 3) can be proven following the procedure shown in [22].

$$\begin{bmatrix} \Delta d_x \\ \Delta d_y \end{bmatrix} = \begin{bmatrix} -1 & 0 \\ 0 & 1 \end{bmatrix} \begin{bmatrix} \Delta x \\ \Delta y \end{bmatrix} \text{ and } \begin{bmatrix} \Delta x \\ \Delta y \end{bmatrix} = \begin{bmatrix} -1 & 0 \\ 0 & 1 \end{bmatrix} \begin{bmatrix} \Delta d_x \\ \Delta d_y \end{bmatrix}. \quad (3)$$

The diagonal Jacobian matrix suggests that around the nominal point, when the actuators or table undergo a small displacement relative to the overall dimensions of the stage (which is just the case for MEMS systems), the motion in X and Y direction is decoupled. The effect of crosstalk between different axes (at the first order of approximation) is minimized.

Figure 2:
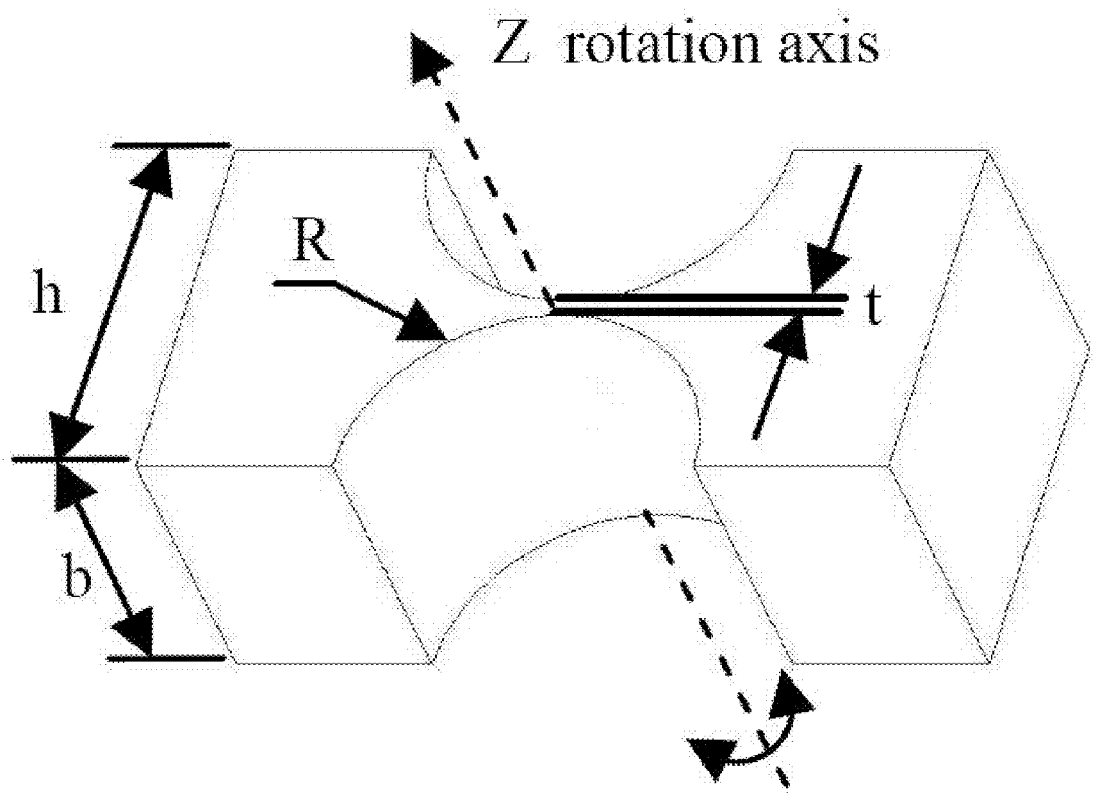
FIG. 2. A single-axis flexure hinge.

Actuator and structural design: To implement this parallel kinematics mechanism with silicon micromachining technology, the two prismatic joints are replaced by two linear comb drives and the rotary/pivot joints around four bar mechanism are implemented by flexure hinges. FIG. 2 demonstrates a schematic of a flexure hinge. Its angular compliance, $C_z$ can be calculated using the Paros and Weisbrod formula [2]:

$$C_z = \frac{\alpha_z}{M_z} = \frac{3}{2EbR^2} \left[ \frac{1}{2\beta + \beta^2} \right] \times \quad (4)$$

-continued $$\left\{ \left[ \frac{1+\beta}{\gamma^2} + \frac{3+2\beta+\beta^2}{\gamma \cdot (2\beta+\beta^2)} \right] \cdot \left[ \sqrt{1-(1+\beta-\gamma)^2} \right] + \left[ \frac{6 \cdot (1+\beta)}{(2\beta+\beta^2)^{3/2}} \right] \cdot \left[ \tan^{-1} \left( \sqrt{\frac{2+\beta}{\beta}} \times \frac{(\gamma-\beta)}{\sqrt{1-(1+\beta-\gamma)^2}} \right) \right] \right\}$$

where $\beta=t/2R$; $\gamma=h/2R$; E is the Young's Modulus of the material of flexure hinge; $\alpha_z$ is the angular deformation of the hinge about Z-axis in radians and $M_z$ is the external bending torque applied to the hinge. The maximum bending torque that can be applied to a flexure hinge is:

$$M_{max} = \frac{2\sigma_p I_{min}}{t} \quad (5)$$

where $I_{min}=bt^3/12$ is the moment of inertia of the flexure hinge about the rotation axis; $\sigma_p$, or the stress limit, is the fracture strength of a brittle material. Thus, the rotational range limit for a flexure hinge is given by:

$$\alpha_{max}=M_{max}C_z \quad (6)$$

For the flexure hinges used in this example, we have hinge thickness t=6 μm, R=300 μm, h=70 μm and b=50 μm. The Young's Modulus of single crystal silicon is about 170 GPa and its elastic limit is about 7,000 MPa. Therefore the stiffness and maximum rotation range of our hinges are 3.1e$^{-6}$ N-m/radians and 0.68 radians respectively. The length of the four-bar structure is 1 mm, which indicates a maximum 630 μm displacement of the mechanical structure. Factors such as the suspension structure and the limited actuating forces prevent us from reaching this limit.

Figure 3:
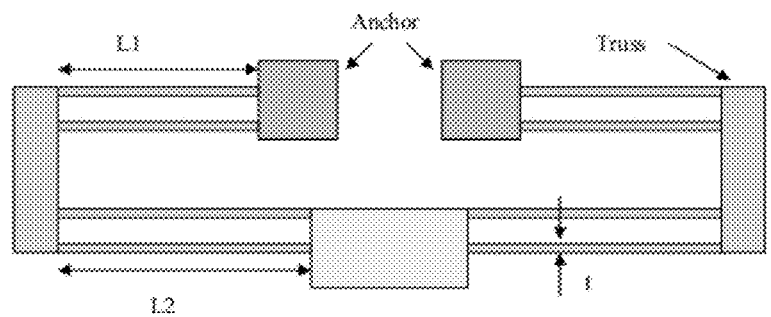
FIG. 3. Folded spring based suspension for linear comb drives.

The suspension structure is an important part of linear electrostatic comb drive actuator. Generally the suspension structure is required to have a large compliance in the actuation direction for possibly large displacements, and a high stiffness in the lateral direction so as to prevent side instabilities. In our design, a folded spring shown in FIG. 3 is used to support the rotor as well as the table. From the beam deflection theory [23], the stiffness of a clamped-clamped beam in the motion direction, $k_d$ and lateral direction, $k_l$ can be expressed as following.

$$k_d=2Eht^3/L^3, \quad k_l=2Eht/L \quad (7)$$

where E is the Young's modulus, h is the height of the beam, t is the width and L is the length of the beam.

For the folded spring used in our design, we have two clamped-clamped beams in series. The first one is from the anchors to the truss (top) and the second one is from truss to rotor (bottom). The stiffnesses of these two springs are $k_1=4Eht^3/L_1^3$, $k_2=4Eht^3/L_2^3$. The overall stiffness of this folded spring is $$k_d = \frac{k_{d1}k_{d2}}{k_{d1}+k_{d2}} = 4Eht^3/(L_1^3+L_2^3) \text{ and}$$

$$k_l = \frac{k_{l1}k_{l2}}{k_{l1}+k_{l2}} = 4Eht/(L_1+L_2).$$

The stiffness ratio $$\frac{k_l}{k_d}$$

is equal to $(L_1^3+L_2^3)/(L_1+L_2)t^2$. In our design, considering the size of the structure and the compliance in the actuating direction, $L_1$ is chosen to be 1.375 mm and $L_2$ is 1.8 mm, t is 8 μm and h is 50 μm. Thus we get stiffness in the displacement direction as $k_d$=2 N/m resulting in the stiffness ratio of $$\frac{k_l}{k_d} = 41494.$$

The comb drive actuator must provide enough force to overcome the stiffness from folded spring and flexure hinges. The force provided by a linear comb actuator is given in equation 8.

$$F = n\frac{\varepsilon_0 hV^2}{g} \quad (8)$$

where n is the number of fingers, h is the height of finger, g is the gap between two neighboring fingers. Our comb design has 150 pair of fingers with a 3 μm gap and 50 μm heights. It can thus generate a force of 5.5E-5 Newton at 50 V.

FEA structural analysis: To verify the design from the previous section, a finite element analysis (FEA) simulation is used to study the stiffness of the structure and to estimate the natural frequency and mode shapes of the designed system. A 3D model is generated by AutoCAD and processed with Comsol®. Due to node and memory limitations of the available FEA simulation software, the truss like structure of the moving parts of the stage is replaced by a solid geometry. To compensate for the extra mass introduced by this approximation, the material density of the moving parts is scaled down appropriately.

Figure 4:
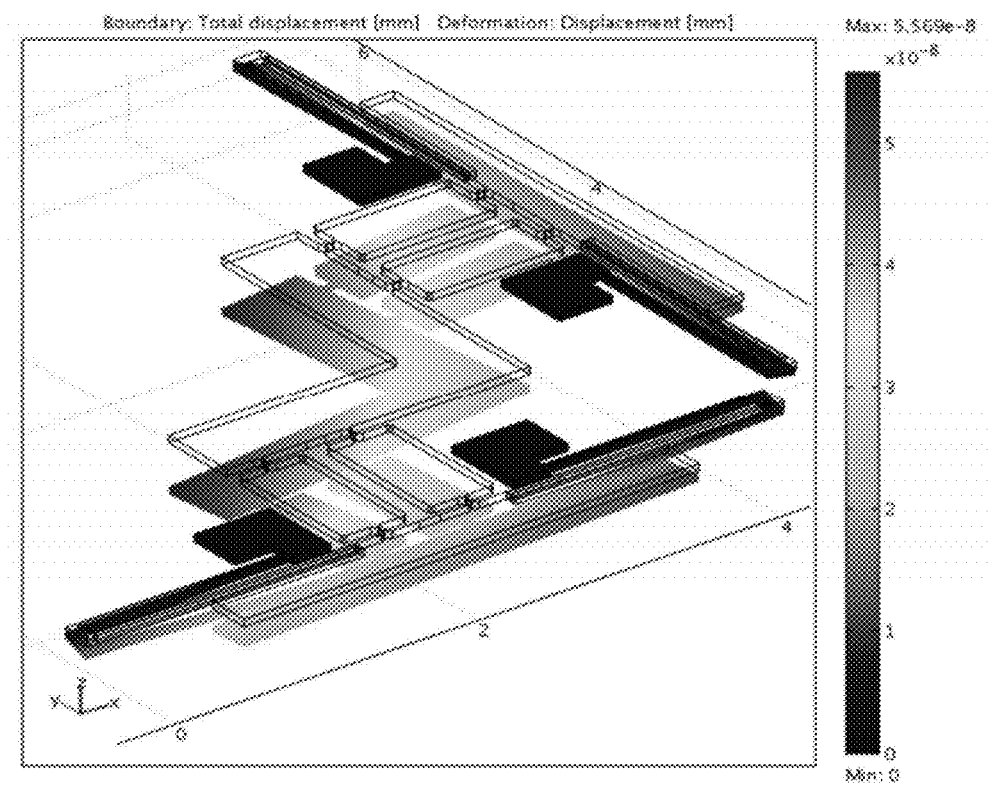
FIG. 4. Stage sagging due to self-weight.

Downward or out-of-plane sagging of the stage can cause problems in many applications. It can lead to the twisting of the leaf springs and misalignment between the comb fingers. Furthermore it may affect the orientation of the stage and lead to additional stresses at the hinges. In this design (see FIG. 1) two long suspending structures are used to support of the whole stage. Thus it is necessary to check the self-sagging of the stage through FEA. A surface load corresponding to the weight of the structure is applied to all the top surface of the device including comb actuators and their flexures, thus it is equivalent to the real gravity load. The FEA result is shown in FIG. 4. The simulation suggests that the maximum sagging of the structure (at the edge of the table) is only 0.05 nm. Compared with the overall dimension of the end-effector (2 mm), the sagging effect is negligible.

Figure 5:
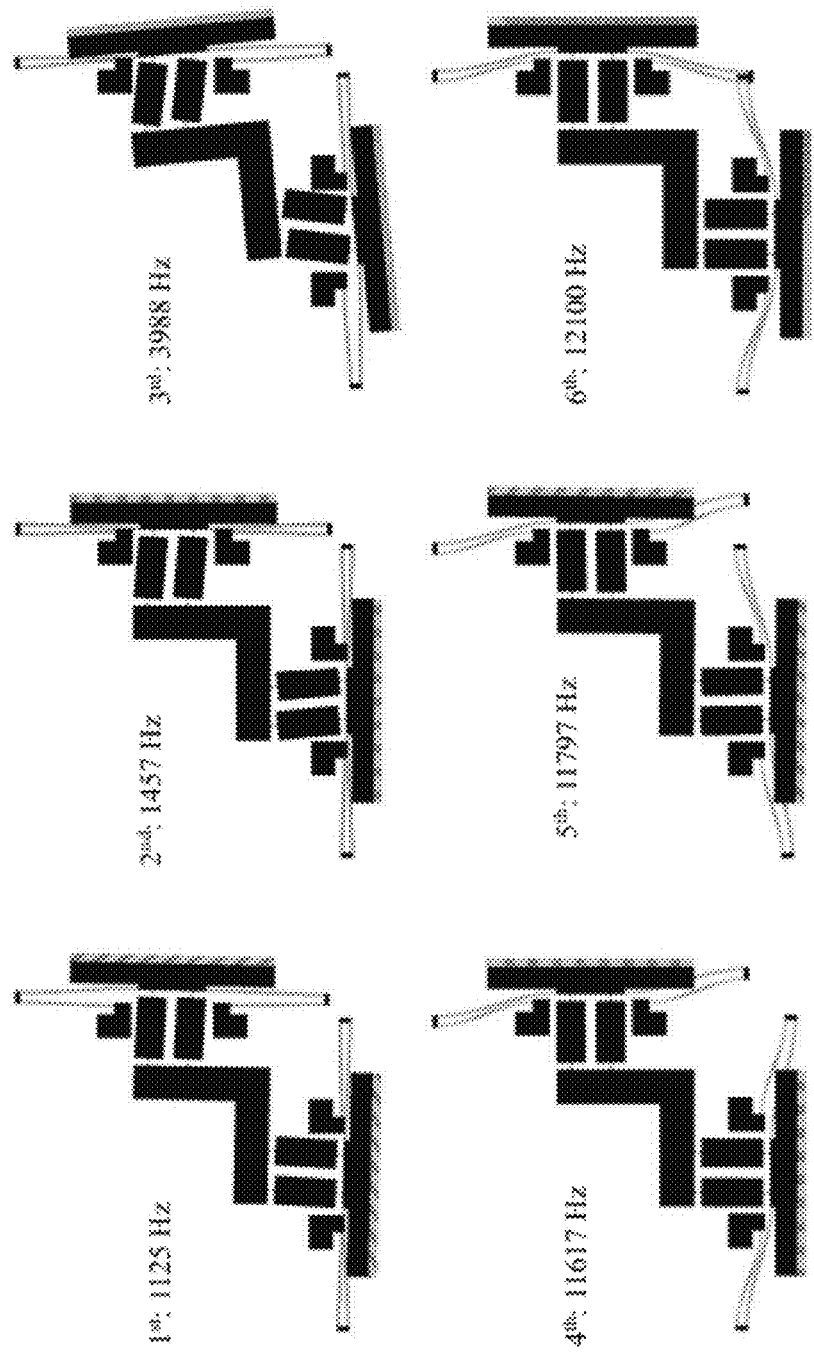
FIG. 5. Modal shapes and their corresponding natural frequencies (without damping conditions).

The natural frequency and mode shapes of the stage are also analyzed by FEA. FIG. 5 shows the six most dominant mode shapes for the system. Amongst these modes, the first three modes are related to the displacement of the end effector and the last three modes related to that of the folded springs. Due to the parallel kinematics design, a relative high natural frequency is achieved and dominant modal directions are the translational DOF in XY plane. From FIG. 5, it can be seen that mode 3 is a rotational mode. The first two modes are the translational modes. Mode 1 has the leaf spring deformations in anti-phase, while mode 2 has them in phase. While mode 2 produces a pure translation mode, the first mode is predominantly translational motion. Because of asymmetry in the load when leaf-springs are deflected in opposite directions, a relatively small component of rotation is seen in this mode. To reduce the parasitic rotation of the 1st mode, an effective way is to increase the distance between the pairs of flexures with the same length, so as to increase the guiding stiffness against in-plane, which will be improved by our future design.

Figure 6:
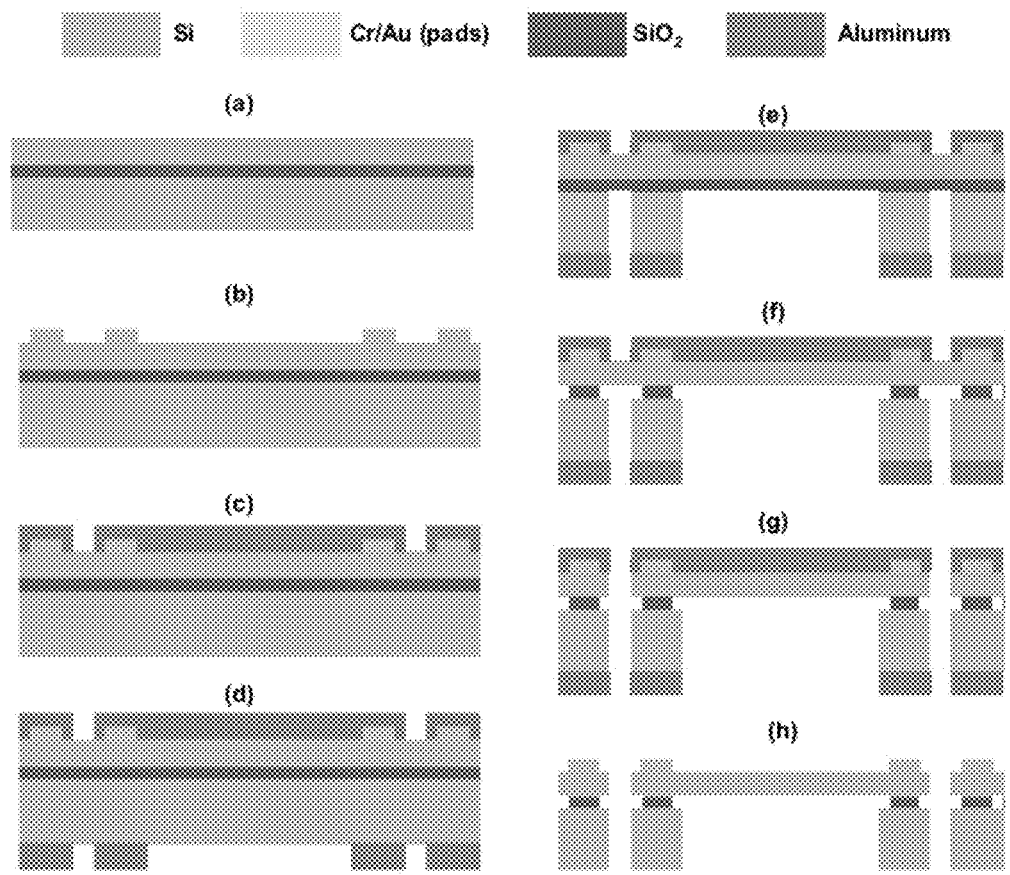
FIG. 6. Fabrication Sequences. (a) Starting from a SOI substrate; (b) Electrical Conduction Pad layer patterning; (c) Device layer (Stage) patterning; (d) Handle layer patterning; (e) Handle layer through etching by using the Bosch process [24] (DRIE); (f) Removal of the Box layer using HF (49%); (g) Device layer DRIE etching; (h) Al etch mask removal.

Fabrication: The fabrication process for the parallel kinematics micro positioning XY stage is depicted in FIG. 6. The process includes three patterning and two DRIE etching steps. The starting substrate is 100 mm silicon-on-insulator (SOI) wafer with a 50 μm thick device layer on top of a 2 μm buried oxide (BOX) layer. The underlying handle layer for the SOI wafer is 500 μm thick. The wafer is diced into square dies each measuring 15 mm on a side. The first step is to fabricate a pattern on the device layer to provide the electrical connections to the device in the form of electrical contact pads. Electrical pads, that are patterned by photolithography followed by sputtering and lift-off, are composed of 392 nm of gold on top of 8.5 nm thick chrome layer. The next step is to pattern the device layer aligned with the pad layer to serve as a DRIE mask for etching the device layer. The device pattern is transferred from photo resist (AZ1518) to a 60 nm thick aluminum film by sputtering and lifting off Al from PR patterned substrate. Al is the preferred material for this film as it acts as a good DRIE mask for a deep etch, helps to achieve a straight side-wall profile and to control the over etching in DRIE process. The device layer is then protected by spin coating and hard baking a thin layer of photoresist (5 μm thick AZ1518) for the following fabrication steps. The die is flipped over and the backside layer pattern is aligned with the device layer pattern. This backside layer is also comprised of 60 nm thick Al film.

Figure 7:
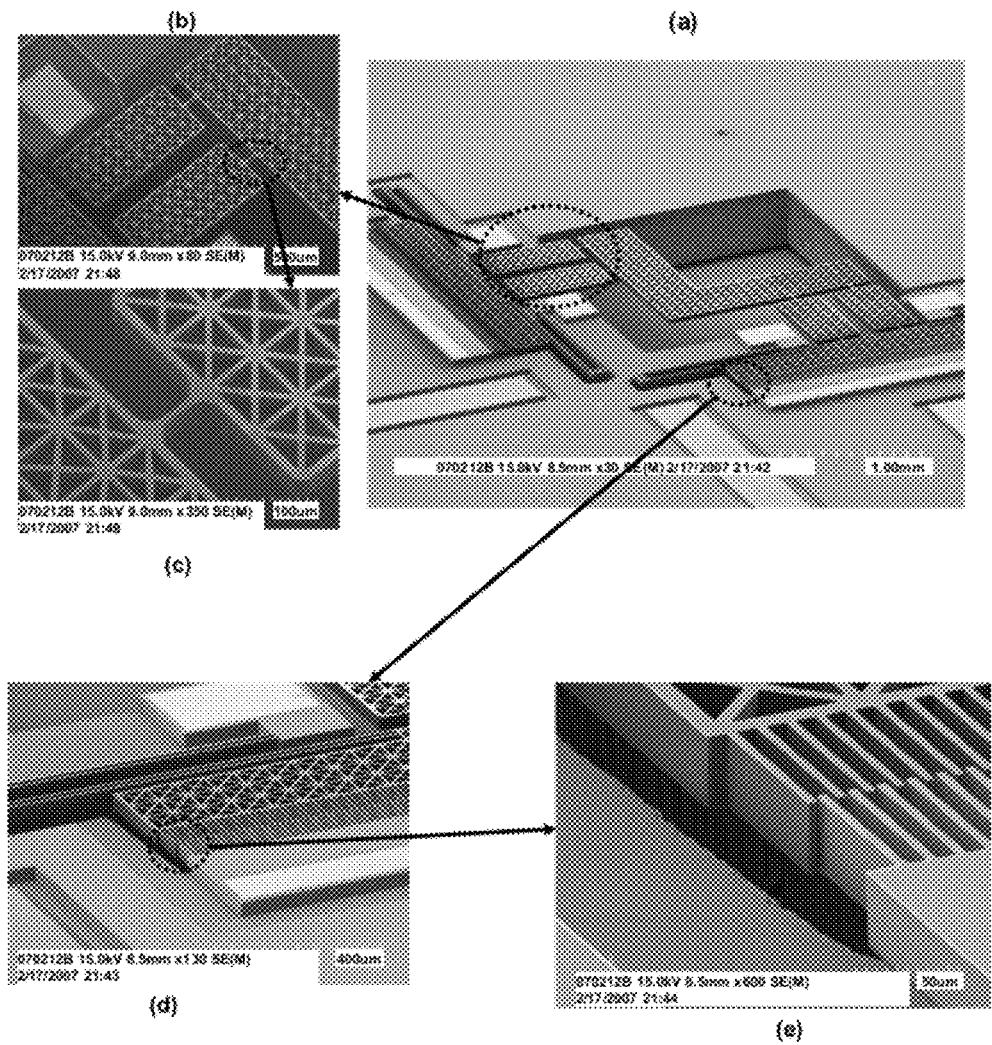
FIG. 7. Fabricated PKM micro positioning XY stage. (a) Overall structure. (b) Four bar linkage mechanism with flexure hinges. (c) A flexure hinge. (d, e) Comb actuator and fingers.

Next, the DRIE Bosch process [24] is used to remove the handle layer from the back of the device so as to expose the device for our application. The BOX layer was subsequently removed by using Buffered HF acid. The sequence of this releasing step is crucial; otherwise the residual stresses from the silicon dioxide film may destroy the device when the device is being fabricated in DRIE process. After removing BOX layer, the device layer of the die is subjected to the Bosch process for a second time to etch the stage pattern through the device layer. Finally, the Al films that served as masks for the Bosch process are removed by using aluminum etchant. The fabricated device is shown in FIG. 7.

Figure 8:
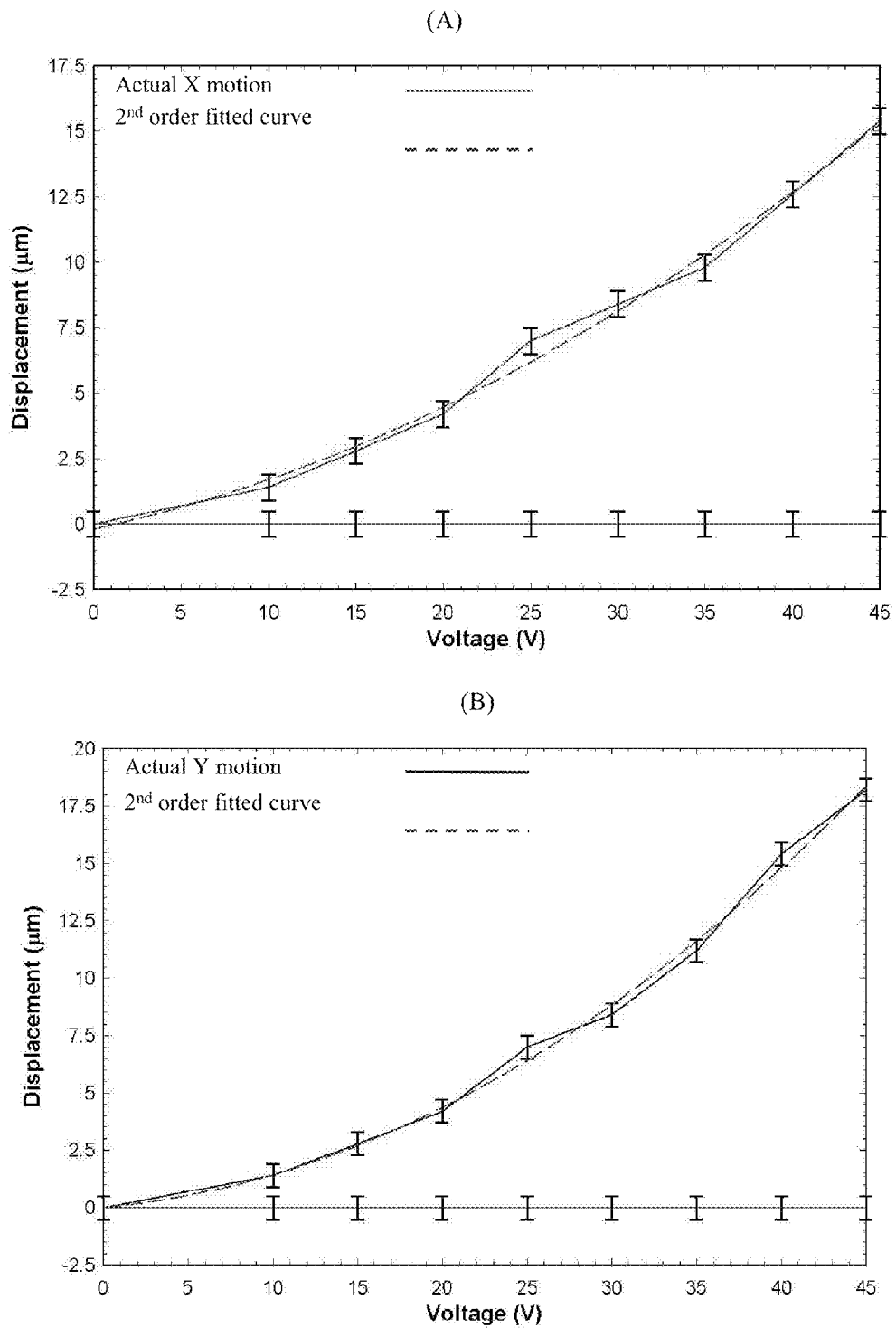
FIG. 8. Static displacement of the stage in XY directions. (A) Actuating X axis. (B) Actuating Y axis.

Experimental Results: This section characterizes the fabricated stage by measuring its static displacement as a function of driving voltage. The modal frequency corresponding to the first mode is also measured along with the associated Q-factor for the stage. For these experiments, the actuators are driven by a multi-channel amplifier (Model LA75 from CEDRAT TECHNOLOGIES with an amplification factor of 20). The amplifier is connected to a signal generator (HP/Agilent 33220A). FIG. 8 shows the static displacement of the stage at different voltages. The experimental data overlays the second order fitted values for displacement. To experimentally obtain the voltage-displacement curves, a probe station is used. The voltage for an actuator is gradually incremented and the corresponding displacements of the table in the X and Y directions are observed by tracking the motion of a feature on the end-effector with a microscope scale that has a resolution of 1 μm.

As indicated in FIG. 8, within the resolution of the observations, no cross talk is observed even when the maximum displacement of around 15 μm is achieved for both the X (FIG. 8A) and Y (FIG. 8B) axes at a driving voltage of 45 V. When a single axis is fully actuated, the generated motion in the other direction is not noticeable from a high resolution microscope. This is predicted by the kinematic analysis of the stage and results for the orthogonal design of the actuation. Experiments were also performed to test the coupling effect of actuation. Each actuator is individually driven with a voltage that corresponds to 15 microns (from FIG. 8) and the corresponding X and Y coordinates of the displaced end-effector are recorded. Next both actuators are simultaneously driven with the same voltages (that correspond to a 15 micron displacement along the X and Y directions) and the coordinates of the displaced end-effector are compared to the previously recorded coordinated. Again, within the resolution of the microscope, no difference could be observed.

Figure 9:
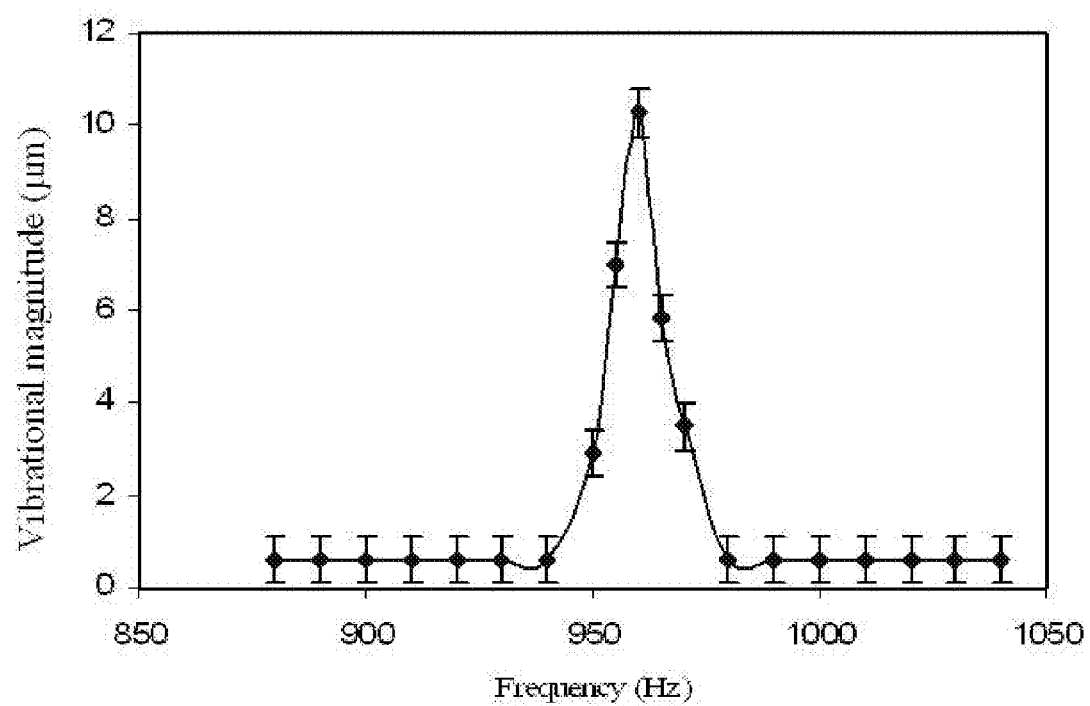
FIG. 9. Magnitude of vibration around resonant frequency in air.

The dynamic behavior (natural frequency) of the device is also obtained experimentally. A signal generator is used to generate sinusoid input voltages with different frequencies. The voltage is sent to the actuator and the amplitude of vibration is observed in the microscope of the probe station. FIG. 9 shows the experimentally identified relationship between frequency and magnitude of vibration. A clear resonant frequency is detected at 960 Hz. This is close to the first dominant frequency predicted by the FEA at 1125 Hz. The discrepancy that is observed may arise from fabrication imperfections, since the stiffness of the flexures is sensitive to their dimensions. Further, approximations made in the finite element modeling may also contribute to this discrepancy.

To study the dynamic behavior around the resonant frequency, a set of frequency response tests is performed. Sinusoid signals at different frequencies around resonant frequency (960 Hz) with small amplitude (5 volts) are applied to the stage. The vibration amplitudes are monitored and recorded at different frequencies. FIG. 9 shows a graph of amplitude of vibrations observed at these frequencies. At around 960 Hz, vibration magnitude reaches its maximum value. The frequencies with amplitudes equal to the $1/\sqrt{2}$ of the maximum peak are around 955 Hz and 964 Hz. Thus, the Q factor is approximately equal to $Q=f_0/\Delta f=960/9 \approx 100$ in air. We attribute the relatively high Q factor to the high stiffness and good modal separation that results from the parallel kinematics stage design. The other reason for the high quality factor may come from the etching away of the handle layer, which decrease the film damping between the stage and the handle wafer.

In this example, a SOI MEMS micro positioning stage, based on a parallel kinematic mechanism, is designed, fabricated and tested. With the use of a parallel kinematics design, the displacement of two degree-of-freedom is decoupled. This produces linear kinematics in the operating motion range of the stage. Parallel kinematics design also generates well dispersed modal frequencies with the dominant modes being translations in the plane. The relatively simple dynamics provides control design for a closed loop positioning system. FEA simulations verify the advantage of adopting a PKM approach to such micro positioning stages. The stage is fabricated on a SOI wafer and high aspect of ratio features are fabricated by using deep reactive ion etching (DRIE) process. Experimental data shows that more than 15 microns of pure translational motion along the X and Y directions is achieved at 45V. The dominant natural frequency of the system is measured to be about 960 Hz. A high Q factor (~100) is achieved due to the high stiffness parallel kinematics design. These values surpass previously reported values for such 2-DOF translational stages by 2 to 4 times for natural frequency [6, 8, 17] and by 12 times for Q factor [17]. The fabricated stages can be used in a variety of applications including, but not limited to, optical scanning, probe stations and in-situ experimentation in TEMs.

REFERENCES

[1] Li, J., Zhang, Q. X.; Liu, A. Q., Advanced fiber optical switches using deep RIE (DRIE) fabrication, Sensors and Actuators, A: Physical, v 102, n 3, Jan. 1, 2003, p 286-295

[2] Sun, Yu, Nelson, Bradley J.; Potasek, David P.; Enikov, Eniko, A bulk microfabricated multi-axis capacitive cellular force sensor using transverse comb drives, Journal of Micromechanics and Microengineering, v 12, n 6, November 2002, p 832-840

[3] Sun, Yu, Piyabongkarn, D.; Sezen, A.; Nelson, B. J.; Rajamani, R., A high-aspect-ratio two-axis electrostatic microactuator with extended travel range, Sensors and Actuators, A: Physical, v 102, n 1-2, Dec. 1, 2002, p 49-60

[4] Indermuehle, P. F., Linder, C.; Brugger, J.; Jaecklin, V. P.; de Rooij, N. F., Design and fabrication of an overhanging xy-microactuator with integrated tip for scanning surface profiling, Sensors and Actuators, A: Physical, v 43, n 1-3, May 1994, p 346-350

[5] Indermuhle, P.-F., Jaecklin, V. P.; Brugger, J.; Linder, C.; de Rooij, N. F.; Binggeli, M., AFM imaging with an xy-micropositioner with integrated tip, Sensors and Actuators, A: Physical, v 47, n 1-3 pt 4, March-April 1995, p 562-565

[6] Kim, Che-Heung, Jeong, Hee-Moon; Jeon, Jong-Up; Kim, Yong-Kweon, Silicon micro XY-stage with a large area shuttle and no-etching holes for SPM-based data storage, Journal of Microelectromechanical Systems, v 12, n 4, August 2003, p 470-478

[7] Choi, J.-J., Park, H.; Kyu Yong Kim; Jong Up Jeon, Electromagnetic micro x-y stage with very thick Cu coil for probe-based mass data storage device, Proceedings of SPIE—The eInternational Society for Optical Engineering, v 4334, 2001, p 363-371

[8] Lu, Y., Pang, C. K.; Chen, J.; Zhu, H.; Yang, J. P.; Mou, J. Q.; Guo, G. X.; Chen, B. M.; Lee, T. H., Design, fabrication and control of a micro X-Y stage with large ultra-thin film recoding media platform, Proceedings of the 2005 IEEE/ASME International Conference on Advanced Intelligent Mechatronics, AIM 2005, 2005, p 19-24

[9] Epitaux, Marc; Verdeil, Jean-Marc; Petremand, Yves; Noell, Wilifried; De Rooij, Nicoolas F., Micro-machined XY stage for fiber optics module alignment. IEEE Conference on Optical Fiber Communication, 2005 p 131-133 Anaheim, Calif., United States

[10] Kim, Che-Heung; Kim, Yong-Kweon, Integration of a micro lens on a micro XY-stage, Proceedings of SPIE—The International Society for Optical Engineering, v 3892, 1999, p 109-117

[11] Kazuhiro Takahashi, Ho Nam Kwon, Kunihiko Saruta, Makoto Mita, Hiroyuki Fujita, Hiroshi Toshiyoshi, A two-dimensional f-θ micro optical lens scanner with electrostatic comb-drive XY-stage, IEICE Electronics Express, Vol. 2 (2005), No. 21 pp. 542-547

[12] Kazuhiro Takahashi, Makoto Mita, Hiroyuki Fujita, Hiroshi Toshiyoshi, A high fill-factor comb-driven XY-stage with topological layer switch architecture, IEICE Electronics Express, Vol. 3 (2006), No. 9 pp. 197-202

[13] Yao, Qing, Ferreira, Placid M.; Mukhopadhyay, Deepkishore, Development of a novel piezo-driven parallel-kinematics single crystal silicon micropositioning XY stage, Proceedings of SPIE—The International Society for Optical Engineering, v 5836, Smart Sensors, Actuators, and MEMS II, 2005, p 56-66

[14] Yigui Lia, Minoru Sasaki, Kazihiro Hane, A two-dimensional self-aligning system driven by shape memory alloy actuators, Optics & Laser Technology 37 (2005) 147-149

[15] Wu, C.-T., Hsu, W., An electro-thermally driven microactuator with two dimensional motion, Microsystem Technologies, v 8, n 1, March 2002, p 47-50

[16] Jaecklin, V. P.; Linder, C.; de Rooij, N. F.; Moret, J. M.; Bischof, R.; Rudolf, F., Novel polysilicon comb actuators for xy-stages, *Proc IEEE Micro Electro Mech Syst Workshop*, 1992, p 147-149

[17] Lee, Chris S. B., Han, Sejin; MacDonald, Noel C., Single crystal silicon (SCS) XY-stage fabricated by DRIE and IR alignment, *Proceedings of the IEEE Micro Electro Mechanical Systems (MEMS)*, 2000, p 28-33

[18] Kim, Che-Heung, Kim, Yong-Kweon, Micro XY-stage using silicon on a glass substrate, *Journal of Micromechanics and Microengineering*, v 12, n 2, February 2002, p 103-107

Harness, Ty (Imperial Coll); Syms, Richard R. A., Characteristic modes of electrostatic comb-drive X-Y microactuators, *Journal of Micromechanics and Microengineering*, v 10, n 1, March 2000, p 7-14

[20] I. Bonev, Delta parallel robot, http://www.parallemic.org/Reviews/Review002.html

[21] Q. Yao, J. Dong, P. M. Ferreira, Design, Analysis, Fabrication and Testing of a Parallel-Kinematic Micropositioning XY Stage, International Journal of Machine Tools and Manufacture, Vol 47 (6). 2007 pp 946-961

[22] Yangmin Li, Qingsong Xu, A novel design and analysis of a 2-DOF Compliant Parallel Micromanipulator for Nano manipulation, *IEEE Transactions on Automation Science and Engineering*, 3(3)(2006), 248-253

[23] Legtenberg, Rob, Groeneveld, A. W.; Elwenspoek, M., Comb-drive actuators for large displacements, Journal of Micromechanics and Microengineering, v 6, n 3, September 1996, p 320-329

[24] F. Laermer and D. Schilp, Method of anisotropically etching silicon, U.S. Pat. No. 5,501,893

Example 2

Parallel Kinematic Mechanism Based Monolithic XY Micro-Positioning Stage with Rotary Comb Drive Actuators Micro-positioning stages fabricated using MEMS based processes are critical in enabling micro/nano manipulation and probing. These stages have been extensively used in micro-force sensors, scanning probe microscopy and micro optical lens scanners. This example presents the design, kinematic and dynamic analysis, fabrication and characterization of a novel monolithic micro-positioning XY stage. The design of the micro-positioning stage is based on a Parallel Kinematic Mechanism (PKM). The PKM based design decouples the motion in the XY direction. Additionally, it restricts the parasitic rotation of the end-effector (table) of the micro-positioning stage while providing an increased motion range. The motion of the stage is linear in the operating range thus simplifying its kinematics. The truss like parallel kinematic mechanism design of the stage structure reduces its mass while keeping the stage stiffness high. This leads to a high natural frequency of the micro-positioning stage (1250 Hz) and a high Q-factor of 156. The stage mechanism is fabricated on a Silicon-On-insulator (SOI) substrate and is actuated by integrated electrostatic rotary comb drives. The fabrication process uses multi-layer patterning along with an Inductively Coupled Plasma Deep Reactive Ion Etching (ICP-DRIE). The use of ICP-DRIE enables the high aspect ratio etching that is required for the stage fabrication and its optimal actuation using the integrated electrostatic rotary comb drives. The fabricated stages have a motion range of more than 30 microns of decoupled displacements along the X and Y directions at a driving voltage of 200V.

Silicon based micro-positioning stages made with semiconductor fabrication processes play an important role in many applications. These stages have been used extensively to provide controlled displacement in one or more degree-of freedom in fiber optical switches [1], micro-force sensors [2], actuator for scanning probe microscopy [3], data storage [4] and micro optical lens scanners [5]. Hence, research efforts are focused on designing these stages to have precise and fast positioning capabilities over their workspaces.

A number of physical principles like magnetic [6], thermal [7] and electrostatics [8] have been used to provide actuation to the underlying mechanism of these stages. Of these principles, the electrostatic modes of actuation in the form of electrostatic comb-drives have been extensively reported in the literature [8, 9]. Electrostatic comb-drives are widely used due to their ease of fabrication due to monolithic integration with the stage mechanism and favorable dimensional scaling down characteristics.

Many two degree-of-freedom micro-positioning stages have been reported in the literature using electrostatic comb-drives as the actuators. However, some of these designs [2] have directly connected the comb-drives providing actuation in X and Y directions to the end-effector or the table of the stage. This limits the workspace of these stages due to the pull in effects in a comb-drive of an axis when the comb-drive attached to the other axis is energized. A popular approach [3] tries to alleviate this workspace limitation by using long slender beams between the end-effector and the actuators. The slender beam acting as a leaf spring tries to accommodate the motion of one axis when the other is actuated. However, slenderness of the beam leads to other undesirable stage characteristics such as non-deterministic motions at the end-effector and low resonant frequencies for the stage [10].

Parallel kinematic based mechanisms adapted for use in micro-positioning stages have been also reported [11]. These mechanisms have in-parallel actuation and a truss like structure. This leads to non-accumulating errors, high structural stiffness, and low moving mass and high operational bandwidths. However, such systems are difficult to synthesize, have small workspaces and coupled and non-linear kinematics and dynamics. Within this taxonomy, a low (2 or 3) DOF parallel-kinematics stage can be advantageous for use in high precision applications because of the simplified designs that produce desirable characteristics such as linear kinematics and dynamics and relatively high natural frequencies and large workspaces. Additionally, the forward and inverse kinematics and dynamics problems for the stages are also simplified.

However, even the majority of parallel kinematic mechanism based micro-positioning systems have some type of folded springs as a part of their mechanisms [9]. This addition of a folded spring in the mechanism design tends to add a parasitic motion inside a kinematic chain. In this example, a design of a two degree-of-freedom micro-positioning stage based on parallel kinematic mechanism is presented, which gives an almost perfect kinematics. Each axis of the stage mechanism is actuated by an integrated primary rotary electrostatic comb-drive. Additionally, each axis has a secondary spare comb drive that can be either used to actuate the stage mechanism or used as a feedback device, such as for sensing the position of the stage mechanism. The stage mechanism is analyzed for its expected performance characteristics in terms of its motion range and natural frequencies. The stage mechanism and its actuators/sensors are fabricated on a silicon on-insulator (SOI) substrate by using standard semiconductor fabrication techniques. The fabricated micro-positioning stages are characterized and their experimentally observed performance characteristics are compared against the analyzed characteristics.

Figure 10:
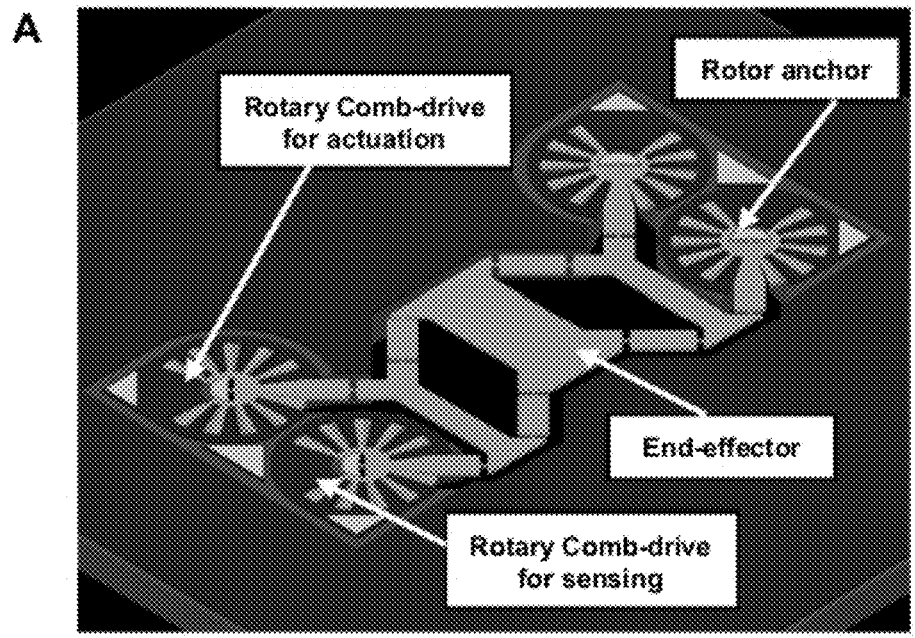
FIG. 10. Parallel kinematic mechanism based micro-positioning stage design. (a) Illustration of the stage design; (b) Equivalent kinematic model.
Figure 10:
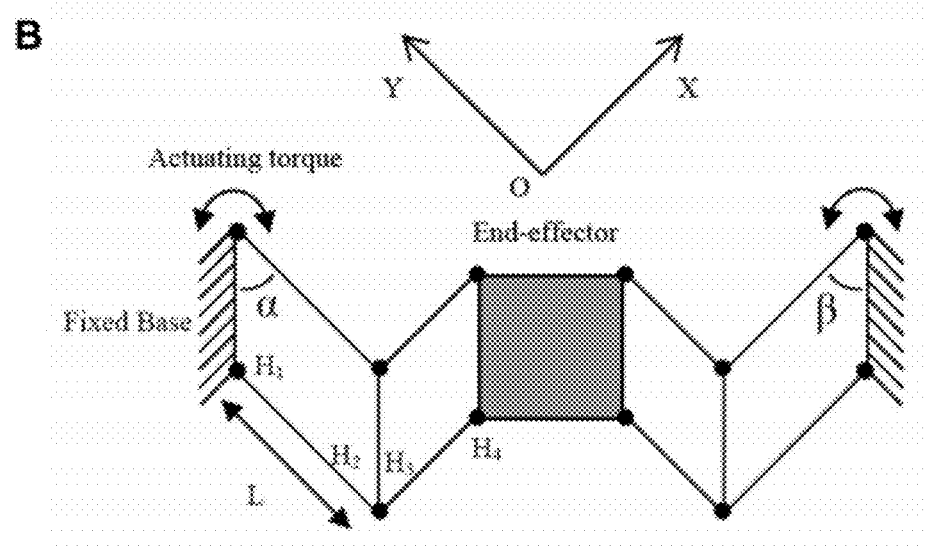

Parallel Kinematic Stage Design: FIG. 10 illustrates the design of the rotary comb-drive actuated parallel kinematic mechanism based micro-positioning stage. In this design a kinematic chain which consists of two parallelogram four-bar linkages is joined together serially and is attached to two rotary comb-drives. By having two such kinematic chains connected to opposite ends of the end-effector, the scheme shown in FIG. 10(b) is obtained, where α and β are the two actuation angles and pivot points are represented by black dots. The orientations of the two chains are such that the prismatic joints are perpendicular to each other thus kinematically decoupling the X and the Y axes. Additionally, due to the symmetric configuration of the kinematic chains the stage mechanism has the same stiffness and bandwidth along any direction in the XY plane.

The relationship between the actuation at the rotary comb-drive actuators and the displacement of the stage has been studied in [12]. A diagonal Jacobian matrix (1) can be proven following the procedure developed in [13].

$$\begin{bmatrix} \Delta X \\ \Delta Y \end{bmatrix} = \begin{bmatrix} L & 0 \\ 0 & L \end{bmatrix} \sqsubset \begin{bmatrix} \Delta \alpha \\ \Delta \beta \end{bmatrix} \quad (1)$$

Mechanism stiffness analysis: To facilitate this stage design fabrication using standard semi-conductor fabrication techniques, the pivot points in the mechanism have been replaced by 1D flexure hinges (FIG. 10(a)), which can be thought of pivots points with rotational stiffness. A schematic of a 1D flexure hinge is shown in FIG. 2. Its rotational compliance (and the stiffness) can be calculated by using the Paros and Weisbrod formula as in (2).

$$C_z = \frac{\alpha_z}{M_z} = \frac{3}{2EbR^2} \left[ \frac{1}{2\sigma + \sigma^2} \right] \times$$

$$\left\{ \left[ \frac{1+\sigma}{\tau^2} + \frac{3+2\sigma+\sigma^2}{\tau \cdot (2\sigma + \sigma^2)} \right] \cdot \left[ \sqrt{1-(1+\sigma-\tau)^2} \right] + \right.$$

$$\left. \left[ \frac{6-(1+\sigma)}{(2\sigma+\sigma^2)^{3/2}} \right] \times \left[ \tan^{-1} \left( \sqrt{\frac{2+\sigma}{\sigma}} \times \frac{(\tau-\sigma)}{\sqrt{1-(1+\sigma-\tau)^2}} \right) \right] \right\} \quad (2)$$

where, $\sigma=t/2R$, $\tau=h/2R$, E is the Young's Modulus of the material of the flexure hinge (i.e. Silicon), t is the neck thickness of the flexure hinge (=10 μm), R is the radius of a flexure hinge at the neck (=300 μm), h is the width of the flexure hinge (=70 μm) and b is the height of the flexure hinge or the device thickness (=50 μm).

The maximum bending torque, and consequently the maximum angular deflection ($\alpha_{z-max}$) that the flexure can sustain before failing, can be calculated as given by [9]. The Young's Modulus and the proportional limit (yield strength) of the silicon based 1D circular flexure hinge used in the stage mechanism is 131 GPa and 7,000 MPa respectively. Hence the rotational compliances, the rotational stiffness and the maximum angular deflections of the hinges with a neck thickness of t=10 μm can be given by:

$$C_{z,t=10}=117,439 \text{ Radian N}^{-1} \text{ m}^{-1} \quad (3)$$

$$K_{hinge,t=10}=1/C_z=8.52\times10^{-6} \text{ N m Radian}^{-1} \quad (4)$$

$$\alpha_{z-max,t=10}=0.68 \text{ Radian or } 39.2 \text{ degree} \quad (5)$$

Actuator torque analysis: The rotary comb-drive generates a torque, $\tau_{comb}$ under an actuation voltage, V to deflect the hinges to displace the stage mechanism through its workspace. This torque is given by:

$$\tau_{comb} = n \frac{\varepsilon_0 h}{g} V^2 \sum_i R_j \quad (6)$$

where, n is the number of pairs of individual stator-rotor pair sets (=10), $\varepsilon_0$ is the permittivity of free space (=8.854e$^{-12}$ m$^{-3}$ kg$^{-1}$s$^4$ A$^2$), h is the height of a finger (=50 μm), g is the gap between two neighboring fingers (=4 μm) and $$\sum_i R_j$$

is the sum of radii of individual movable comb-fingers (=22.16 mm). Hence, the rotary comb-drive generates 0.98 μNm torque under an actuation voltage of 200V.

Workspace analysis: The torque generated by the actuated comb-drive deflects the hinges in the mechanism to displace the mechanism through its workspace. The hinges in the four-bar linkage connected to the actuated comb-drive rotate by the same angle as that of the comb-drive. However, the hinges in the four-bar linkage connected to the table on the other kinematic chain deflect by twice the angle as that of the comb drive to accommodate the motion of the actuated kinematic chain thus keep the orientation of the end-effector fixed. Hence, the workspace through which the stage mechanism can translate through, ΔL is given by:

$$\Delta L = L\tau_{comb}/(20K_{hinge,t=10}) \quad (7)$$

where, L is the length of the crank arm (=1.65 mm). However, the actual hinge neck thicknesses varied from the nominal design value of 12 μm due to over etching of the stage mechanism during the device release etch step. Hence, a better estimate of the workspace can be obtained by taking into account these deviations in the hinge thicknesses while accounting for the effective stiffness of the mechanism as given by (8).

$$\Delta L = L\tau_{comb}/(8K_{hinge,t=5}+8K_{hinge,t=5}+2K_{hinge,t=7}+2K_{hinge,t=10}) \quad (8)$$

Replacing the value of the known parameters in (8), ΔL is calculated as 33.7 μm at 200V.

FEA Structural Analysis: The natural frequencies and the dynamic behavior of a micro-positioning stage are crucial aspects for its successful use in micro/nano manufacturing. A stage is desired to have high natural frequency so that it can respond quickly to the fast changes in the commanded position. The finite element analysis of the micro-positioning stage (using COMSOL®) is performed to ascertain these dynamic behaviors of the system. The finite element analysis is carried out by modeling the stage geometry as a 2D planar schematic with plane stress approximation, with 113,534 triangular elements. Due to the node and memory limitations of the finite element analysis simulation software, the truss-like structure of the moving parts of the stage is replaced by a solid geometry. To compensate for the extra mass introduced by this approximation, the material density of the moving parts is scaled down appropriately.

Figure 11:
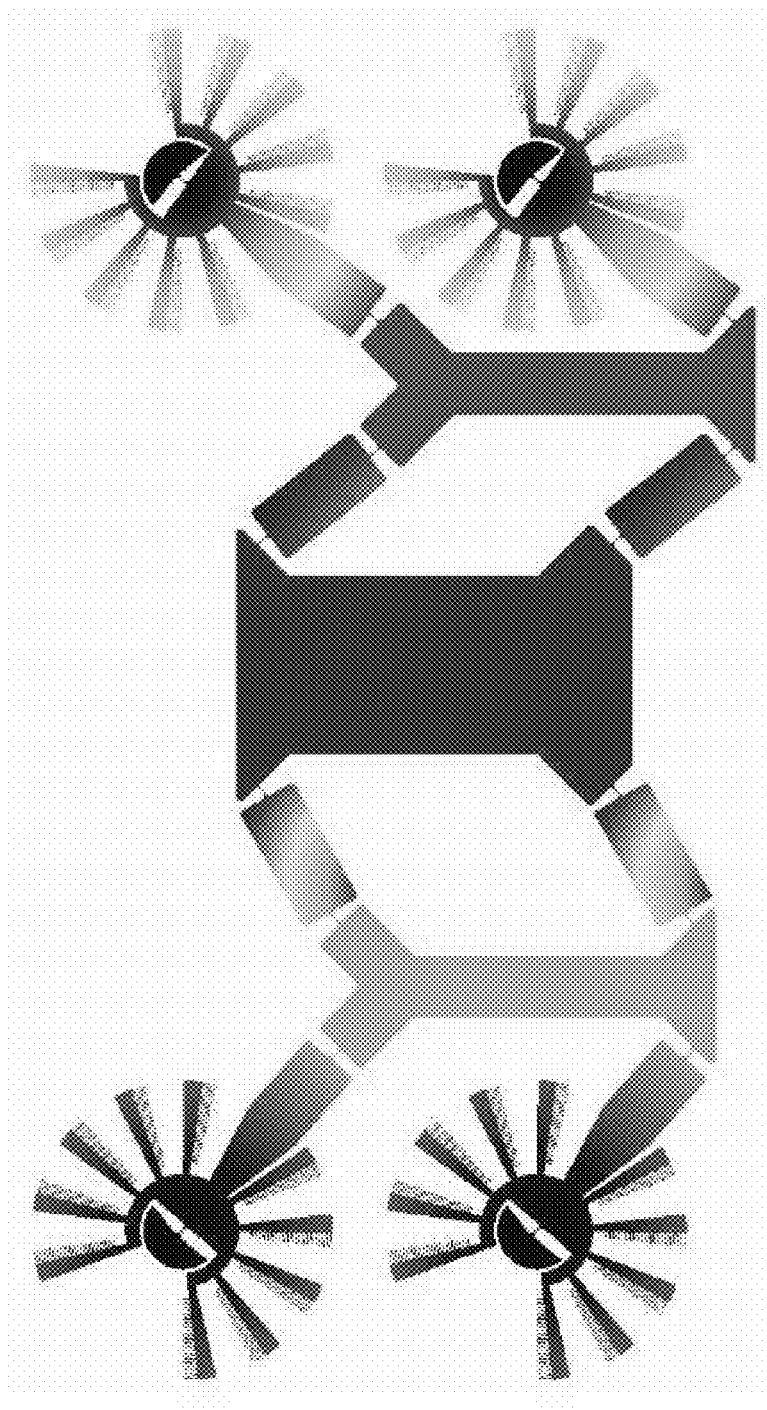
FIG. 11. Vibrational mode shape of the micro-positioning stage at the first resonant frequency of 1,269 Hz.

The micro-positioning stage of this example has two vibration modes, i.e. X-axis and Y-axis. Because of the symmetric design, both modes have the same resonant frequency. Therefore, the stage can vibrate along any direction on XY plane with the same resonant frequency. The result of dynamics analysis shows that the first two resonant frequencies of the stage are about 1,269 Hz. FIG. 11 shows one of the possible mode shapes at the first two resonant frequencies. Additionally, the first two modes provide predominantly translational motions in the XY plane. The higher modal frequencies are above 72,000 Hz.

Micro-fabrication process: Standard semi-conductor fabrication techniques are used to fabricate the micro-positioning stage on a silicon-on-insulator (SOI) substrate. The SOI substrate has a 50 μm thick device layer supported by an underlying 500 μm thick handle layer. The device layer on which the stage mechanism is fabricated is isolated from the handle layer by a 2 μm thick silicon dioxide film. Each micro-positioning stage is fabricated on a 15 mm×15 mm die that is diced from a 100 mm diameter SOI wafer (FIG. 12(a)).

Figure 12:
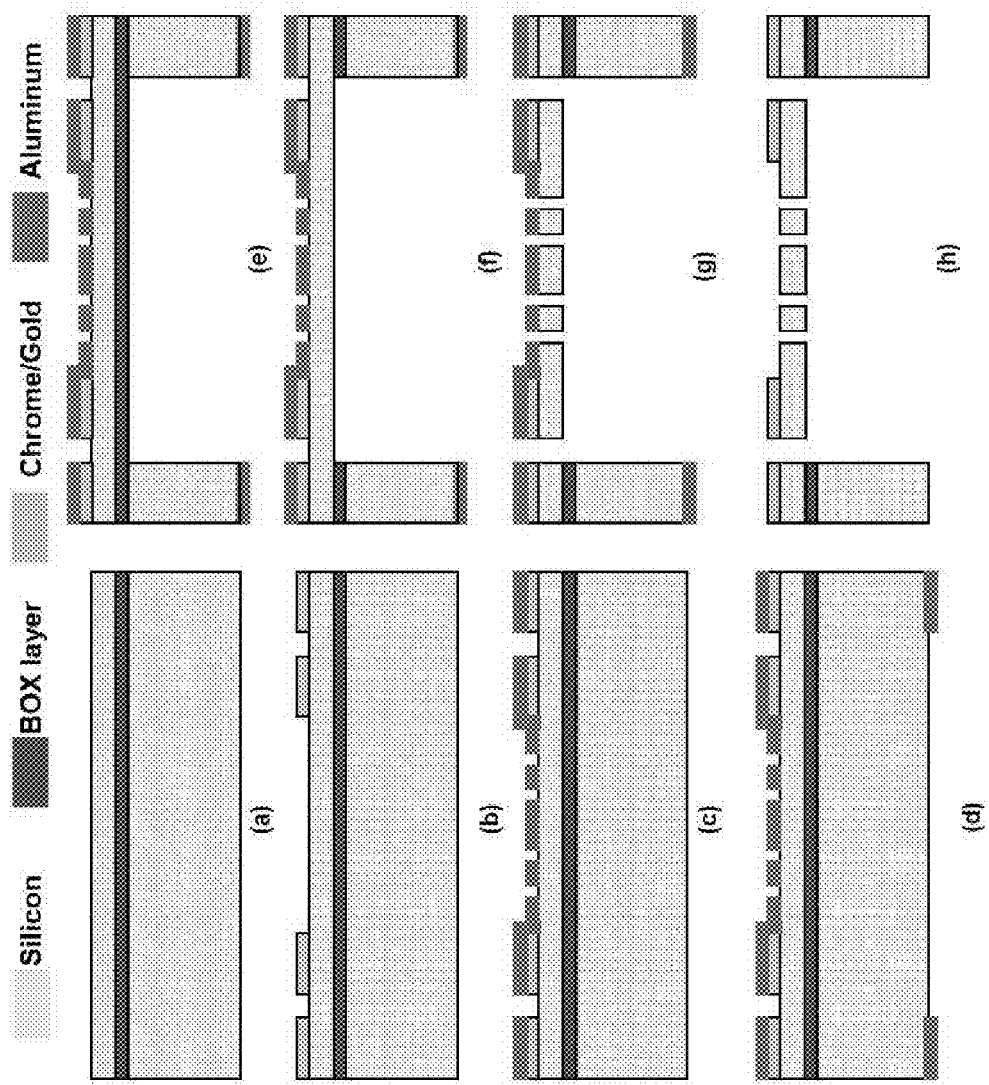
FIG. 12. Process flow for the micro-fabrication of the micro-positioning stage. (a) Initial SOI substrate; (b) Chrome/Gold deposition to form the pad layers; (c) Front side aluminum mask patterning; (d) Back side aluminum mask patterning; (e) Inductively Coupled Plasma Deep Reactive Ion Etching (ICP-DRIE) of the backside; (f) Removal of oxide layer by concentrated HF; (g) ICP-DRIE etching to release the device; (h) Removal of aluminum mask by aluminum etchant.

The electrical contact pads for the micro-positioning stage are fabricated by sputtering Cr/Au (17 nm/392 nm) on the device layer patterned with 2 μm thick AZ1518 photoresist, followed by the lift-off process to remove the sputtered metal from the areas other than the pads (FIG. 12(b)). The device layer is patterned by using AZ1518 with the stage mechanism structure by using an aluminum lift-off process (FIG. 12(c)). The thickness of the aluminum layer in this step is 60 nm. The handle layer is subsequently patterned by using a similar aluminum lift-off process (FIG. 12(d)). The patterned handle layer is etched in ICP-DRIE to anisotropically remove the exposed silicon. The resulting exposed silicon dioxide film is removed by using concentrated HF (FIG. 12(e)). The stage mechanism is released by etching the device side in ICP-DRIE (FIG. 12(f)). After the aluminum etchant is used to remove the aluminum mask, the device is ready to be tested (FIG. 12(g)).

Figure 13:
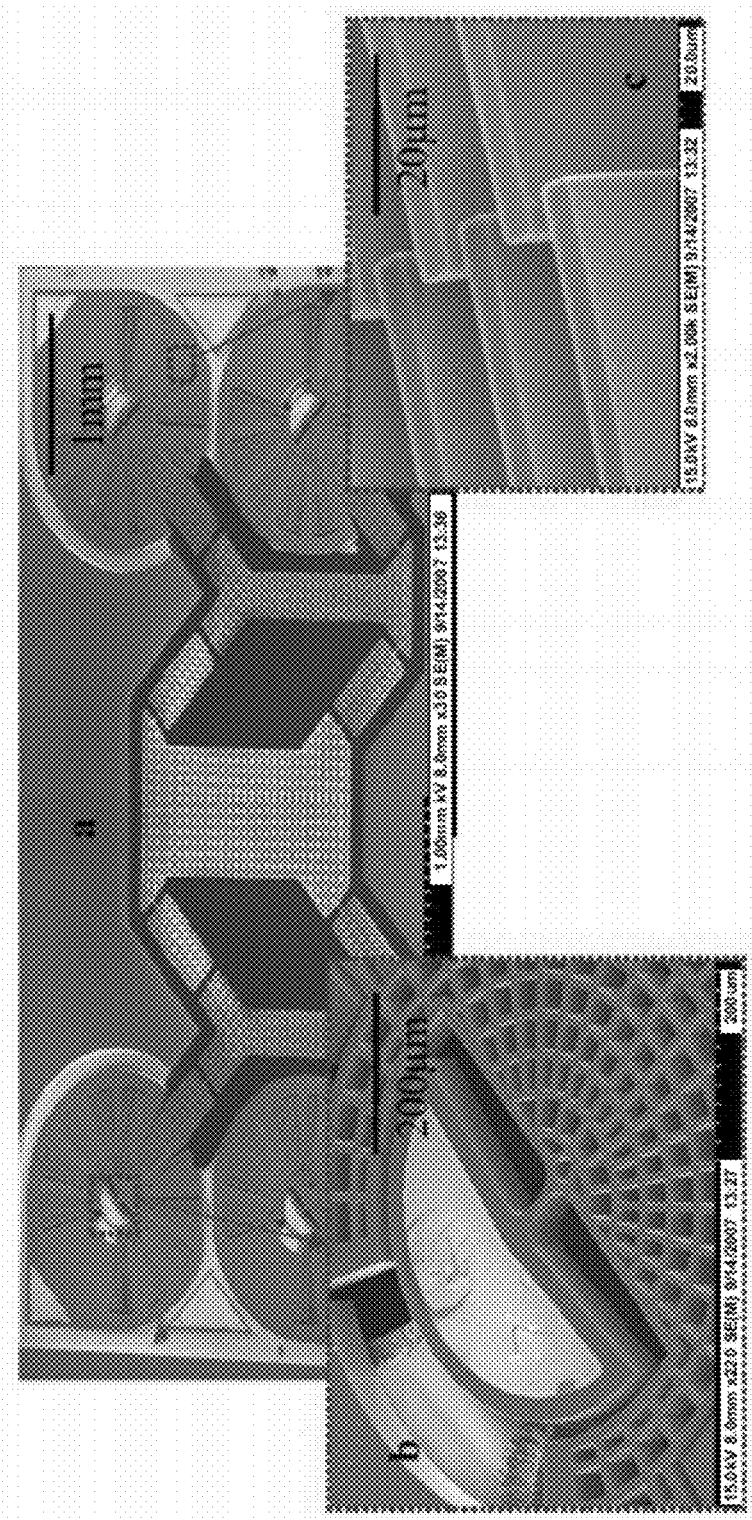
FIG. 13. SEM micrographs of the fabricated micro-positioning stage. (a) Overall structure (assembled using two side-by-side micrographs); (b) Close up of the hinge near a rotor anchor; (c) Close up of the comb-drive fingers.

Scanning electron microscope (SEM) images of a fabricated micro-positioning stage are shown in FIG. 13.

Experimental Results: The fabricated micro-positioning stage is characterized by varying the actuation voltage at the rotary comb-drives and measuring the resultant motion at the end-effector. The first natural frequency of the stage is measured and compared with the theoretically predicted value. Finally, the Q-factor for the fabricated stage is measured and reported.

Figure 14:
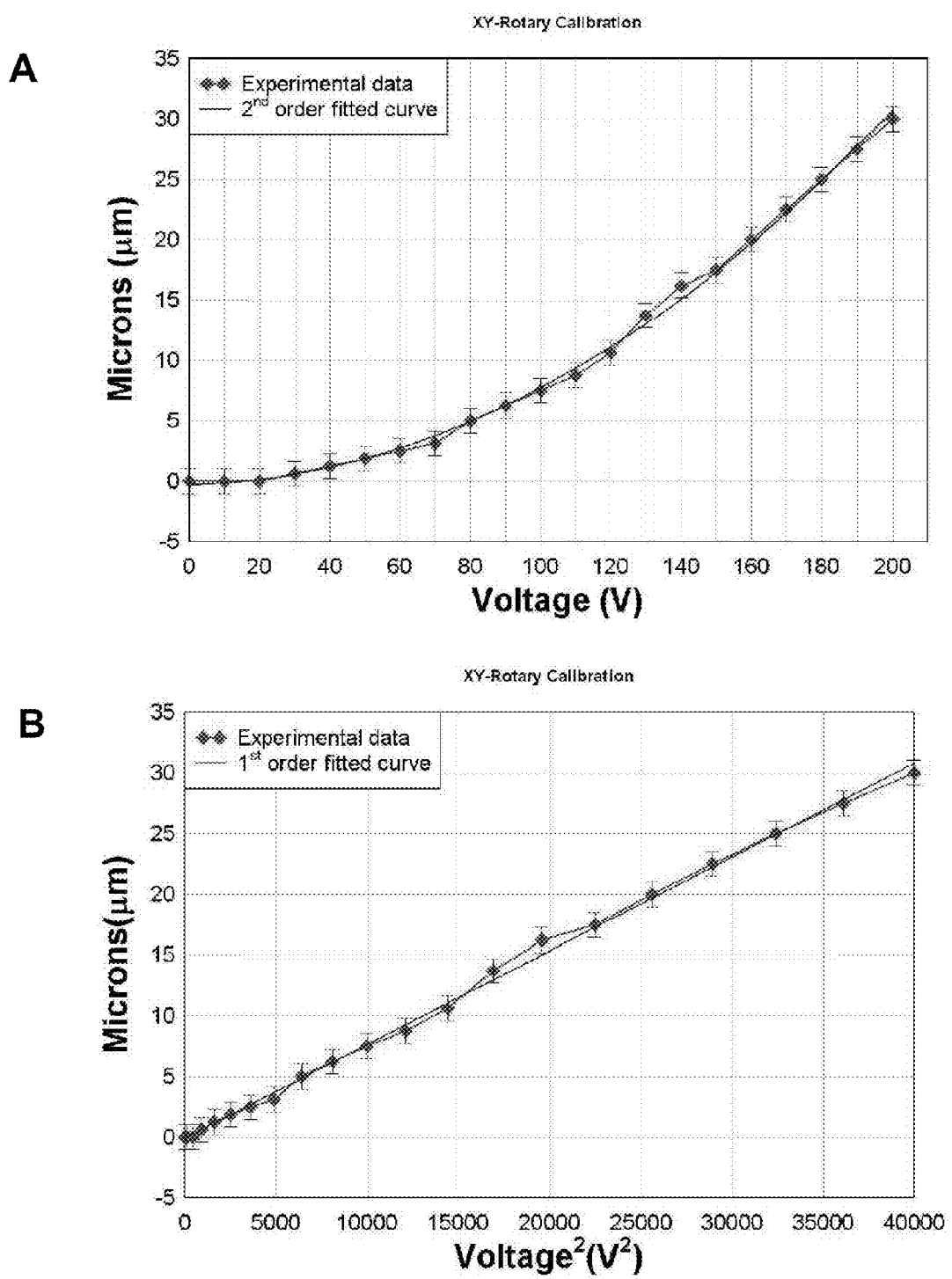
FIG. 14. Static displacement characterization of the micro-positioning stage. (a) Axis displacement as a function of actuation voltage; (b) Axis displacement varying linearly with the square of the actuation voltage.

For the static displacement characterization, a voltage source (Keithley Model 237) is connected to the rotary comb-drives of the stage, which is mounted on a probe station. Voltage is applied to the rotary comb-drive and the resultant displacement is measured using a high resolution microscope (on the probe station) with a resolution of 1 micron. FIG. 14(a) shows the displacement at end-effector of the stage as a function of the actuation voltage. The end-effector moves by 30 μm under an actuation voltage of 200V. Additionally, FIG. 14(b) shows that the displacement of the micro-positioning stage is linearly related to the square of the actuation voltage as predicted by the comb-drive theory. The other two combs have almost identical static displacement curves. The first natural frequency of the stage mechanism is detected at 1250 Hz. Additionally, the magnitudes of vibration near the natural frequency leads to a Q-factor of about 156. The experimentally obtained values of the stage workspace and natural frequency match well with the theoretical values.

In this example, a 2 degree-of-freedom micro-positioning stage, based on a parallel-kinematics mechanism, is designed, analyzed, fabricated and characterized. The parallel-kinematics based design produces linear kinematics in the operating motion range of the stage and generates well dispersed modal frequencies with the dominant modes being the desired translations in the plane. The relatively simple dynamics and the availability of a spare sensing rotary comb-drive facilitate future control design for a closed loop positioning system. Finite element analysis of the stage mechanism verifies the advantage of adopting a parallel kinematic mechanism design approach to such micro positioning stages. The stage is fabricated on a SOI wafer and high aspect of ratio features are fabricated by using inductively coupled plasma deep reactive ion etching (ICP-DRIE) processes. Experimental testing demonstrates 30 μm of motion at the end-effector is achieved at 200V. The dominant natural frequency of the system is measured to be about 1250 Hz. A high Q-factor (>150) is achieved due to the high stiffness parallel kinematic design. The fabricated stages are capable of use in a wide range of applications, such as for use in optical scanning, probe stations and as micro force sensors, for example.

[1] Li J, Zhang Q X and Liu A Q 2003 Advanced fiber optical switches using deep RIE (DRIE) fabrication Sensors Actuators A 102 286-95

[2] Sun Yu, Nelson B J, Potasek D P and Enikov E A 2002 Bulk microfabricated multi-axis capacitive cellular force sensor using transverse comb drives J. Micromech. Microeng. 12 832-40

[3] Indermuehle P F, Linder C, Brugger J, Jaecklin V P and de Rooij N F 1994 Design and fabrication of an overhanging xy-microactuator with integrated tip for scanning surface profiling Sensors Actuators A 43 346-50

[4] Kim C-H, Jeong H-M, Jeon J-U and Kim Y-K 2003 Silicon micro XY-stage with a large area shuttle and no-etching holes for SPM-based data storage J. Microelectromech. Syst. 12 470-8

[5] Kim C-H and Kim Y-K 1999 Integration of a micro lens on a micro XY-stage Proc. SPIE—Int. Soc. Opt. Eng. 3892 109-17

[6] Wright J A, Tai Y-C and Chang S-C 1997 A Large Force, Fully-integrated MEMS Magnetic Actuator 1997 International Conference on Solid-state Sensors and Actuators Chicago, June 16-19

[7] Chen S-C and Culpepper M L 2006 Design of a six-axis micro-scale nanopositioner-μHexFlex Precision Engineering Vol. 30 Iss. 3 314-324

[8] Gu L, Li X, Bao H, Liu B, Wang Y, Liu M, Yang Z and Cheng B 2006 Single-wafer-processed nano-positioning XY-stages with trench-sidewall micromachining technology J. Micromech. Microeng. 16 1349-1357

[9] Dong J, Mukhopadhyay D and Ferreira P M 2007 Design, fabrication and testing of a SOI-MEMS parallel kinematics XY stage Journal of micromechanics and microengineering 17 1154-1161

[10] Harness T and Syms R R A 2000 Characteristic modes of electrostatic comb-drive X-Y microactuators J. Micromech. Microeng. 10 7-14

[11] available at world wide web page: hexapods.net/

[12] Yangmin L and Qingsong X 2006 A novel design and analysis of a 2-DOF compliant parallel micromanipulator for nano manipulation IEEE Trans. Autom. Sci. Eng. 3 248-53

[13] Yao Q, Dong J and Ferreira P M 2007 Design, analysis, fabrication and testing of a parallel-kinematic microposi-tioning XY stage Int. J. Mach. Tools Manuf. 47 946-61

Figure 15:
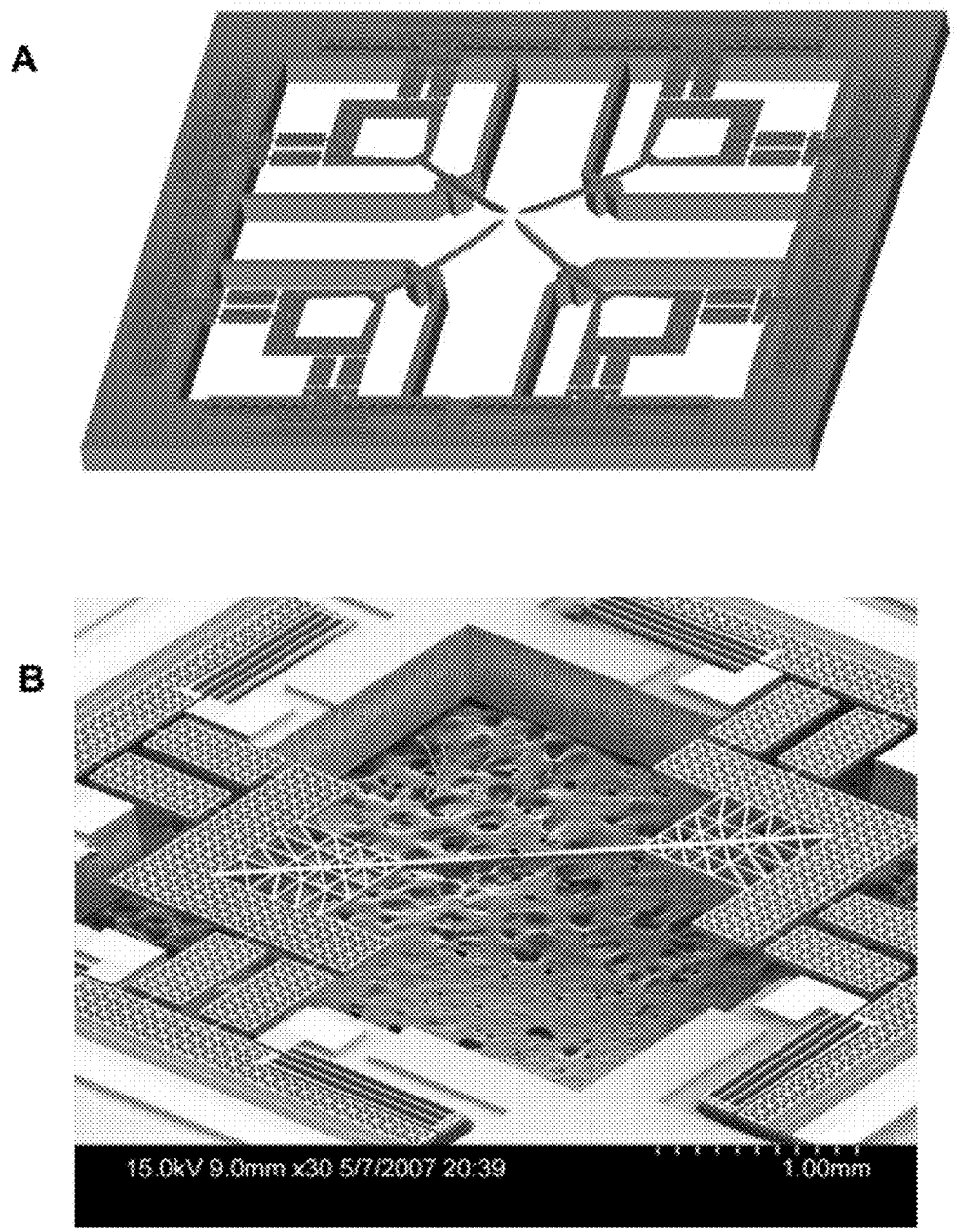
FIG. 15. Illustration of a manipulator apparatus for holding, positioning and exerting forces by an array of MEMS stages. A is a schematic set-up of four independent MEMS stages each having a probe as part of a movable end effector. B is a micrograph of a pair of opposed MEMS stages for holding a material of interest. C is a close up of the central holding region of B of the two opposed probes controlled by each of the MEMS stages.
Figure 15C:
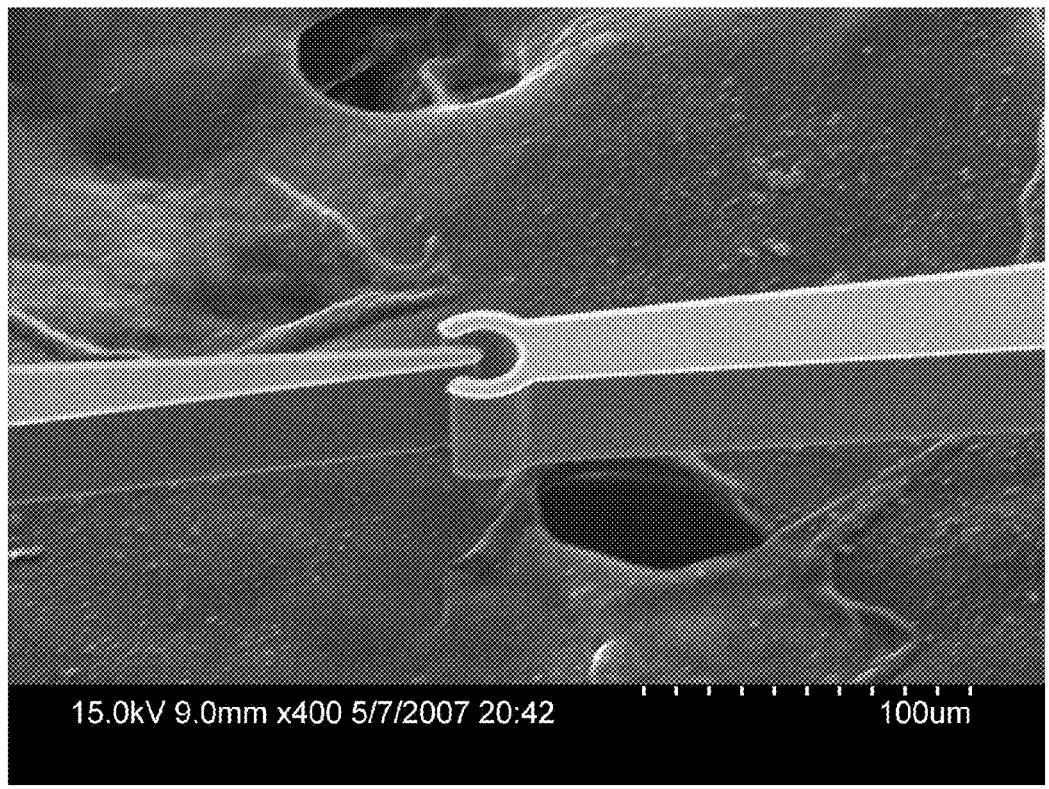

FIG. 15 provides an example of a system for holding a material or performing mechanical testing of a material. In an aspect the material corresponds to a biological material such as a cell. FIG. 15A schematically illustrates an array of four MEMS stages, such as any of the MEMS stages presented herein, for reliably holding, positioning and/or testing of material (not shown). In particular, the end effector is designed to engage a material. In this example, the end effector comprises an arm having an end tip for engaging a material. FIG. 15B is an SEM of a two MEMS stage device, wherein one stage provides the positioning or force generation, and the other device optionally provides data acquisition that is used in determining any one or more of a number of useful parameters such as stiffness, elasticity, viscoelasticity, electric potential, tension, force, displacement, velocity, acceleration etc. FIG. 15C provides a magnified view of the end tips of the system of FIG. 15B. The end tips are of any desired shape and can be constructed depending on the application, desired acquisition data and material being used with the system. In this example, one tip is tapered to a rounded point and the other tip is a portion of a cylindrical surface.

Figure 16:
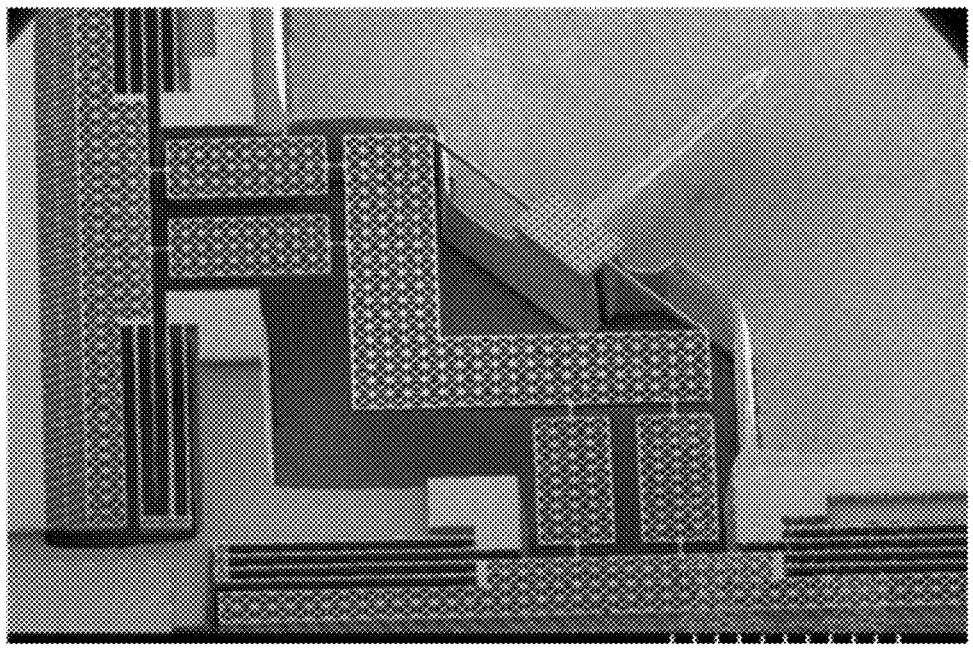
FIG. 16. Photomicrographs of other design embodiments for sensing and control. A shows a probe connected to a MEMS stage positioning device to provide controllable vertical displacement of probe tip from underlying base. B Rotary comb-drive actuated parallel kinematic mechanism based micro-positioning stage.
Figure 16:
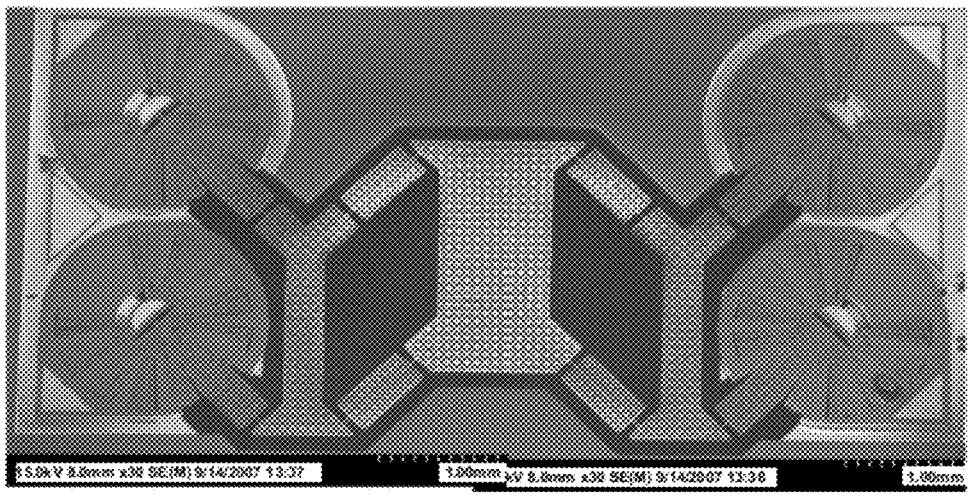

FIG. 16 provides two additional embodiments of the present invention. FIG. 16A is an SEM of a MEMS stage having a probe arm as part of the end effector. The probe is optionally controlled in a manner that is functionally similar to the tip of an atomic force microscope. For example the actuators can drive the tip of the probe arm to provide controlled separation from the underlying base (e.g., out-of-plane motion). Optionally, the tip can be controlled to provide three-dimensional positioning capabilities. FIG. 16B illustrates an embodiment that uses four independent actuators to drive the position of end-effector. Such multi-actuator systems (see also FIG. 15) facilitates access to sensing and control applications, closed-loop systems and other applications requiring feedback-type control.

Figure 17:
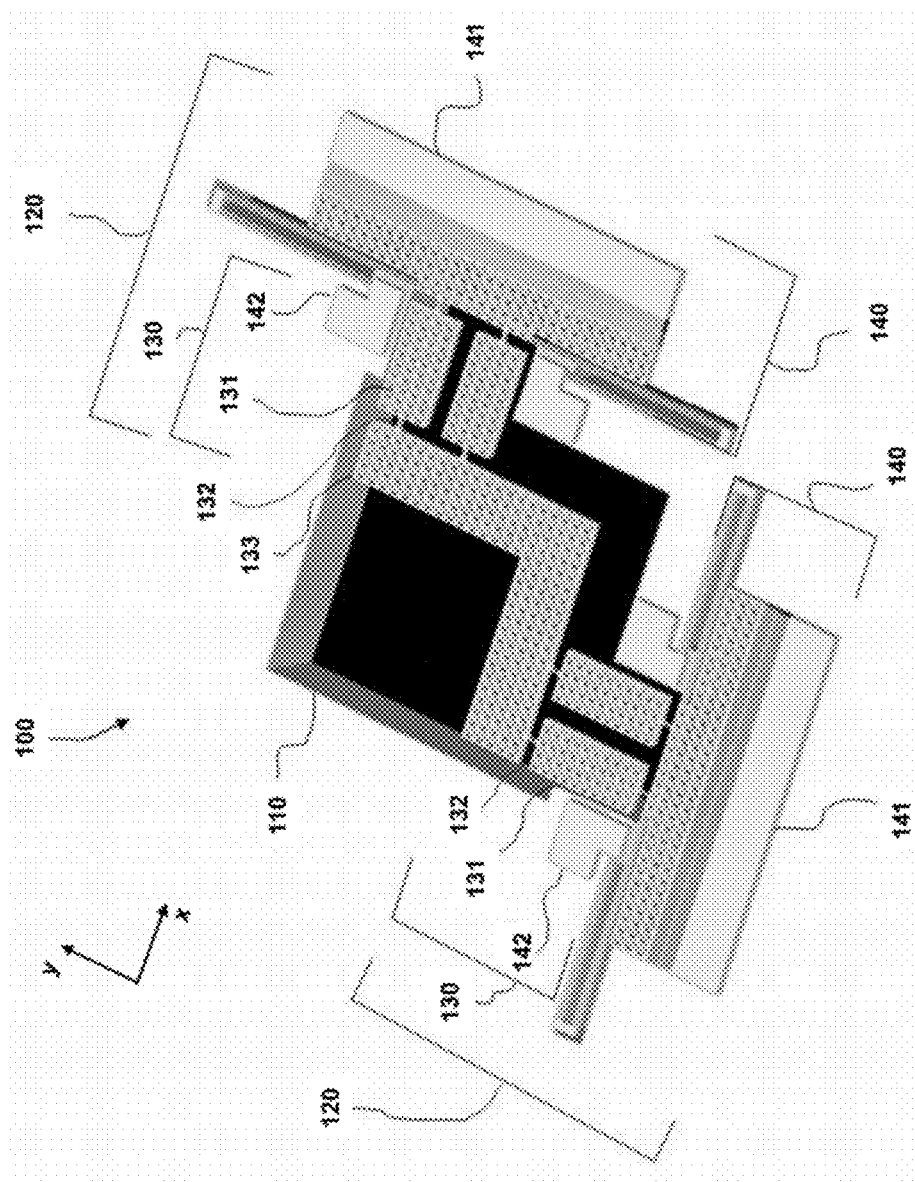
FIGS. 17-21 generally correspond to FIGS. 1A, 5, 10A, 6 and 12, respectively with annotated element numbers.

FIG. 17 illustrates a fabricated parallel kinematic flexure based silicon-on-insulator MEMS stage 100 with linear comb drives according to an embodiment of the present invention. The fabricated parallel kinematic flexure based silicon-on-insulator MEMS stage 100 includes a base 110 and two kinematic chains 120. The kinematic chains 120 include a flexure stage 130 and an actuated prismatic joint 140. The flexure stage 130 includes a four bar linkage mechanism 131, flexure hinges 132, and an end effector 133. The actuated prismatic joint 140 includes a linear comb drive 141, and a folded spring based suspension structure 142. A linear comb drive actuator(s) provides translation in a first direction (e.g., as indicated by the x-axis in the coordinate system) and another linear comb drive actuator(s) provides translation in a second direction (e.g., as indicated by the y-axis that is orthogonal to the x-axis).

In the fabricated parallel kinematic flexure based silicon-on-insulator MEMS stage with linear comb drives 100, the base 110 is mechanically connected to the kinematic chains 120 in parallel. The actuated prismatic joint 140 is mechanically connected to the base 110. The linear comb drive 141 is mechanically connected to the folded spring based suspension structure 142. The folded spring based suspension structure 142 is mechanically connected to the flexure hinges 132. The flexure hinges 132 are mechanically connected to the four bar linkage mechanism 131. The flexure hinges 132 are mechanically connected to the end effector 133. The actual shape of the end effector will depend on the application of interest. In this embodiment, the end effector is presented as an L-shape. In other embodiments the shape is different, such as having a probe or cantilever (see FIGS. 15, 16A and 22), for example.

In operation of the fabricated parallel kinematic flexure based silicon-on-insulator MEMS stage with linear comb drives 100, the kinematic chains 120 include two serially connected degrees of freedom. Pure translation occurs due to the actuated prismatic joint 140 and other translation occurs along a circular path due to the four bar linkage mechanism 131. The kinematic chains 120 are oriented so that the actuated prismatic joints 140 are perpendicular to each other. The actuated prismatic joints 140 kinematically decouple the two kinematic chains 120 to the maximum extent possible. The perpendicular configuration of the kinematic chains 120 makes the fabricated parallel kinematic flexure based silicon-on-insulator MEMS stage with linear comb drives 100 have the same stiffness and bandwidth along any direction in the XY plane. The four bar linkage mechanisms 131 restrict all rotational degrees of freedom of the end effector 133. The four bar linkage mechanisms 131 each have equal lengths for their respective crank and follower links. The four bar linkage mechanisms 131 maintain parallelism between the connector link and its base. Even with the rotation of the four bar linkage mechanism 131, the connector link undergoes pure translation along a circular path. The two perpendicular edges of the end effector 133 are the connector links of the four bar linkage mechanisms 131 in the two kinematic chains 120. Due to this, the orientation of the end effector 133 remains fixed. When the fabricated parallel kinematic flexure based silicon-on-insulator MEMS stage with linear comb drives 100 is actuated in the X direction by the actuated prismatic joint 140 of one kinematic chain 120, the resulting motion of the end effector 133 is accommodated by the second kinematic chain 120 by an angular displacement at the four bar linkage mechanism 131 and flexure hinges 132. The angular compliance $C_z$ of the flexure hinge 132 is calculated as described herein from the Paros and Weisbrod formula.

Further discussion of flexure stages, hinges and end effector is provided in U.S. Pat. No. 7,239,107 (Ferreira et al.), which is specifically incorporated by reference to the extent not inconsistent with the disclosure herein.

To minimize the loss of motion transmitted from the actuated prismatic joints 140 to the end effector 133, the nominal configuration of the system is chosen so that the instantaneous displacement vector of the connector of the four bar linkage mechanism 131 in the kinematic chain 120 is orthogonal to the displacement of the actuated prismatic joint 140 in that kinematic chain 120 and parallel to that of the actuated prismatic joint 140 in the other kinematic chain 120. The relationship between actuation displacement, which is linear displacement of the two actuated prismatic joints 140, and the displacement of the fabricated parallel kinematic flexure based silicon-on-insulator MEMS stage with linear comb drives 100 is proven by the diagonal Jacobian matrix (see Equation (3)).

During actuation by the linear comb drives 141, the folded spring based suspension structure 142 has a large compliance in the actuation direction for large displacements. The folded spring based suspension structure 142 also has a high stiffness in the lateral direction to prevent side instabilities. The folded spring based suspension structure 142 supports the linear comb drive 141 and the end effector 133. The folded spring based suspension 142 has two clamped-clamped beams in series. The first one is from the anchors to the truss and the second one is from truss to rotor.

In another embodiment, when the fabricated parallel kinematic flexure based silicon-on-insulator MEMS stage with linear comb drives 100 is actuated in the Y direction by the actuated prismatic joint 140 of one kinematic chain 120, the resulting motion of the end effector 133 is accommodated by the second kinematic chain 120 by an angular displacement at the four bar linkage mechanism 131 and flexure hinges 132.

Alternatively, when the fabricated parallel kinematic flexure based silicon-on-insulator MEMS stage with linear comb drives 100 is actuated in the Z direction by the actuated prismatic joint 140 of one kinematic chain 120, the resulting motion of the end effector 133 is accommodated by the second kinematic chain 120 by an angular displacement at the four bar linkage mechanism 131 and flexure hinges 132.

In other embodiments, the diagonal Jacobian matrix supports that around the nominal point when the actuated prismatic joints 140 or the end effector 133 undergo a small displacement relative to the overall dimensions of the fabricated parallel kinematic flexure based silicon-on-insulator MEMS stage with linear comb drives 100, the motion in the Y direction is decoupled.

Alternatively, the end effector 133 is attached to a plurality flexure hinges 132.

Alternatively, the linear comb drive 141 is mechanically attached to a plurality of folded spring based suspension structures 142.

In another embodiment, the kinematic chains 120 are oriented so that the actuated prismatic joints 140 are at a 45 degree angle of each other.

In other embodiments, the kinematic chains 120 are oriented so that the actuated prismatic joints 140 are at a 30 degree angle of each other. Alternatively, the kinematic chains 120 are oriented so that the actuated prismatic joints 140 are at a 60 degree angle relative to each other.

Figure 18:
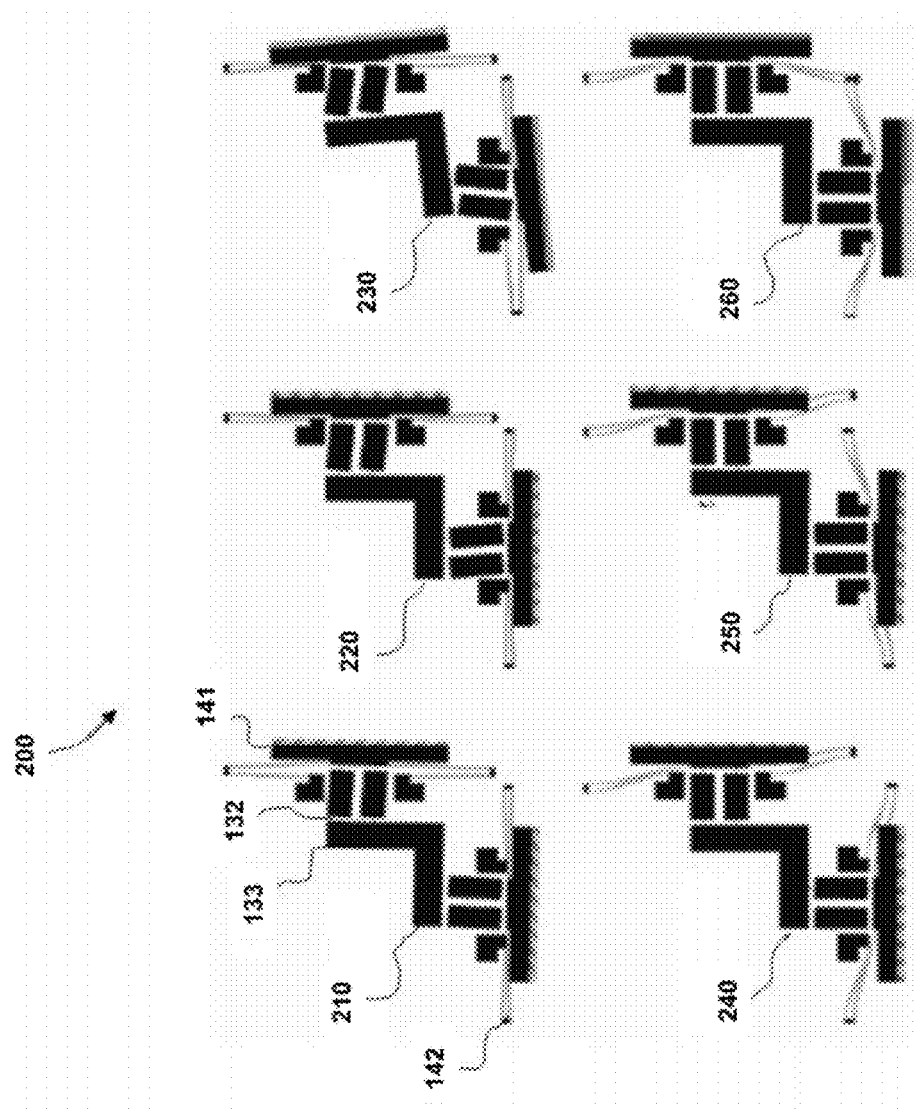

FIG. 18 illustrates the dominant mode shapes 200 for the fabricated parallel kinematic flexure based silicon-on-insulator MEMS stage with linear comb drives 100. The dominant mode shapes 200 include mode 210, mode 220, mode 230, mode 240, mode 250 and mode 260. Each dominant mode shape 200 includes an end effector 133, flexure hinges 132, linear comb drives 141 and folded spring based suspension structures 142.

Mode 210, mode 220 and mode 230 relate to the displacement of the end effector 133. Mode 240, mode 250 and mode 260 relate to the displacement of the folded spring based suspension structure 142.

In operation, the design of the fabricated parallel kinematic flexure based silicon-on-insulator MEMS stage with linear comb drives 100 achieves a high natural frequency and dominant modal direction are the translational degree of freedom in the XY plane. Mode 210 and mode 220 are translational modes. Mode 230 is a rotational mode. Mode 210 has the folded spring based suspension structure 142 deformations in anti-phase. Mode 220 has the folded spring based suspension structure 142 deformations in phase. Mode 220 produces a pure translation mode. Mode 210 is predominantly translational motion. Because of asymmetry in the load when folded spring based suspension structures 142 are deflected in opposite directions, a relatively small component of rotation is seen in mode 210. The guiding stiffness against in-plane rotations can be increased by equalizing the lengths of the flexure hinges 132 and increasing the distance between the flexure hinges 132. With such modifications, the stable operating voltage range of the linear comb drives 141 can be increased, thereby increasing the workspace of the stage and further reducing any parasitic rotation associated with the first modal deflection vector.

Figure 19:
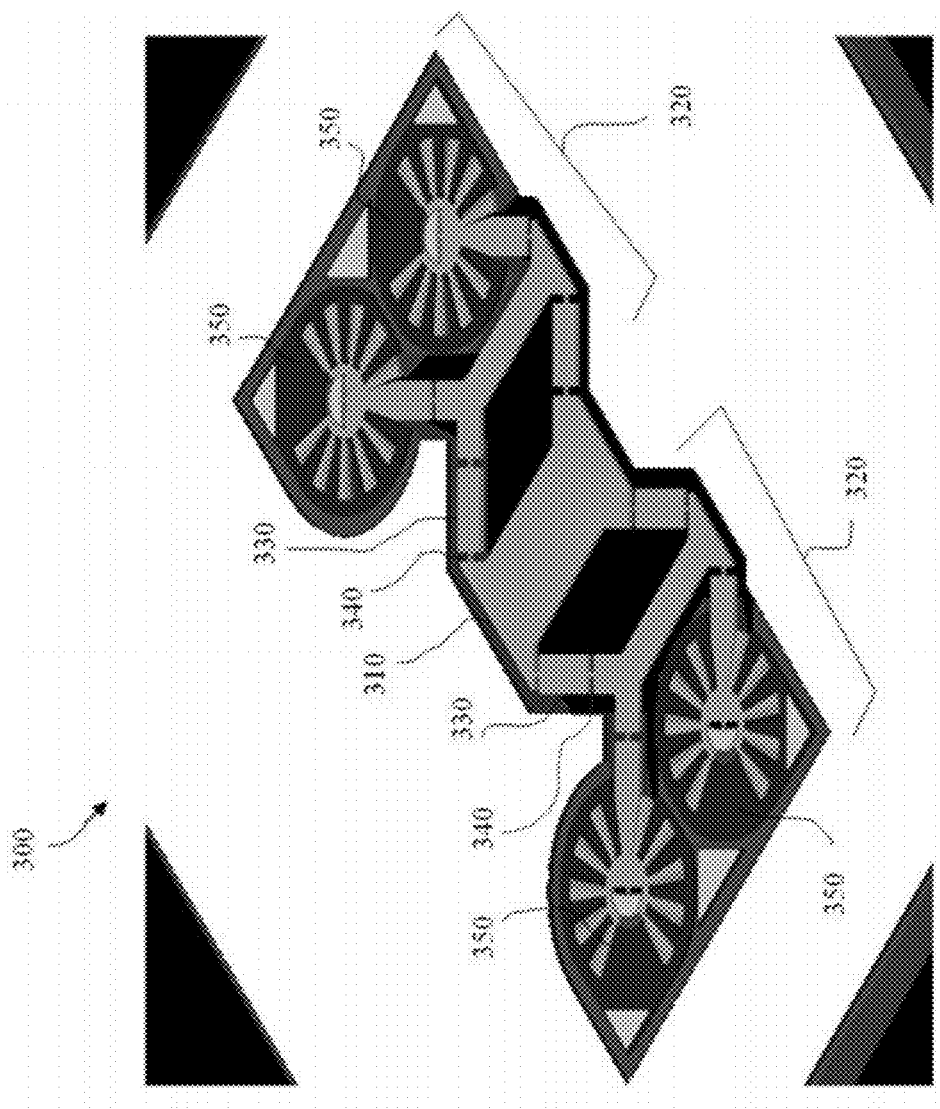

FIG. 19 illustrates a fabricated parallel kinematic flexure based silicon-on-insulator MEMS stage with rotary comb drives 300 according to an embodiment of the present invention. The fabricated parallel kinematic flexure based silicon-on-insulator MEMS stage with rotary comb drives 300 includes an end effector 310 and a two kinematic chains 320. The kinematic chains 320 each include two four bar linkage mechanisms 330, flexure hinges 340 and two rotary comb drives 350.

In the fabricated parallel kinematic flexure based silicon-on-insulator MEMS stage with rotary comb drives 300, the end effector 310 is mechanically connected to the flexure hinges 340. The flexure hinges 340 are mechanically connected to the four bar linkage mechanisms 330. The four bar linkage mechanisms 330 are mechanically connected to the rotary comb drives 350.

In operation, the kinematic chains 320 are joined together serially by two four bar linkage mechanisms 330 and are attached to two rotary comb drives 350. The orientation of the two kinematic chains 320 is such that the rotary comb drives 350 are parallel to each other. This allows the kinematic chains 320 to kinematically decouple the X axis. This also allows the fabricated parallel kinematic flexure based silicon-on-insulator MEMS stage with rotary comb drives 300 to have the same stiffness and bandwidth along any direction in the XY plane. The relationship of the actuation of the rotary comb drives 350 and the displacement of the fabricated parallel kinematic flexure based silicon-on-insulator MEMS stage with rotary comb drives 300 is proven by a diagonal Jacobian matrix (see Eq'n (1) in Example 2). In an embodiment, the rotary comb drives 350 have 10 pairs of individual rotor pair sets The torque generated by the rotary comb drives 350 deflects the flexure hinges 340 to displace the fabricated parallel kinematic flexure based silicon-on-insulator MEMS stage with rotary comb drives 300 through its workspace. The flexure hinges 340 in the four bar linkage mechanism 330 connected to the rotary comb drives 350 rotate by the same angle as that of the rotary comb drives 350. The flexure hinges 340 on the other four bar linkage mechanism 330 connected to the end effector 310 on the other kinematic chain 320 deflect by twice the angle as that of the rotary comb drives 350 to accommodate the motion of the actuated kinematic chain 320 which keeps the orientation of the end effector 310 fixed. The workspace through which the fabricated parallel kinematic flexure based silicon-on-insulator MEMS stage with rotary comb drives 300 can translate through is given by Equation (8) in Example 2.

Alternatively, the four bar linkage mechanism 330 is in the shape of a parallelogram.

In another embodiment, the four bar linkage mechanism 330 is in the shape of a square. Alternatively, the four bar linkage mechanism 330 is in the shape of a rectangle. Alternatively, the end effector 310 is attached to a plurality of four bar linkage mechanisms 330. In other embodiments, the end effector 310 is attached to one four bar linkage mechanism 330. In another embodiment, the end effector 310 is attached to a plurality of linear comb drives 350. Alternatively, the orientation of the two kinematic chains 320 is such that the rotary comb drives 350 are perpendicular to each other. In another embodiment, the orientation of the two kinematic chains 320 is such that the rotary comb drives 350 are at a 45 degree angle to each other. In other embodiments, the orientation of the two kinematic chains 320 is such that the rotary comb drives 350 are at a 30 degree angle to each other. Another embodiment has the orientation of the two kinematic chains 320 is such that the rotary comb drives 350 are at a 60 degree angle to each other.

Alternatively, the orientation of the two kinematic chains 320 is such that the rotary comb drives 350 are parallel to each other. This allows the kinematic chains 320 to kinematically decouple the Y axis. This also allows the fabricated parallel kinematic flexure based silicon-on-insulator MEMS stage with rotary comb drives 300 to have the same stiffness and bandwidth along any direction in the XY plane. In an alternative embodiment, the rotary comb drive 350 is used for sensing in the X direction. In another embodiment, the rotary comb drive 350 is used for sensing in the Y direction.

Example 3

Processes for Making High Precision SOI MEMS Stages

Figure 20:
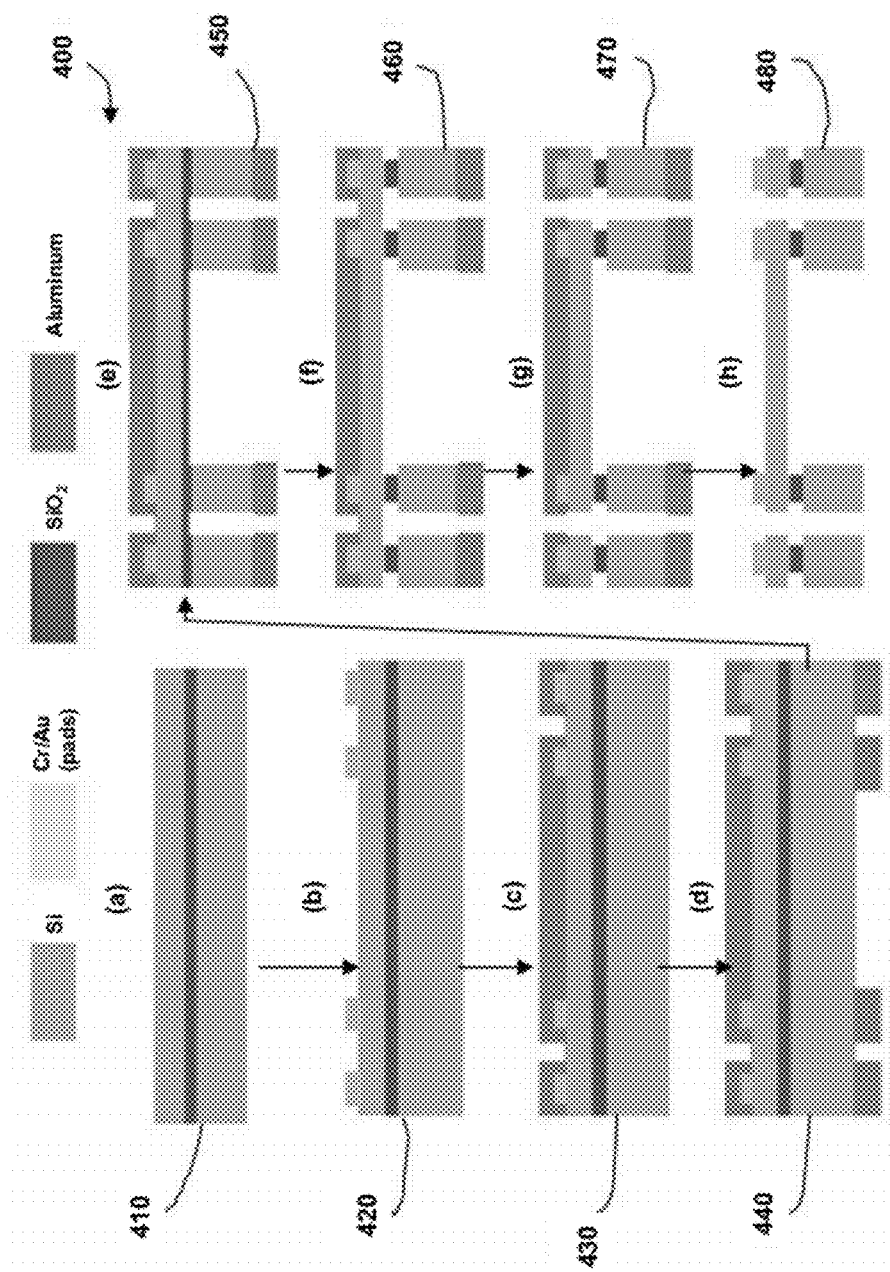

FIG. 20 illustrates a series of steps for the fabrication process of a parallel kinematic flexure based silicon-on-insulator MEMS stage with linear comb drives 400 according to an embodiment of the present invention. The starting substrate is a 100 millimeter silicon-on-insulator (SOI) wafer with a 50 micrometer thick device layer on top of a 2 micrometer buried oxide (BOX) layer. The underlying handle layer for the silicon-on-insulator (SOI) wafer is 500 micrometers thick. First, at step 410, the SOI wafer is diced into square dies each measuring 15 millimeters on each side. The next step, in step 420, is to fabricate a pattern on the device layer to provide the electrical connections to the device in the form of electrical contact pads. The electrical contact pads are patterned by photolithography followed by sputtering and lift-off. The electrical contact pads are composed of 392 nanometers of gold on top of an 8.5 nanometer thick chrome layer. The next step, in step 430, is to pattern the device layer aligned with the pad layer to serve as a deep reactive ion etching (DRIE) mask for etching the device layer. The device pattern is transferred from photoresist, AZ1518, to a 60 nanometer thick aluminum film by sputtering and lifting off aluminum from a praseodymium patterned substrate. Aluminum is the preferred material for this film because it acts as a good deep reactive ion etching (DRIE) mask for a deep etch, helps to achieve a straight side-wall profile, and helps to control the over etching in the deep reactive ion etching (DRIE) process. Then, in step 440, the device layer is protected by a spin coating and hard baking of a 5 micrometer thick layer of AZ1518 photoresist. The die is then flipped over and the backside layer pattern is aligned with the device layer pattern. The backside layer is comprised of a 60 nanometer thick aluminum film. Next, in step 450, the deep reactive ion etching (DRIE) Bosch process is used to remove the handle layer from the back of the device so as to expose the device. Further discussion of the DRIE Bosch process is omitted from this description so as not to unnecessarily complicate the invention that is disclosed herein. For a more detailed discussion of the DRIE Bosch process see U.S. Pat. No. 5,501,893 entitled "Method of anisotropically etching silicon" issued Mar. 26, 1996 in the name of inventors Laermer et al, which is specifically incorporated by reference to the extent not inconsistent with the disclosure herein. In step 460, the buried oxide (BOX) layer is removed by using buffered hydrofluoric acid. The sequence of this releasing step is crucial. If done out of order the residual stresses from the silicon dioxide film will destroy the device when the device is being fabricated in the deep reactive ion etching (DRIE) process. In step 470, the device layer of the die is subjected to the Bosch process for a second time to etch the stage pattern through the device layer. Finally, in step 480, the aluminum films that served as masks for the Bosch process are removed by using aluminum etchant.

Processes provided herein are suited to materials having a wide range of thicknesses, such as a user selected thicknesses are in the starting substrate silicon-on-insulator wafer, the device layer and/or the buried oxide (BOX) layer.

In another embodiment, step 420's electrical pads are patterned by a number of different methods. Also, the thickness of the gold on top and chrome are variable.

Other embodiments of step 430 use metals other than aluminum. There are also different thicknesses used for these various metals.

Alternatively, in step 440, different thicknesses of photoresist are used. The backside layer is made with a number of various types of metals and materials. There are also different thicknesses used of photoresist and other metals used on the backside layer.

In other embodiments, step 480 uses any other method to remove the aluminum films as known in the art.

Alternatively, the fabrication process for a parallel kinematic flexure based silicon-on-insulator MEMS stage with linear comb drives 400 is done in the following order: First, at step 410, the SOI wafer is optionally diced into square dies each measuring 15 millimeters on each side. The next step 430 patterns the device layer aligned with the pad layer to serve as a deep reactive ion etching (DRIE) mask for etching the device layer. The device pattern is transferred from photoresist, AZ1518, to a 60 nanometer thick aluminum film by sputtering and lifting off aluminum from a praseodymium patterned substrate. Aluminum is the preferred material for this film because it acts as a good deep reactive ion etching (DRIE) mask for a deep etch, helps to achieve a straight side-wall profile, and helps to control the over etching in the deep reactive ion etching (DRIE) process. Then, in step 440, the device layer is protected by a spin coating and hard baking of a 5 micrometer thick layer of AZ1518 photoresist. The die is then flipped over and the backside layer pattern is aligned with the device layer pattern. The backside layer is comprised of a 60 nanometer thick aluminum film. Next, in step 450, the deep reactive ion etching (DRIE) Bosch process is used to remove the handle layer from the back of the device so as to expose the device. In step 460, the buried oxide (BOX) layer is removed by using buffered hydrofluoric acid. The sequence of this releasing step is crucial. If done out of order the residual stresses from the silicon dioxide film will destroy the device when the device is being fabricated in the deep reactive ion etching (DRIE) process. In step 470, the device layer of the die is subjected to the Bosch process for a second time to etch the stage pattern through the device layer. In the next step, in step 480, the aluminum films that served as masks for the Bosch process are removed by using aluminum etchant. Finally, in step 420, a pattern is fabricated on the device layer to provide the electrical connections to the device in the form of electrical contact pads. The electrical contact pads are patterned by photolithography followed by sputtering and lift-off. The electrical contact pads are composed of 392 nanometers of gold on top of an 8.5 nanometer thick chrome layer.

In another embodiment, the fabrication process for a parallel kinematic flexure based silicon-on-insulator MEMS stage with linear comb drives 400 is done in the following order: First, at step 410, the SOI wafer is diced into square dies each measuring 15 millimeters on each side. Then, in step 440, the device layer is protected by a spin coating and hard baking of a 5 micrometer thick layer of AZ1518 photoresist. The die is then flipped over and the backside layer pattern is aligned with the device layer pattern. The backside layer is comprised of a 60 nanometer thick aluminum film. The next step, in step 430, is to pattern the device layer aligned with the pad layer to serve as a deep reactive ion etching (DRIE) mask for etching the device layer. The device pattern is transferred from photoresist, AZ1518, to a 60 nanometer thick aluminum film by sputtering and lifting off aluminum from a praseodymium patterned substrate. Aluminum is the preferred material for this film because it acts as a good deep reactive ion etching (DRIE) mask for a deep etch, helps to achieve a straight side-wall profile, and helps to control the over etching in the deep reactive ion etching (DRIE) process. Next, in step 450, the deep reactive ion etching (DRIE) Bosch process is used to remove the handle layer from the back of the device so as to expose the device. In step 460, the buried oxide (BOX) layer is removed by using buffered hydrofluoric acid. The sequence of this releasing step is crucial. If done out of order the residual stresses from the silicon dioxide film will destroy the device when the device is being fabricated in the deep reactive ion etching (DRIE) process. In step 470, the device layer of the die is subjected to the Bosch process for a second time to etch the stage pattern through the device layer. In the next step, in step 480, the aluminum films that served as masks for the Bosch process are removed by using aluminum etchant. Finally, in step 420, a pattern is fabricated on the device layer to provide the electrical connections to the device in the form of electrical contact pads. The electrical contact pads are patterned by photolithography followed by sputtering and lift-off. The electrical contact pads are composed of 392 nanometers of gold on top of an 8.5 nanometer thick chrome layer.

In other embodiments, the fabrication process for a parallel kinematic flexure based silicon-on-insulator MEMS stage with linear comb drives 400 is done in the following order: First, at step 410, the SOI wafer is diced into square dies each measuring 15 millimeters on each side. The next step, in step 420, is to fabricate a pattern on the device layer to provide the electrical connections to the device in the form of electrical contact pads. The electrical contact pads are patterned by photolithography followed by sputtering and lift-off. The electrical contact pads are composed of 392 nanometers of gold on top of an 8.5 nanometer thick chrome layer. Then, in step 440, the device layer is protected by a spin coating and hard baking of a 5 micrometer thick layer of AZ1518 photoresist. The die is then flipped over and the backside layer pattern is aligned with the device layer pattern. The backside layer is comprised of a 60 nanometer thick aluminum film. The next step, in step 430, is to pattern the device layer aligned with the pad layer to serve as a deep reactive ion etching (DRIE) mask for etching the device layer. The device pattern is transferred from photoresist, AZ1518, to a 60 nanometer thick aluminum film by sputtering and lifting off aluminum from a praseodymium patterned substrate. Aluminum is the preferred material for this film because it acts as a good deep reactive ion etching (DRIE) mask for a deep etch, helps to achieve a straight side-wall profile, and helps to control the over etching in the deep reactive ion etching (DRIE) process. Next, in step 450, the deep reactive ion etching (DRIE) Bosch process is used to remove the handle layer from the back of the device so as to expose the device. In step 460, the buried oxide (BOX) layer is removed by using buffered hydrofluoric acid. The sequence of this releasing step is crucial. If done out of order the residual stresses from the silicon dioxide film will destroy the device when the device is being fabricated in the deep reactive ion etching (DRIE) process. In step 470, the device layer of the die is subjected to the Bosch process for a second time to etch the stage pattern through the device layer. Finally, in step 480, the aluminum films that served as masks for the Bosch process are removed by using aluminum etchant.

Alternatively, the fabrication process for a parallel kinematic flexure based silicon-on-insulator MEMS stage with linear comb drives 400 is done in the following order: First, at step 410, the SOI wafer is diced into square dies each measuring 15 millimeters on each side. The next step, in step 420, is to fabricate a pattern on the device layer to provide the electrical connections to the device in the form of electrical contact pads. The electrical contact pads are patterned by photolithography followed by sputtering and lift-off. The electrical contact pads are composed of 392 nanometers of gold on top of an 8.5 nanometer thick chrome layer. The next step, in step 430, is to pattern the device layer aligned with the pad layer to serve as a deep reactive ion etching (DRIE) mask for etching the device layer. The device pattern is transferred from photoresist, AZ1518, to a 60 nanometer thick aluminum film by sputtering and lifting off aluminum from a praseodymium patterned substrate. Aluminum is the preferred material for this film because it acts as a good deep reactive ion etching (DRIE) mask for a deep etch, helps to achieve a straight side-wall profile, and helps to control the over etching in the deep reactive ion etching (DRIE) process. Then, in step 440, the device layer is protected by a spin coating and hard baking of a 5 micrometer thick layer of AZ1518 photoresist. The die is then flipped over and the backside layer pattern is aligned with the device layer pattern. The backside layer is comprised of a 60 nanometer thick aluminum film. In step 470, the device layer of the die is subjected to the Bosch process for a second time to etch the stage pattern through the device layer. Next, in step 450, the deep reactive ion etching (DRIE) Bosch process is used to remove the handle layer from the back of the device so as to expose the device. In step 460, the buried oxide (BOX) layer is removed by using buffered hydrofluoric acid. The sequence of this releasing step is crucial. If done out of order the residual stresses from the silicon dioxide film will destroy the device when the device is being fabricated in the deep reactive ion etching (DRIE) process. Finally, in step 480, the aluminum films that served as masks for the Bosch process are removed by using aluminum etchant.

In another embodiment, the fabrication process for a parallel kinematic flexure based silicon-on-insulator MEMS stage with linear comb drives 400 is done in the following order: First, at step 410, the SOI wafer is diced into square dies each measuring 15 millimeters on each side. The next step, in step 430, is to pattern the device layer aligned with the pad layer to serve as a deep reactive ion etching (DRIE) mask for etching the device layer. The device pattern is transferred from photoresist, AZ1518, to a 60 nanometer thick aluminum film by sputtering and lifting off aluminum from a praseodymium patterned substrate. Aluminum is the preferred material for this film because it acts as a good deep reactive ion etching (DRIE) mask for a deep etch, helps to achieve a straight side-wall profile, and helps to control the over etching in the deep reactive ion etching (DRIE) process. Then, in step 440, the device layer is protected by a spin coating and hard baking of a 5 micrometer thick layer of AZ1518 photoresist. The die is then flipped over and the backside layer pattern is aligned with the device layer pattern. The backside layer is comprised of a 60 nanometer thick aluminum film. In step 470, the device layer of the die is subjected to the Bosch process for a second time to etch the stage pattern through the device layer. Next, in step 450, the deep reactive ion etching (DRIE) Bosch process is used to remove the handle layer from the back of the device so as to expose the device. In step 460, the buried oxide (BOX) layer is removed by using buffered hydrofluoric acid. The sequence of this releasing step is crucial. If done out of order the residual stresses from the silicon dioxide film will destroy the device when the device is being fabricated in the deep reactive ion etching (DRIE) process. In the next step, in step 480, the aluminum films that served as masks for the Bosch process are removed by using aluminum etchant. Finally, in step 420, a pattern is fabricated on the device layer to provide the electrical connections to the device in the form of electrical contact pads. The electrical contact pads are patterned by photolithography followed by sputtering and lift-off. The electrical contact pads are composed of 392 nanometers of gold on top of an 8.5 nanometer thick chrome layer.

Alternatively, the fabrication process for a parallel kinematic flexure based silicon-on-insulator MEMS stage with linear comb drives 400 is done in the following order: First, at step 410, the SOI wafer is diced into square dies each measuring 15 millimeters on each side. Then, in step 440, the device layer is protected by a spin coating and hard baking of a 5 micrometer thick layer of AZ1518 photoresist. The die is then flipped over and the backside layer pattern is aligned with the device layer pattern. The backside layer is comprised of a 60 nanometer thick aluminum film. The next step, in step 430, is to pattern the device layer aligned with the pad layer to serve as a deep reactive ion etching (DRIE) mask for etching the device layer. The device pattern is transferred from photoresist, AZ1518, to a 60 nanometer thick aluminum film by sputtering and lifting off aluminum from a praseodymium patterned substrate. Aluminum is the preferred material for this film because it acts as a good deep reactive ion etching (DRIE) mask for a deep etch, helps to achieve a straight side-wall profile, and helps to control the over etching in the deep reactive ion etching (DRIE) process. In step 470, the device layer of the die is subjected to the Bosch process for a second time to etch the stage pattern through the device layer. Next, in step 450, the deep reactive ion etching (DRIE) Bosch process is used to remove the handle layer from the back of the device so as to expose the device. In step 460, the buried oxide (BOX) layer is removed by using buffered hydrofluoric acid. The sequence of this releasing step is crucial. If done out of order the residual stresses from the silicon dioxide film will destroy the device when the device is being fabricated in the deep reactive ion etching (DRIE) process. In the next step, in step 480, the aluminum films that served as masks for the Bosch process are removed by using aluminum etchant. Finally, in step 420, a pattern is fabricated on the device layer to provide the electrical connections to the device in the form of electrical contact pads. The electrical contact pads are patterned by photolithography followed by sputtering and lift-off. The electrical contact pads are composed of 392 nanometers of gold on top of an 8.5 nanometer thick chrome layer.

In other embodiments, the fabrication process for a parallel kinematic flexure based silicon-on-insulator MEMS stage with linear comb drives 400 is done in the following order: First, at step 410, the SOI wafer is diced into square dies each measuring 15 millimeters on each side. The next step, in step 420, is to fabricate a pattern on the device layer to provide the electrical connections to the device in the form of electrical contact pads. The electrical contact pads are patterned by photolithography followed by sputtering and lift-off. The electrical contact pads are composed of 392 nanometers of gold on top of an 8.5 nanometer thick chrome layer. Then, in step 440, the device layer is protected by a spin coating and hard baking of a 5 micrometer thick layer of AZ1518 photoresist. The die is then flipped over and the backside layer pattern is aligned with the device layer pattern. The backside layer is comprised of a 60 nanometer thick aluminum film. The next step, in step 430, is to pattern the device layer aligned with the pad layer to serve as a deep reactive ion etching (DRIE) mask for etching the device layer. The device pattern is transferred from photoresist, AZ1518, to a 60 nanometer thick aluminum film by sputtering and lifting off aluminum from a praseodymium patterned substrate. Aluminum is the preferred material for this film because it acts as a good deep reactive ion etching (DRIE) mask for a deep etch, helps to achieve a straight side-wall profile, and helps to control the over etching in the deep reactive ion etching (DRIE) process. In step 470, the device layer of the die is subjected to the Bosch process for a second time to etch the stage pattern through the device layer. Next, in step 450, the deep reactive ion etching (DRIE) Bosch process is used to remove the handle layer from the back of the device so as to expose the device. In step 460, the buried oxide (BOX) layer is removed by using buffered hydrofluoric acid. The sequence of this releasing step is crucial. If done out of order the residual stresses from the silicon dioxide film will destroy the device when the device is being fabricated in the deep reactive ion etching (DRIE) process. Finally, in step 480, the aluminum films that served as masks for the Bosch process are removed by using aluminum etchant.

Figure 21:
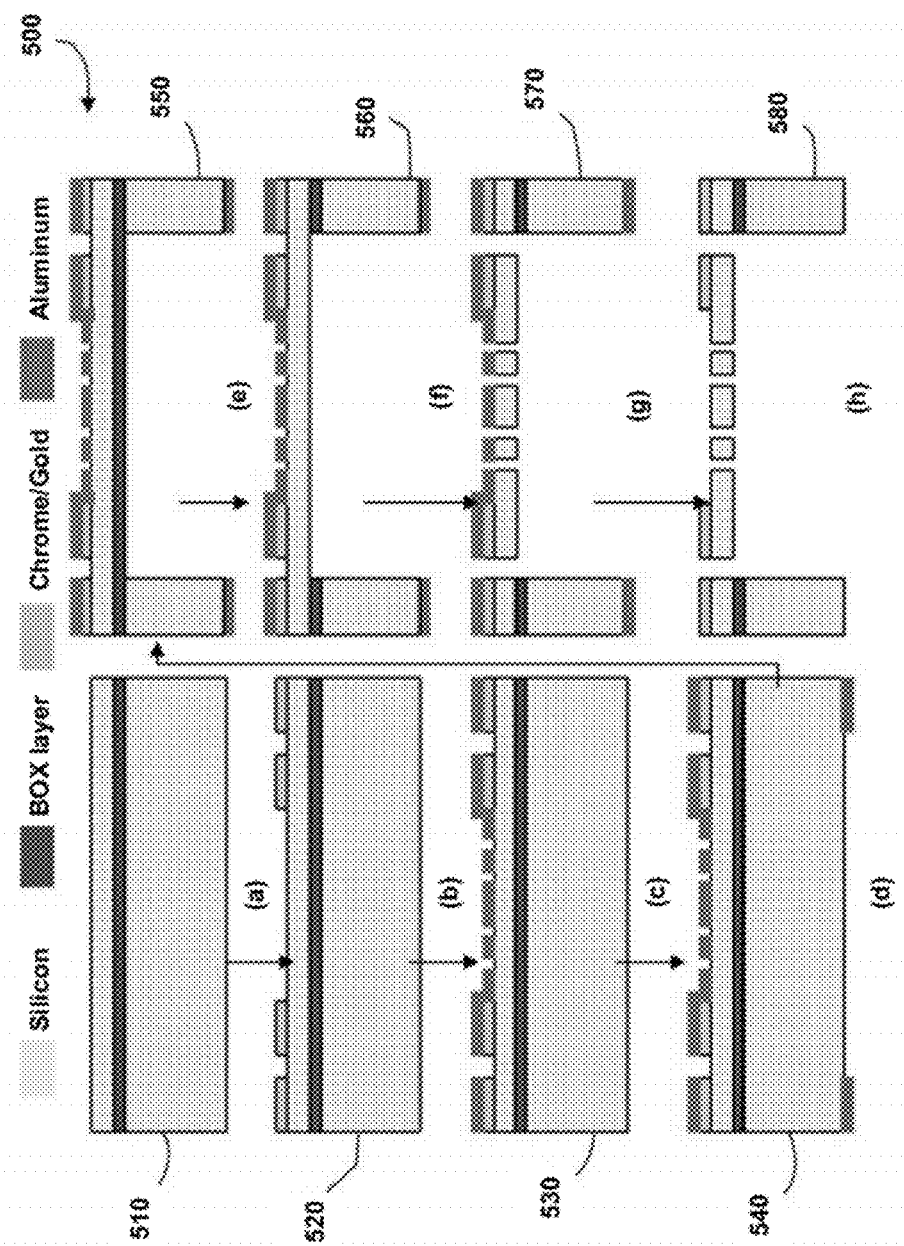

FIG. 21 illustrates a series of steps for the fabrication process of a parallel kinematic flexure based silicon-on-insulator MEMS stage with rotary comb drives 500 according to an embodiment of the present invention. The starting substrate is a 100 millimeter silicon-on-insulator (SOI) wafer with a 50 micrometer thick device layer on top of a 2 micrometer buried oxide (BOX) layer. The underlying handle layer for the silicon-on-insulator (SOI) wafer is 500 micrometers thick. First, at step 510, the SOI wafer is diced into square dies each measuring 15 millimeters on each side. Next, in step 520, electrical contact pads for the micro-positioning stage are fabricated by sputtering 17 nanometers of chrome and 392 nanometers of gold on the device layer patterned with a 2 micrometer thick AZ1518 photoresist. This is followed by a lift-off process to remove the sputtered metal from the areas other than the pads. Then, in step 530, the device layer is patterned by using AZ1518 photoresist with the stage mechanism structure by using an aluminum lift-off process. The thickness of the aluminum layer is 60 nanometers. In step 540, the handle layer is patterned by using a similar aluminum lift-off process. In step 550, the patterned handle layer is etched in inductively coupled plasma deep reactive ion etching (ICP-DRIE) to anisotropically remove the exposed silicon, otherwise known as the Bosch process. Then, in step 560, the resulting exposed silicon dioxide film is removed by using concentrated hydrofluoric acid. In step 570, the stage mechanism is released by etching the device side in ICP-DRIE. Finally, in step 580, aluminum etchant is used to remove the aluminum mask.

Processes provided herein are compatible over a large range of dimensions, such as material or layer thickness (e.g., SOI wafer, device layer, BOX layer, handle layer, masks, etc.). Alternatively, in step 510, different thicknesses are used in the starting substrate silicon-on-insulator wafer. There are also different thicknesses for the device layer and the buried oxide (BOX) layer.

In another embodiment, step 520's electrical pads are patterned by a number of different methods. Also, the thickness of the gold on top and chrome are variable.

Other embodiments of step 530, different thicknesses of photoresist are used. The backside layer is made with a number of various types of metals and materials. There are also different thicknesses used of photoresist and other metals used on the backside layer.

Alternatively, in step 540 use metals other than aluminum. There are also different thicknesses used for these various metals.

Alternatively, in step 560, the resulting exposed silicon dioxide film is removed by using other types of acid.

In other embodiments, step 580 uses any other method to remove the aluminum films.

Alternatively, the fabrication process for a parallel kinematic flexure based silicon-on-insulator MEMS stage with rotary comb drives 500 is done in the following order: First, at step 510, the SOI wafer is diced into square dies each measuring 15 millimeters on each side. Then, in step 530, the device layer is patterned by using AZ1518 photoresist with the stage mechanism structure by using an aluminum lift-off process. The thickness of the aluminum layer is 60 nanometers. In step 540, the handle layer is patterned by using a similar aluminum lift-off process. In step 550, the patterned handle layer is etched in inductively coupled plasma deep reactive ion etching (ICP-DRIE) to anisotropically remove the exposed silicon, otherwise known as the Bosch process. Then, in step 560, the resulting exposed silicon dioxide film is removed by using concentrated hydrofluoric acid. In step 570, the stage mechanism is released by etching the device side in ICP-DRIE. In the next step, step 580, aluminum etchant is used to remove the aluminum mask. Finally, in step 520, electrical contact pads for the micro-positioning stage are fabricated by sputtering 17 nanometers of chrome and 392 nanometers of gold on the device layer patterned with a 2 micrometer thick AZ1518 photoresist. This is followed by a lift-off process to remove the sputtered metal from the areas other than the pads.

In another embodiment, the fabrication process for a parallel kinematic flexure based silicon-on-insulator MEMS stage with rotary comb drives 500 is done in the following order: First, at step 510, the SOI wafer is diced into square dies each measuring 15 millimeters on each side. In step 540, the handle layer is patterned by using a similar aluminum lift-off process. Then, in step 530, the device layer is patterned by using AZ1518 photoresist with the stage mechanism structure by using an aluminum lift-off process. The thickness of the aluminum layer is 60 nanometers. In step 550, the patterned handle layer is etched in inductively coupled plasma deep reactive ion etching (ICP-DRIE) to anisotropically remove the exposed silicon, otherwise known as the Bosch process. Then, in step 560, the resulting exposed silicon dioxide film is removed by using concentrated hydrofluoric acid. In step 570, the stage mechanism is released by etching the device side in ICP-DRIE. In the next step, step 580, aluminum etchant is used to remove the aluminum mask. Finally, in step 520, electrical contact pads for the micro-positioning stage are fabricated by sputtering 17 nanometers of chrome and 392 nanometers of gold on the device layer patterned with a 2 micrometer thick AZ1518 photoresist. This is followed by a lift-off process to remove the sputtered metal from the areas other than the pads.

In other embodiments, the fabrication process for a parallel kinematic flexure based silicon-on-insulator MEMS stage with rotary comb drives 500 is done in the following order: First, at step 510, the SOI wafer is diced into square dies each measuring 15 millimeters on each side. Next, in step 520, electrical contact pads for the micro-positioning stage are fabricated by sputtering 17 nanometers of chrome and 392 nanometers of gold on the device layer patterned with a 2 micrometer thick AZ1518 photoresist. This is followed by a lift-off process to remove the sputtered metal from the areas other than the pads. In step 540, the handle layer is patterned by using a similar aluminum lift-off process. Then, in step 530, the device layer is patterned by using AZ1518 photoresist with the stage mechanism structure by using an aluminum lift-off process. The thickness of the aluminum layer is 60 nanometers. In step 550, the patterned handle layer is etched in inductively coupled plasma deep reactive ion etching (ICP-DRIE) to anisotropically remove the exposed silicon, otherwise known as the Bosch process. Then, in step 560, the resulting exposed silicon dioxide film is removed by using concentrated hydrofluoric acid. In step 570, the stage mechanism is released by etching the device side in ICP-DRIE. Finally, in step 580, aluminum etchant is used to remove the aluminum mask.

Alternatively, the fabrication process for a parallel kinematic flexure based silicon-on-insulator MEMS stage with rotary comb drives 500 is done in the following order: First, at step 510, the SOI wafer is diced into square dies each measuring 15 millimeters on each side. Next, in step 520, electrical contact pads for the micro-positioning stage are fabricated by sputtering 17 nanometers of chrome and 392 nanometers of gold on the device layer patterned with a 2 micrometer thick AZ1518 photoresist. This is followed by a lift-off process to remove the sputtered metal from the areas other than the pads. Then, in step 530, the device layer is patterned by using AZ1518 photoresist with the stage mechanism structure by using an aluminum lift-off process. The thickness of the aluminum layer is 60 nanometers. In step 540, the handle layer is patterned by using a similar aluminum lift-off process. In step 570, the stage mechanism is released by etching the device side in ICP-DRIE. In step 550, the patterned handle layer is etched in inductively coupled plasma deep reactive ion etching (ICP-DRIE) to anisotropically remove the exposed silicon, otherwise known as the Bosch process. Then, in step 560, the resulting exposed silicon dioxide film is removed by using concentrated hydrofluoric acid. Finally, in step 580, aluminum etchant is used to remove the aluminum mask.

In another embodiment, the fabrication process for a parallel kinematic flexure based silicon-on-insulator MEMS stage with rotary comb drives 500 is done in the following order: First, at step 510, the SOI wafer is diced into square dies each measuring 15 millimeters on each side. Then, in step 530, the device layer is patterned by using AZ1518 photoresist with the stage mechanism structure by using an aluminum lift-off process. The thickness of the aluminum layer is 60 nanometers. In step 540, the handle layer is patterned by using a similar aluminum lift-off process. In step 570, the stage mechanism is released by etching the device side in ICP-DRIE. In step 550, the patterned handle layer is etched in inductively coupled plasma deep reactive ion etching (ICP-DRIE) to anisotropically remove the exposed silicon, otherwise known as the Bosch process. Then, in step 560, the resulting exposed silicon dioxide film is removed by using concentrated hydrofluoric acid. Then, in step 580, aluminum etchant is used to remove the aluminum mask. Finally, in step 520, electrical contact pads for the micro-positioning stage are fabricated by sputtering 17 nanometers of chrome and 392 nanometers of gold on the device layer patterned with a 2 micrometer thick AZ1518 photoresist. This is followed by a lift-off process to remove the sputtered metal from the areas other than the pads.

Alternatively, the fabrication process for a parallel kinematic flexure based silicon-on-insulator MEMS stage with rotary comb drives 500 is done in the following order: First, at step 510, the SOI wafer is diced into square dies each measuring 15 millimeters on each side. In step 540, the handle layer is patterned by using a similar aluminum lift-off process. Then, in step 530, the device layer is patterned by using AZ1518 photoresist with the stage mechanism structure by using an aluminum lift-off process. The thickness of the aluminum layer is 60 nanometers. In step 570, the stage mechanism is released by etching the device side in ICP-DRIE. In step 550, the patterned handle layer is etched in inductively coupled plasma deep reactive ion etching (ICP-DRIE) to anisotropically remove the exposed silicon, otherwise known as the Bosch process. Then, in step 560, the resulting exposed silicon dioxide film is removed by using concentrated hydrofluoric acid. Then, in step 580, aluminum etchant is used to remove the aluminum mask. Finally, in step 520, electrical contact pads for the micro-positioning stage are fabricated by sputtering 17 nanometers of chrome and 392 nanometers of gold on the device layer patterned with a 2 micrometer thick AZ1518 photoresist. This is followed by a lift-off process to remove the sputtered metal from the areas other than the pads.

In other embodiments, the fabrication process for a parallel kinematic flexure based silicon-on-insulator MEMS stage with rotary comb drives 500 is done in the following order: First, at step 510, the SOI wafer is diced into square dies each measuring 15 millimeters on each side. Next, in step 520, electrical contact pads for the micro-positioning stage are fabricated by sputtering 17 nanometers of chrome and 392 nanometers of gold on the device layer patterned with a 2 micrometer thick AZ1518 photoresist. This is followed by a lift-off process to remove the sputtered metal from the areas other than the pads. In step 540, the handle layer is patterned by using a similar aluminum lift-off process. Then, in step 530, the device layer is patterned by using AZ1518 photoresist with the stage mechanism structure by using an aluminum lift-off process. The thickness of the aluminum layer is 60 nanometers. In step 570, the stage mechanism is released by etching the device side in ICP-DRIE. In step 550, the patterned handle layer is etched in inductively coupled plasma deep reactive ion etching (ICP-DRIE) to anisotropically remove the exposed silicon, otherwise known as the Bosch process. Then, in step 560, the resulting exposed silicon dioxide film is removed by using concentrated hydrofluoric acid. Finally, in step 580, aluminum etchant is used to remove the aluminum mask.

Other conventional methods known in the art do not access devices having functional parameters of the devices made by the processes disclosed herein. In particular, the parallel kinematic flexure based silicon-on-insulator MEMS stages provides many advantages compared to those stages based on an XY MEMS micro positioning stage, the serial kinematic design, the parallel kinematic mechanisms used on a macro scale, and other methods.

The parallel kinematic flexure based silicon-on-insulator MEMS stage is a combination of new products and new fabrication technologies used to manufacture those products. Compared to the other existing designs both in micro and meso scales, these stages have new designs based on parallel kinematic mechanisms (PKM) and are fabricated with new technologies. In optional embodiments, these stages feature a monolithic design, parallel-kinematics mechanism, parallelogram four-bar linkages and flexure hinges.

These parallel kinematic flexure based silicon-on-insulator MEMS stages are extremely beneficial in many applications like scanning probe microscopy, E-jet-printing, near-field optic sensing, cell probing, and material characterization where compact size, fast response, large work zones and nano-scale positioning capabilities are required. Additionally, since the fabrication process for these MEMS stages are very similar to the batch fabrication processes used in the semi-conductor industry, the per unit cost of these stages are extremely reasonable and are much less than similar stages manufactured using conventional assembly processes.

Example 4

Electrostatically Actuated Cantilever with SOI-MEMS Parallel Kinematic XY Stage

This example presents the design, analysis, fabrication and characterization of an active cantilever device integrated with a high-bandwidth two degree-of-freedom translational (XY) micro positioning stage. The cantilever is actuated electrostatically through a separate electrode that is fabricated underneath the cantilever. Torsion bars that connect the cantilever to the rest of the structure provide the required compliance for cantilever's out-of-plane rotation. The active cantilever is carried by a micro-positioning stage, thereby providing high-bandwidth scanning, positioning and manipulation capability in three dimensions. The design of the MEMS (Micro-Electro-Mechanical Systems) stage is based on a parallel kinematic mechanism (PKM). The PKM design decouples the motion in the X and Y directions while allowing for an increased motion range with linear kinematics in the operating region (or workspace). The truss-like structure of the PKM also results in increased stiffness and reduced mass of the stage. The integrated cantilever device is fabricated on a Silicon-On-Insulator (SOI) wafer using surface micromachining and deep reactive ion etching (DRIE) processes. The actuation electrode of the cantilever is fabricated on the handle layer, while the cantilever and XY stage are at the device layer of the SOI wafer. Two sets of electrostatic linear comb drives are used to actuate the stage mechanism in X and Y directions. In an embodiment, the cantilever provides an out-of-plane motion of 7 microns at 4.5V, while the XY stage provides a motion range of 24 microns in each direction at the driving voltage of 180V. The resonant frequency of the XY stage under ambient conditions is 2090 Hz. A high quality factor (~210) is achieved from this parallel kinematics XY stage. The fabricated stages will be adapted as chip-scale manufacturing and metrology devices for nanomanfacturing and nanometrology applications.

The development of microcantilever-based devices has played a key role in advances of nanotechnology over the last two decades. By using a microcantilever with a sharp tip as a sensor, these devices can sense extremely small physical signals, such as tip-sample tunneling current in scanning tunneling microscope (STM) [1, 2] and interatomic forces atomic force microscope (AFM) [3]. Their capability of manipulation at atomic scale, together with the capability of sensing a variety of physical signals in diverse environments brings a dramatic impact in fields of biology, materials science, tribology, surface physics, and medical diagnosis [4, 5]. By vibrating the cantilever and detecting the change of its resonant frequency and vibrational magnitude, cantilever based device are used as chemical sensor [6, 7] to detect some specific chemicals absorbed by the pretreated cantilever. Microcantilever-based devices are also widely used in micro/nano fabrication applications, such as dip pen lithography [8], thermal embossing [9, 10], local oxidation, and resist exposure [11].

Although in many applications cantilevers are used as passive sensors that are bent by an external force, active cantilevers offer additional advantages and capabilities, such as self-excitation, individual tip-substrate separation adjustment, especially when used in a cantilever array. Different technologies have been used to provide actuation to micro cantilever devices, including electro-thermal actuator [12], electromagnetic actuator [13], piezoelectric-actuators [14, 15], shape memory alloy actuator [16], and electrostatic actuators [17]. Among these actuation technologies, electrostatic actuators offer some unique features, compared with other actuation techniques, because of their simplicity and the ease with which their fabrication is integrated with that of the rest of the structure. Unlike the other actuation technologies, electrostatic actuators avoid extra processing steps and additional materials, such as shape memory alloys, piezoelectric film/actuators, electrically heated resistors, or magnets/coils.

A typical cantilever-based instrument or system is configured with a micro-scale cantilever as the sensor or the functional manipulator, and a meso-scale flexure-based piezoelectric actuator driven nano-positioning stage. Although the cantilever can work at extremely high frequency (>10 kHz), the relatively slow nano-positioner limits the overall scanning speed and becomes the bottleneck in a high throughput system, due to its excess mass. Further, in such a configuration, when using multiple cantilevers, all the cantilevers undergo the same relative displacement with respect to the substrate they are processing, making it difficult to exploit the inherent parallelism of multi-cantilever system. In contrast, a micro-scale MEMS positioning device can achieve much higher bandwidth due to the scaling effects. The widely-used XY stage designs [18-22] include four identical comb drive structures that are placed around the end effector, each perpendicular to its neighbor. The end-effector or moving platform is connected to the four comb actuators by long slender beams. When the stage is actuated in the X direction, the long beam along the Y direction acts as a leaf spring to accommodate the motion of the X axis and vice versa. Due to such a coupled structure design, the cross-talk between the X and Y axes can cause problems such as side instability of comb drives and limited motion range. Reducing the stiffness of the leaf springs reduces the cross-talk, alleviating some of its negative effects. However, the decreases in stiffness of the beams lead to non-deterministic motions along with undesirable end-effector rotations in the XY plane. Additionally reduced stiffness leads to lower resonant frequencies and complex dynamics with multiple modes [23] in a fairly narrow frequency band. Besides the above designs, serial kinematic designs are introduced by [24, 25]. The two degrees of freedom are realized by the serial combination of two single DOF systems, in which the inner axis is embedded into the moving frame of the outer axis. Thus the moving inertia load of two axes is different. Also, the additional mass significantly decreases the natural frequency as well as response time of the outer axis. Additionally, electrical isolation can be a problem. Monolithic parallel kinematic mechanisms are well suited for silicon-based micro positioning devices. Compared with serial kinematic designs, parallel kinematics mechanisms can significantly increase the natural frequency of designed system due to their high structure stiffness and low inertia, which accrue from their truss like structures. Furthermore, if appropriately designed, PKMs can result in configurations with nearly complete decoupling of the actuation effect and better position accuracy. Micro positioning stages based on parallel kinematic mechanism with different degree-of-freedom [26-31] demonstrate good performance capabilities in their motion range, bandwidth, and resolution [26-32].

This example provides an electrostatically actuated active cantilever device that operates in three degree of freedom. The chip-scale cantilever device can address various applications including, but not limited to, high-throughput nanoscale metrology, imaging and manufacturing. In this example, a parallel kinematic micro positioning stage provides the cantilever with high-bandwidth motion in the XY plane. Linear comb drives along with folded springs provides linear actuation. Parallelogram four-bar linkages absorb the coupling motion between the two axes while simultaneously confining the orientation of the end-effector. The cantilever is connected to the stage through torsion bars that provide required compliance for the cantilever's out-of-plane motion. The actuation is provided by a tilt plate actuator that is on the top of the cantilever. The overall device is fabricated on a silicon-on-isolator (SOI) die with a 50 μm thick device layer and a 3 μm thick buried oxide (BOX) layer. The high aspect-ratio structures, such as comb fingers, torsion bars and cantilevers are fabricated by deep reactive ion etching (DRIE). The actuation electrode for the out-of-plane motion of the cantilever is realized on the handle layer, while the cantilever itself and XY stage are in the device layer of the SOI die. The handle layer beneath the device is etched away except for the tilt plate electrode for actuating the cantilever. This facilitates use of the stage in applications that require access to the positioning platform from both top and bottom directions. The fabricated device provides an out-of-plane cantilever motion of 7 μm at 4.5V, with a motion range of more than 24 μm in the X and Y directions at a driving voltage of 180V. The resonant frequency of the XY scanning under ambient conditions is 2090 Hz. A high quality factor (~210) is achieved from this XY positioning stage.

Figure 22A:
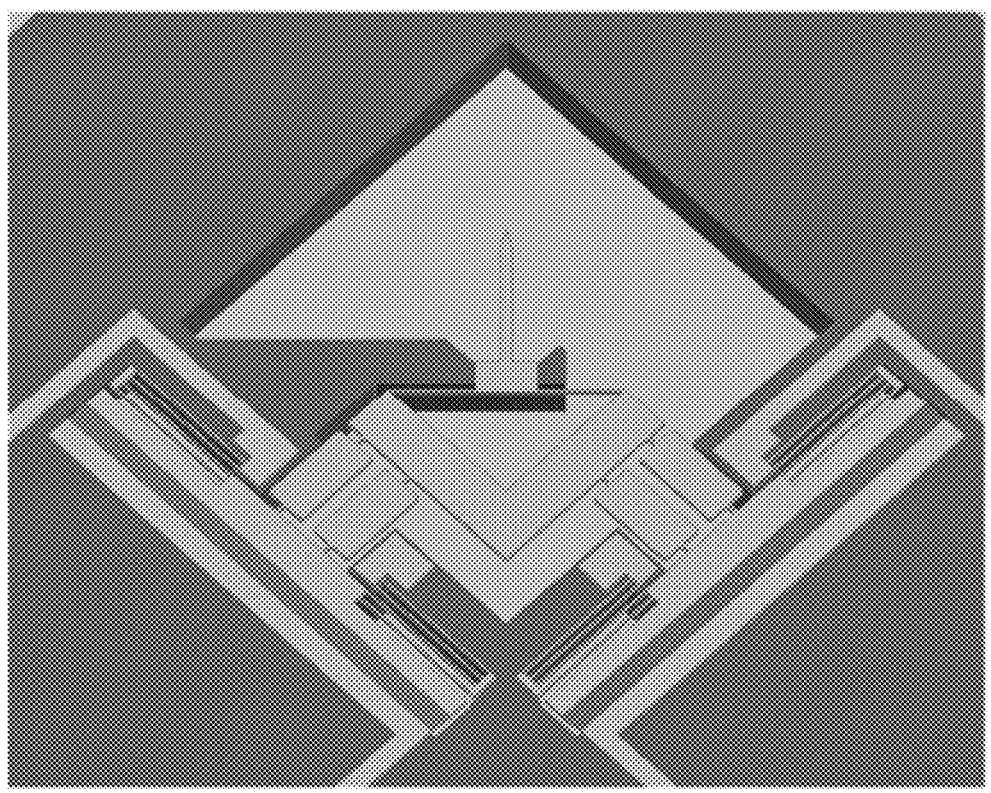
FIG. 22 Schematic diagram of active cantilever device with parallel kinematics XY stage.
Figure 22B:
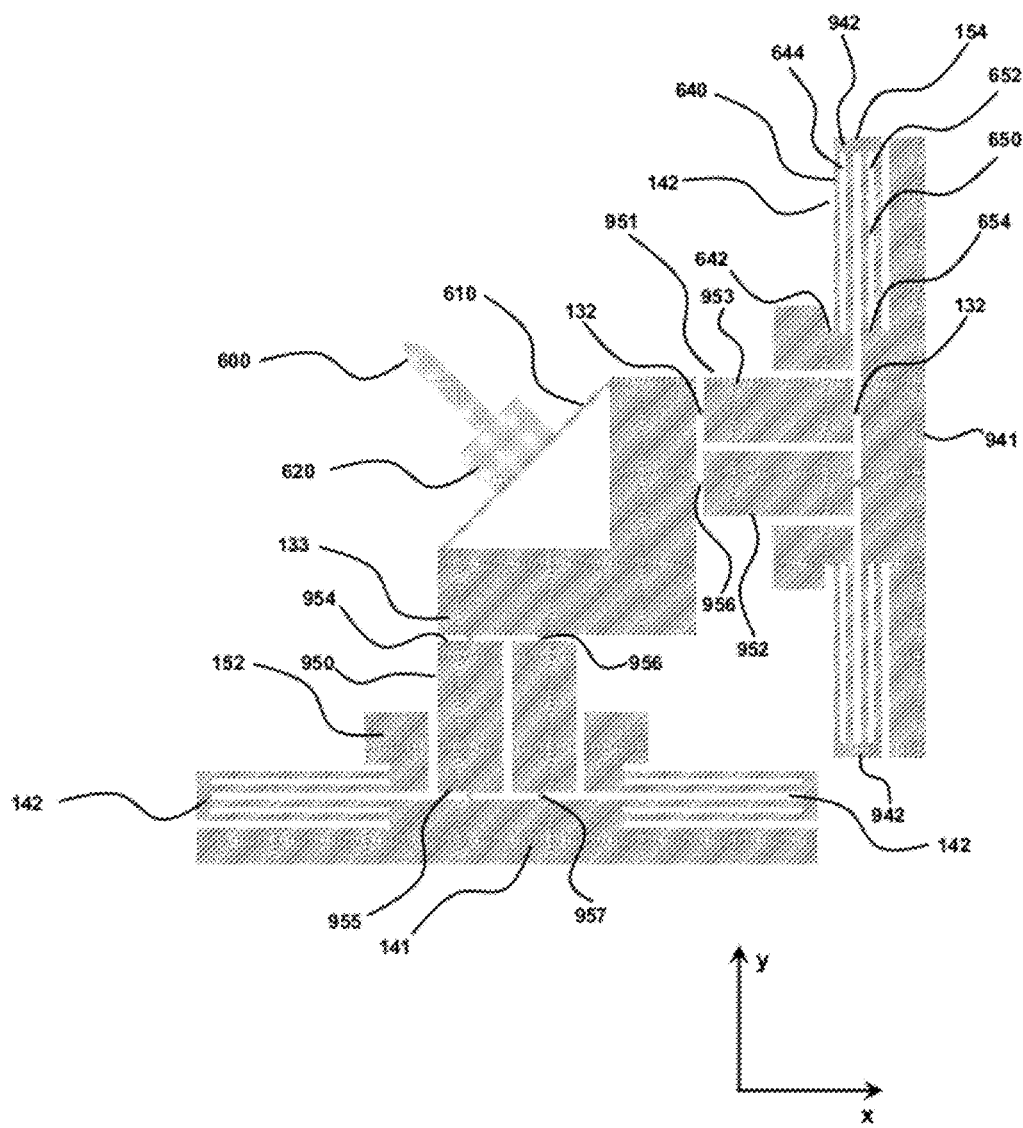

Device design and analysis: FIG. 22 demonstrates the design of the active cantilever device with parallel-kinematic high-bandwidth MEMS XY positioner. In this design, the cantilever 600 is connected to a parallel kinematic micro-positioning stage through torsion bars 610. The torsion bars 610 provide the rotary compliance of the cantilever structure that enables the out-of-plane motion of the cantilever 600. A rectangular plate that is placed at the root of the cantilever 600 acts as one electrode of a tilt plate actuator 620. The counter electrode of this tilt plate actuator is created in the handle layer that locates underneath the cantilever plate. The separation gap between two plates is defined by the thickness of the sacrificial layer (BOX layer) of SOI wafers. When a potential difference is applied to the cantilever plate (ground) and handle layer plate (voltage), the electrostatic force from the tilt plate actuator 620 generates a torque for rotating the torsion bars 610, thereby displacing the cantilever 600 in the Z direction. Since the tilt plate actuator is located very close to the torsion bars, the lever-arm effect produces a relatively large displacement at the cantilever tip, in spite of the small separation gap between the two plates. FIG. 22B further shows flexure hinges 132, end effector 133, folded springs 142, anchors 152, and comb drives 141. In this example the folded spring 142 is made of a first beam 640 and a second beam 650, wherein, wherein the first beam 640 has a first end 642 connected to an anchor 152 and a second end 644 connected to a truss 154, and the second beam 650 has a first end 652 connected to the truss 154 and a second end 654 connected to flexure hinge 132, such as via a connection with an actuator 141.

Referring to FIG. 22B, flexure hinge 132 is part of a four bar linkage mechanism, such as a first bar linkage mechanism 950 or a second bar linkage mechanism 951. Each bar linkage mechanism (950 951) has a pair of central platforms (952 953), each central platform having a first central platform end 954 and a second platform end 955 that connects to a first bar linker 956 and a second bar linker 957, respectively, so that each linkage mechanism 950 and 951 has four individual linkers (a pair of first bar linkers 956 connected to end effector 133 and a pair of second bar linkers 957 connected to first actuator 141 or second actuator 941). First plurality of springs 142 and second plurality of springs 942 are connected to first actuator 141 for motion in a first direction corresponding to a y-axis direction and second actuator 941 for motion in a second direction corresponding to an x-axis direction, respectively.

Figure 23:
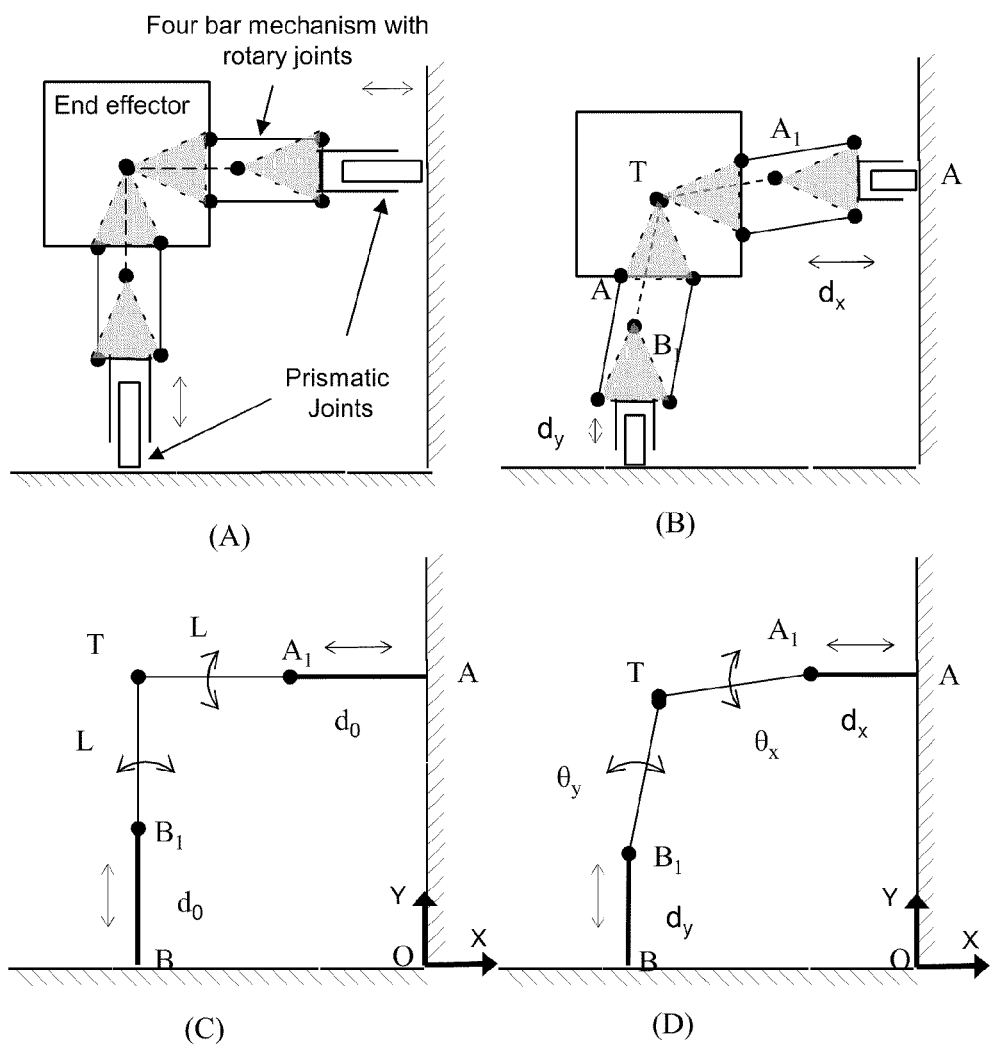
FIG. 23: (A) Addition of links between the base and connector of the parallelogram 4-bar does not change the mobility of the system, provided the links are parallel to crank (and follower) and of the same length. (B) System configuration under displacements at the two prismatic joints. (C, D) Equivalent linkage of the parallel kinematics XY stage for the purpose of analysis at the nominal position and under actuation FIG. 24 Torsion bars and tilt plate for the cantilever.

The cantilever is carried by a parallel-kinematic micro positioning XY stage. The design of the XY stage is schematically depicted in FIG. 23. In this design, there are two independent kinematic chains that connect the end-effector to the base. Each kinematic chain includes two serial connected components: a prismatic joint that provides pure translational motion and a parallelogram four-bar linkage mechanism that provides rotary displacement while holding the orientation of the end-effector invariant. These two chains are placed perpendicular to each other, so as to kinematically decouple the two actuated joints to the maximum extent possible. The two kinematic chains are optionally identical to each other, resulting in identical dynamics of the stage along any direction in the XY plane. When the stage is actuated in one direction by the prismatic joint of that chain, the resulting motion of the end-effector is accommodated by the other kinematic chain by an angular displacement at the parallelogram 4-bar mechanism.

To simplify the analysis of the system, we use a virtual link. Adding a link between the base and connector of a parallelogram 4-bar linkage does not change its mobility, provided that this link has the same length as the crank and is parallel to it. This is shown in FIG. 23. Links are added to the two 4-bar linkages so that they meet at the same point, T on the end-effector. The simplified kinematics model is shown in FIGS. 23(C) and 23(D). The link $AA_1$ and link $BB_1$ represent two prismatic joints with an initial length do and this length will be changed along with actuation effect. The link $TA_1$ and link $TB_1$ represent virtual links with a fixed length L. Here the motion of point T completely represents the motion of the end-effector, because it only undergoes pure translation.

The relationship between actuation displacement, which is linear displacement of two prismatic joints, and the displacement of the stage is determined. Referring to FIG. 23, if the coordinates of point O are chosen as the origin (0, 0), then the position where the kinematics chains connected to the base is A $(0, d_0+L)$, B $(-d_0-L, 0)$. The nominal position for the table in this coordinate system is $(-d_0-L, d_0+L)$. After the prismatic joints are actuated to $d_x$ and $d_y$, the coordinates at the end of the joints are $A_1$ $(-d_x, d_0+L)$, $B_1$ $(-d_0-L, d_y)$. The coordinates of the new position of the table T now can be solved as the length of second joints remain the same. Let the position of the stage be (x,y), then $|TB_1|=|TA_1|=L$, which satisfy the relationships given in equations 1 and 2.

$$(x+d_x)^2+(y-d_0-L)^2=L^2, (x+d_0+L)^2+(y-d_y)^2=L^2 \quad (1)$$

$$d_x=\sqrt{L^2-(y-d_0-L)^2}-x, d_y=y-\sqrt{L^2-(x+d_0+L)^2} \quad (2)$$

The angular displacement of the second links that are four bar linkages, are $$\theta_x = \sin^{-1}\frac{\Delta y}{L} = \sin^{-1}\frac{d_0+L-y}{L}, \quad (3)$$

$$\Delta\theta_y = \sin^{-1}\frac{\Delta x}{L} = \sin^{-1}\frac{x+d_0+L}{L}$$

where $\Delta x$ and $\Delta y$ are displacement of the end-effector in X and Y directions. Differentiating equation 2 with respect to x, y at operation points $T_0$ $(-d_0-L, d_0+L)$, we get $$\begin{bmatrix}\Delta d_x \\ \Delta d_y\end{bmatrix} = \begin{bmatrix}-1 & 0 \\ 0 & 1\end{bmatrix}\begin{bmatrix}\Delta x \\ \Delta y\end{bmatrix} \quad (4)$$

and $$\begin{bmatrix}\Delta x \\ \Delta y\end{bmatrix} = J\begin{bmatrix}\Delta d_x \\ \Delta d_y\end{bmatrix} = \begin{bmatrix}-1 & 0 \\ 0 & 1\end{bmatrix}\begin{bmatrix}\Delta d_x \\ \Delta d_y\end{bmatrix}.$$

The diagonal Jacobian matrix in equation 4 suggests a decoupled motion in X and Y directions around the nominal point, when the device undergoes a small displacement relative to the overall dimensions of the stage (which is just the case for this MEMS systems). One actuator will generate displacement in X direction and the other in the Y direction. The effect of crosstalk between different axes (at the first order of approximation) is zero. As shown in FIG. 22, for the XY stage, the rotary joints around four bar mechanism are implemented by flexure hinges and the prismatic joint is realized by the linear comb drive and folded spring suspension structure.

Figure 24:
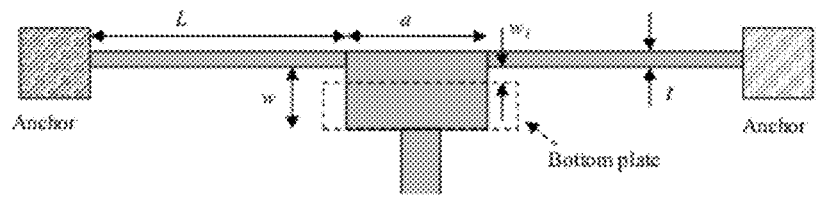

Structural design and analysis: We first analyze the out-of-plane motion of the cantilever. As previously mentioned, the z motion is obtained by the rotation of the cantilever, permitted by two torsion bars that connect the cantilever to the end-effector of the XY stage. FIG. 24 demonstrates a schematic of torsion bars and parallel plate actuator for the cantilever. The rotational stiffness of the torsion bars is given by [33], $$K = \frac{T_k}{\varphi} = \frac{2\beta h t^3 G}{L} \quad (5)$$

where $T_k$ is torque; $\phi$ is angular displacement; G is the shear modulus of the material of torsion bars; L is the length of a torsion bar; h is the height and t is the width of the torsion bar; $\beta$ is a numerical factor depending on the ratio of h/t. For the torsion bars used in our design, we have beam width t=5 μm, L=800 μm, h=50 μm and $\beta$=0.291. The shear modulus of single crystal silicon <100> as been used for device fabrication is about 51 Gpa. Therefore the rotational stiffness of our torsion bar is 2.3e-7 N-m/radians.

The actuation torque at a certain rotation angle can be derived through integrating actuation effect over the overlapped area of the tilt plate. The torque generated from the electrostatic force is:

$$T_a = \int_{w_1}^{w}\frac{\varepsilon V^2 a x dx}{2(g-\varphi x)^2} = \frac{\varepsilon V^2 a}{2\varphi^2}\left(\ln\frac{g-\varphi w}{g-\varphi w_1} + \frac{\varphi g(w-w_1)}{(g-\varphi w)(g-\varphi w_1)}\right) \quad (6)$$

where $\epsilon$ is electrical permittivity, V is actuation voltage, g is the gap between two plates, a is the width overlap of the two plates, $w_1$ and w is the start and the end of the overall lap from the rotational center. The rational angle of the tilt plate at a certain voltage can be derived through torque balance equation $T_a=T_k=K\phi$, and solved numerically. In the design, we have a=550 μm, w=300 μm and $w_1$=100 μm. We can get a maximum angular defection of 4.35e-3radians at about 5.5 volts. The corresponding maximum displacement at the center of the electrode is 0.87 μm. The lever-arm effect will magnify this displacement at the tip of the cantilever and result in about 7 μm out of plane displacement.

Next we consider the in-plane motion of the stage. One-dimensional circular flexure hinges are used in the stage structure as rotary joints. The rotary stiffness of the hinge is given by [34], $$K_z = \frac{T_k}{\varphi} = \frac{2Eh}{9\pi}\sqrt{\frac{t^5}{R}} \quad (7)$$

where E is the Young's Modulus of the material of flexure hinge, t is the neck thickness of the flexure hinge (6 μm), R is the radius of a flexure hinge at the neck (=300 μm), and h is the height of the flexure hinge or the device thickness (=50 μm). The maximum bending torque that can be applied to a flexure hinge, and consequently the maximum rotary deflection is given by [26]. The Young's modulus of the silicon-based 1-D circular flexure hinge used in the stage mechanism is 131 GPa, and its elastic limit is about 7,000MPa. Hence the rotational stiffness and the maximum angular deflections of the hinges can be given by $$K_z = 2.36 \times 10^{-6} \text{ Nm rad}^{-1} \quad (8)$$

$$\alpha_{max} = 0.68 \text{ rad} \quad (9)$$

The length of the four-bar structure is 1 mm, which indicates a maximum 630 μm displacement of the four bar linkage mechanical structure. Factors such as the suspension structure and the limited actuating forces and stroke prevent this limit from being reached.

The displacement of a linear comb drive is defined by the stiffness of the folded spring as the suspension structure, as well as the actuation force it can provide. In our design, a folded spring is used to support the rotor as well as the table. The designed folded spring have a large compliance in the actuation direction for large displacements, and a much higher stiffness in the lateral direction so as to prevent side instabilities. From the beam deflection theory [35], the stiffness of a clamped-clamped beam in the motion direction, $k_d$ and lateral direction, $k_l$ can be expressed as:

$$k_d = 2Eht^3/L^3, \; k_l = 2Eht/L \quad (10)$$

where h is the height of the beam or the device thickness (=50 μm), t is the width of the beam (15 μm), L is the length of the beam (=1.375 mm). In our design, two clamped-clamped beams are used in series to form a folded spring. The first beam connects the anchors to an intermediate truss and the second one connects the truss to the rotor. The lengths of the two beams are the same to prevent undesirable parasitic motion. We get stiffness in the displacement direction as $k_d$=17.0 N m$^{-1}$ and in lateral direction $k_l$=142909 N m$^{-1}$, resulting in the stiffness ratio of $k_l/k_d$=8403.

The linear comb drive actuator provides force to overcome the stiffness from folded spring and flexure hinges under an actuation voltage V. The electrostatic force is given by:

$$F = n\frac{\varepsilon_0 h V^2}{g} \quad (11)$$

where n is the number of finger pairs (=191), h is the height of a finger (50 μm), g is the gap between two neighboring fingers (5 μm), $\varepsilon_0$ is the electrical permittivity. Thus the linear comb drive can generate a force of 380 μN at 150 V.

The force from the linear comb drive actuator not only displaces the comb drive and the folded spring that is connected to it, but also rotary hinges in the parallelogram four-bar linkage. In order to correctly predict and design the displacement in the XY plane, the relationship between the end-effector displacement and the angular displacement of the hinges in the four-bar mechanism has to be derived. Equation 3 gives such a relationship between the displacement of the end-effector and rotation angle of four bar linkages. Since the angular deflection of the hinges and displacement of the table is relatively small when compared to the overall dimension of the mechanism, the relationship between the angular deflection of the hinges in four bar linkages, and the displacement of the table can be linearized with Jacobian matrix, J2 and its inverse, $J2_{inv}$.

$$\begin{bmatrix} \Delta\theta_x \\ \Delta\theta_y \end{bmatrix} = J2_{inv} \begin{bmatrix} \Delta x \\ \Delta y \end{bmatrix}, \quad (12)$$

where $$J2_{inv} = \begin{bmatrix} \frac{\delta\theta_x}{\delta x}\bigg|_{(-d_0-L,d_0+L)} & \frac{\delta\theta_x}{\delta y}\bigg|_{(-d_0-L,d_0+L)} \\ \frac{\delta\theta_y}{\delta x}\bigg|_{(-d_0-L,d_0+L)} & \frac{\delta\theta_y}{\delta y}\bigg|_{(-d_0-L,d_0+L)} \end{bmatrix}$$

Partially differentiate Eq. (3) with respect to x, y:

$$\frac{\delta\theta_x}{\delta x} = 0, \; \frac{\delta\theta_x}{\delta y} = -\frac{1}{L\sqrt{1-\left(\frac{d_0+L-y}{L}\right)^2}}, \quad (13)$$

$$\frac{\delta\theta_y}{\delta x} = \frac{1}{L\sqrt{1-\left(\frac{x+d_0+L}{L}\right)^2}}, \; \frac{\delta\theta_y}{\delta y} = 0$$

Evaluate Equation 12 at $T_0(-d_0-L, d_0+L)$, we obtain $$\frac{\delta\theta_x}{\delta x}\bigg|_{T_0} = 0, \; \frac{\delta\theta_x}{\delta y}\bigg|_{T_0} = -\frac{1}{L}, \; \frac{\delta\theta_y}{\delta x}\bigg|_{T_0} = \frac{1}{L}, \; \frac{\delta\theta_y}{\delta y}\bigg|_{T_0} = 0.$$

As a result, inverse Jacobian matrix, $J2_{inv}$ is given by:

$$J2_{inv} = \begin{bmatrix} 0 & -\frac{1}{L} \\ \frac{1}{L} & 0 \end{bmatrix}, \quad (14)$$

In the stage design provided in this example, the value of parameter L is 1 mm; hence mapping of the stage displacement to hinge angular displacement is given by $$J2_{inv} = \begin{bmatrix} 0 & -1000 \\ 1000 & 0 \end{bmatrix}.$$

The relation between rotary deflections of the hinges in four-bar mechanism and the linear displacements from prismatic joints (linear comb drives) can be derived by combining Equation 4 and 12:

$$\begin{bmatrix} \Delta\theta_x \\ \Delta\theta_y \end{bmatrix} = J2_{inv}\begin{bmatrix} \Delta x \\ \Delta y \end{bmatrix} = \quad (15)$$

$$J2_{inv}J\begin{bmatrix} \Delta d_x \\ \Delta d_y \end{bmatrix} = \begin{bmatrix} 0 & -\frac{1}{L} \\ -\frac{1}{L} & 0 \end{bmatrix}\begin{bmatrix} \Delta d_x \\ \Delta d_y \end{bmatrix} = \begin{bmatrix} 0 & -1000 \\ -1000 & 0 \end{bmatrix}\begin{bmatrix} \Delta d_x \\ \Delta d_y \end{bmatrix}$$

When comb drives are actuated, the work done by the comb drive actuator is balanced by the energy stored in the hinges and the leaf springs. Using the principle of virtual work:

$$\frac{1}{2}F_{comb-x}\Delta d_x + \frac{1}{2}F_{comb-y}\Delta d_y = \frac{1}{2}K_{spring}(\Delta d_x)^2 + \qquad (16)$$

$$\frac{1}{2}K_{spring}(\Delta d_y)^2 + \frac{1}{2}\times 4 \times K_{hinge}(\Delta\theta_x)^2 + \frac{1}{2}\times 4 \times K_{hinge}(\Delta\theta_y)^2$$

The equation can be expressed in matrix form:

$$\begin{bmatrix} F_{comb-x}\Delta d_x \\ F_{comb-y}\Delta d_y \end{bmatrix} = \qquad (16.1)$$

$$\left\{ \begin{bmatrix} K_{spring} & 0 \\ 0 & K_{spring} \end{bmatrix} + 4\begin{bmatrix} K_{hinge} & 0 \\ 0 & K_{hinge} \end{bmatrix}(J2_{inv}J)^2 \right\}\begin{bmatrix} \Delta d_x \\ \Delta d_y \end{bmatrix}^2$$

where $F_{comb-x}$ and $F_{comb-y}$ are actuation force for X and Y axes, $K_{spring}$ is the stiffness of folded spring in the displacement direction, and $K_{hinge}$ is the rotary stiffness of the flexure hinge. The coefficient 4 before $K_{hinge}$ comes from four identical hinges inside a four bar mechanism, where the four hinges are deflected equally when actuated.

Assuming only one axis (X) is actuated, we have:

$$F_{comb-x}\Delta d_x = K_{spring}\Delta d_x^2 + 4K_{hinge}\left(\frac{1}{L}\right)^2\Delta d_x^2, \text{ thus} \qquad (17)$$

$$\Delta d_x = \frac{F_{comb-x}}{K_{spring} + 4K_{hinge}/L^2}$$

From equation 17, using designed parameters, $\Delta d_x$ is calculated as 14.5 μm at an actuation voltage of 150 V. Due to symmetry in the design, the same displacement can be achieved for Y axis.

Dynamic analysis and FEA results: The natural frequency and modal shapes of the designed device are important design parameters for its successful application to high-bandwidth motion required in high throughput nano manipulation and manufacturing. A high designed natural frequency enables the device to response quickly and accurately to the rapid changes in the commanded signals. In order to verify our device design, a finite element analysis (FEA) (using COMSOL®) is performed to study the dynamic behavior of the structure and to estimate the resonant frequencies and the associated mode shapes. A 3D model is generated by AutoCAD and processed with Comsol®. Due to node and memory limitations of the available FEA simulation software, the fine triangular of the moving parts of the stage (that are used to reduce mass) is replaced by a solid geometry. To compensate for the extra mass introduced by this approximation, the material density of the moving parts is scaled down appropriately.

Figure 25:
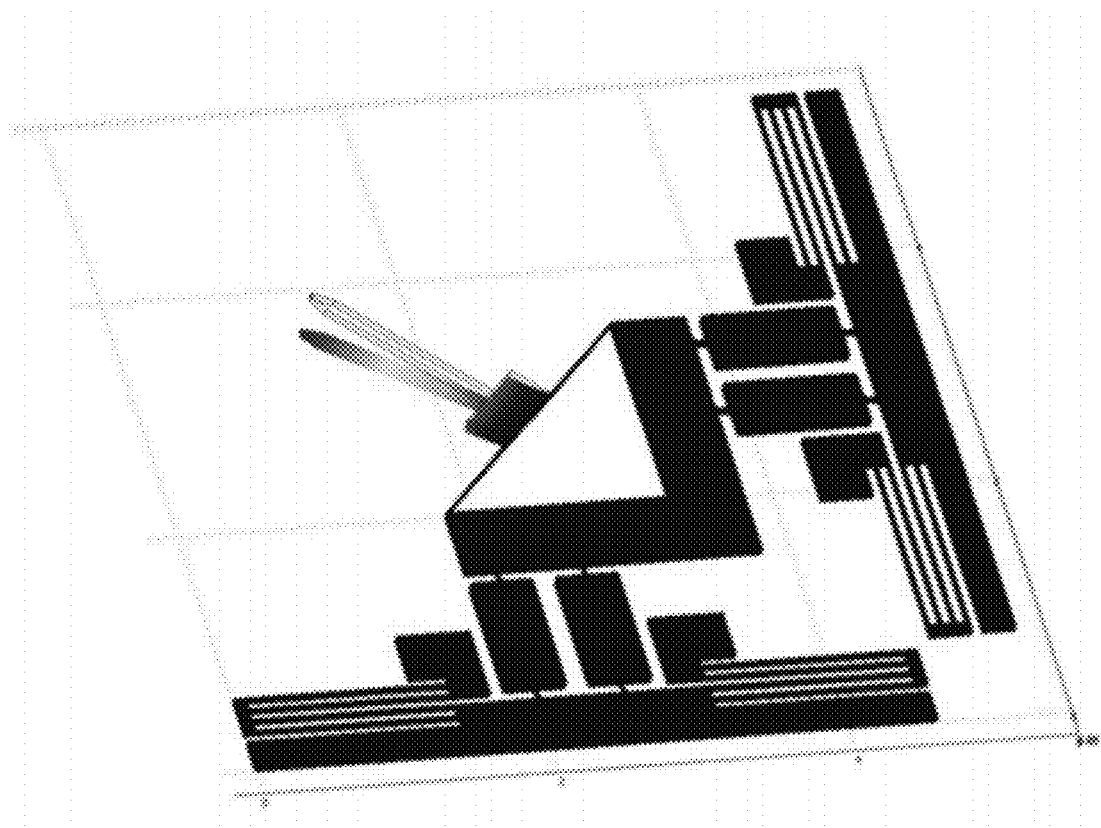
FIG. 25 Device deflection under self weight and a load on the cantilever plate.

Out-of-plane sagging of the stage and the cantilever due to its own weight can cause problems in this system by reducing the gap of the parallel plate actuator, and consequently, the out-of-plane motion. Furthermore, it can lead to the twisting of the leaf springs, misalignment between the comb fingers, affect the orientation of the stage, and introduce additional stresses at the hinges. Thus, we evaluate the self-sagging of the stage and the effect of tilt plate actuation and torsion bars on the stage through a FEA model. Two types of load are provided for FEA analysis. One is the surface load, corresponding to the weight of the structure applied to the top surface of the device; the other is a point load along the Z direction acting at the center of the tilt plate actuator to simulate the actuation force for the cantilever. The result of FEA are analysis is shown in FIG. 25. The sagging effect of the stage itself under self-weight and actuation force of the cantilever is negligible (less than 5 nm), compared with the overall dimension of the end-effector and the gap of the tilt plate actuator. The out-of-plane cantilever deflection is mainly caused by deformation of the torsion bar. The interference between vertical actuation structure and lateral displacement structure is minimized and decoupled.

Since the structural responses in the lateral and vertical directions are decoupled, we decompose the eigen-frequency analysis into two sub-problems: lateral modes of the stage system and out-of plane mode of the torsion bar and the cantilever, to simplify the FEA problem and satisfy the node and memory limitations of the available FEA simulation software. Further, while one might expect interaction between the lateral and vertical motion because of the torsion spring, as evident in subsequent discussions, this interaction takes place at a frequency that is much higher than the frequencies associated with the actuation modes in the lateral direction.

The natural frequency and mode shapes of the stage in the lateral directions are analyzed by FEA and the first six most dominant mode shapes for the system are displayed, with different color indicating the different displacement in the mode vibration (mode 1: 2110 Hz; mode 2: 2144 Hz; mode 3: 8048 Hz; mode 4: 11048 Hz; mode 5: 11329 Hz; mode 6: 21470 Hz). Amongst these modes, the first three modes are related to the displacement of the end effector (though the compliance of the folded springs and the parallelogram four bar linkages), the last three are related to the lateral dynamics of the torsion bars and the folded springs. Mode 1 has the leaf spring deformations in anti-phase, while mode 2 has them in phase. It can be seen that mode 3 is a rotational mode, while the first two modes are the translational modes. The two translational modes correspond to the in-phase and out-of-phase displacements of the two comb drives (and related flexure springs) and result in a displacement of the end-effector in two perpendicular directions. The modal frequencies are slightly different because of the small differences in the end-effector displacements that occur when the 4-bar systems rotate in the same directions or in different directions. Mode 3 in which the platform undergoes a rotation, an undesirable parasitic motion for this flexure mechanism, is roughly 16 times stiffer than the modes associated with the desired XY motions. This is attributed to the parallel kinematics XY stage design which besides producing a relatively high natural frequency associated with the desired modal directions (the desired translational DOF in XY plane), also provides for good separation between the modes associated with the desired motion and those associated with the parasitic motion. The frequency separation can be even upgraded through the design of the folded leaf-spring.

The modal frequency and corresponding mode shapes of the cantilever and torsion bars in the vertical directions are analyzed by only modeling the end-effector of the stage and the cantilever structure. The end effector of the stage is assumed to be stationary. The first four dominant mode shapes for the cantilever system are displayed (mode 1: 7046 Hz; mode 2: 17213 Hz; mode 3: 17507 Hz; mode 4: 163687 Hz), with color indicating the displacement in the mode vibration. Amongst these modes, the first mode is related to the out-of-plane rotation of the cantilever, the second to fourth modes are related to the combined dynamics in the lateral direction and out-of-plane direction of the torsion bars. Modes 2 and 3 in this analysis are related to modes 4 and 5 in the previous analysis. Due to the extra vibration component in z direction, the frequency of mode 2 and 3 in this analysis is larger than that in the previous analysis (in-plane modes).

Again, the parasitic modes (mode 2 to mode 4) have much larger resonant frequencies and are located far from the first dominant modes (for both, the lateral and out-of-plane motions), indicating a much higher stiffness to excite these parasitic motions. Our designed response for the cantilever structure is out-of-plane rotation associated with the dominant mode.

Figure 26:
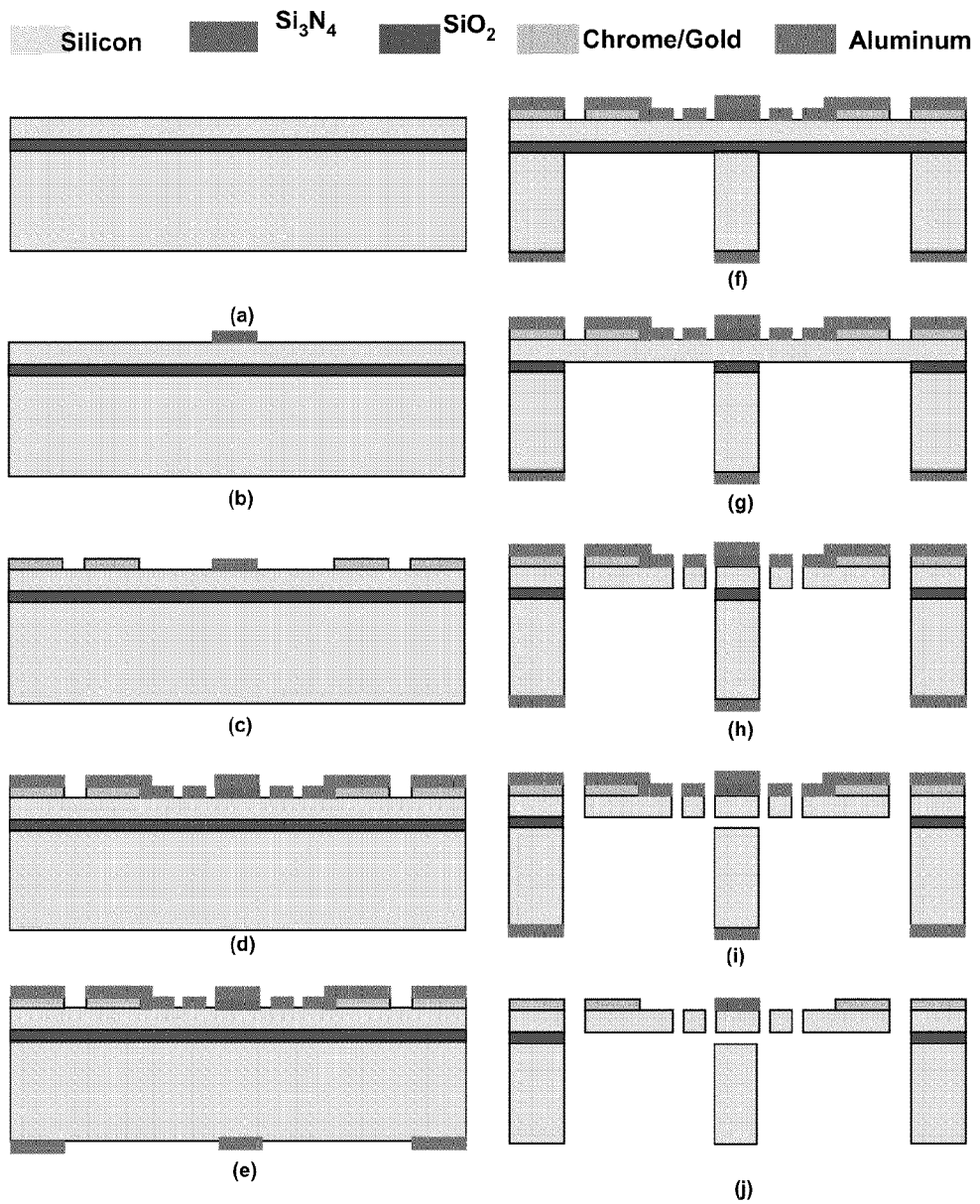
FIG. 26: Process flow for fabricating the active cantilever device with XY stage (a) Initial SOI substrate (b) Silicon nitride deposition and patterning to form a prestress layer for the cantilever (c) Chrome/Gold deposition to form the pad layers (d) Front side aluminum mask patterning (e) Back side aluminum mask patterning (f) Deep reactive ion etching (DRIE) of the backside (g) Removal of BOX layer by concentrated HF (h) DRIE etching to release the device (i) Release parallel plate for the cantilever by HF etching (j) Removal of aluminum mask by aluminum etchant.

Fabrication: The microfabrication processes that are utilized to fabricate the active cantilever device with micro positioning XY stage is depicted in FIG. 26. The processes use four photolithography masks for transferring patterns of the device; three for device side patterning and one for handle layer patterning. Three device side patterns consist a silicon nitride pattern used to pre-stress the cantilever, a conducting Au/Cr pad pattern for future wire bonding, and a device pattern for defining structural components, such as the comb drive actuators, the cantilever, and torsion bars, etc. The actuators and mechanism are designed to permit a monolithic fabrication of the structure. The mask for the handle layer defines one electrode for the tilt plate actuator for the cantilever. The device is fabricated on a Silicon-On-Insulator (SOI) wafer with a device layer thickness of 50 μm, and a buried oxide (BOX) layer thickness of 3 μm supported on a 600 μm thick handle layer. The device with an overall size 4 mm×4 mm of the bounding box without the contact pads is fabricated on a die with a 15 mm×15 mm entire size. The device that is fabricated on a SOI substrate allows for the two parts (stators) of the electrostatic linear comb drives (fabricated on the device layer), and one electrode of the tilt plate actuator (fabricated on the handle layer), to be electrically isolated from each other (by the BOX layer), while the device layer components are structurally supported by the handle layer.

Figure 27:
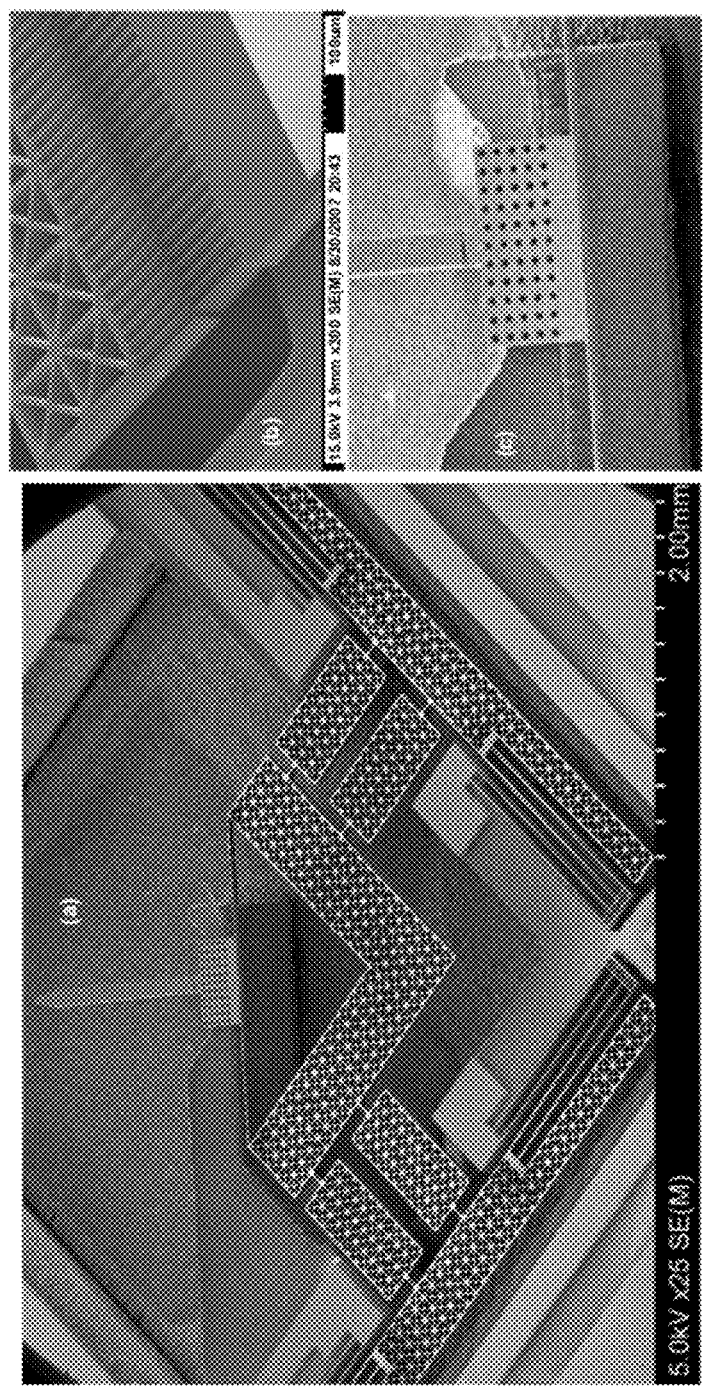
FIG. 27: SEM images of the fabricated device. (a) Overall structure. (b) Comb actuator for the stage. (c) Parallel plate actuator for the cantilever.

The microfabrication process begins with the SC-1 cleaned 15 mm square pieces of the diced wafer. The method of standard cleaning 1 (SC-1, 100:10:1 of $H_2O:H_2O_2:NH_4OH$) is performed to remove the debris and clean the surface of the die after dicing (FIG. 26a). A silicon nitride layer used to pre-stress the cantilever for initial out-of-plane bending is deposited on device side using Plasma Enhanced Chemical Vapor Deposition (PECVD) for creating a high stress film. This is followed by photolithographic patterning with photoresist AZ 4620, and reactive ion etching of exposed silicon nitride using $CF_4$ plasma (FIG. 26b). The electrical contact pads that are used for wire bonding are composed of a chrome (17 nm) and gold (392 nm) stack. These contact pads are aligned with silicon nitride pattern and fabricated on the device layer by a metal sputtering step, followed by patterning of the pad layer with photoresist AZ 1518 manufactured by AZ Electronic Materials®, and wet chemical etching of the exposed metals by gold etchants (3 minutes) and chrome etchants (1 minute) respectively (FIG. 26c). After that, the device pattern, including all the mechanisms and actuators, is aligned with the contact pads and patterned on the device layer of the SOI die by photolithography using photoresist AZ 1518. The final pattern is achieved by sputtering of a 60 nm thick aluminum layer, and lifting off of aluminum in an acetone bath through ultrasonic cleaning (FIG. 26d). The device layer is then protected by spin coating and hard baking a thin layer of photoresist (5 μm thick AZ1518) to protect the device side pattern for the following fabrication steps. The die is flipped over and the handle layer pattern that defines the electrode for actuating the cantilever is aligned with the device layer pattern and fabricated by the similar process used for patterning device layer (FIG. 26e). Next, the Deep reactive ionic etching (DRIE) with Bosch process using the STS Multiplex Advanced Silicon Etcher (ASE®) equipment is used to etch the handle layer from the back of the device so as to make the electrode of the tilt plate actuator. The etching cycle and passivation cycle time of the BOSCH processes are optimized to yield a smooth sidewall profile with high aspect ratio (FIG. 26f). The exposed BOX layer is etched by using Concentrated HF (49%) acid (FIG. 26g). The location of this step in the fabrication step sequence is crucial, for otherwise, the residual stresses from the silicon dioxide film can destroy the device during the subsequent DRIE step. Following the box layer removal step, the device side of the die is subjected to the DRIE Bosch process for a second time to etch the device pattern through the device layer, leaving the different parts of the electrostatic drives physically isolated from each other (FIG. 26h). At the end of this step, tilt plates of the capacitor for actuating the cantilever are still connected by the BOX layer. They are released with the assistance of the release holes etched into the plate on the device layer plate by a vapor phase HF release step that lasts for about two and a half hours (FIG. 26i). In the last step, the Al films that served as masks for the Bosch process are removed by using aluminum etchant. The fabricated device is shown in FIG. 27.

Characterization and experimental results: The fabricated device is characterized by supplying different driving voltage to the actuators (tilt plate actuator for the cantilever and comb drive actuators for XY stage) and measuring the resulted displacement of the moving part of the actuators and the table. The modal frequency corresponding to the first mode of the XY stage is also measured and compared with the theoretically predicted value. Q-factor associated with the stage is measured and reported. For the static displacement characterization, a voltage supply (Keithley Model 237) is used to actuate the tilt plate actuator and the comb drives of the stage, which are mounted and connected on a probe station.

Figure 28:
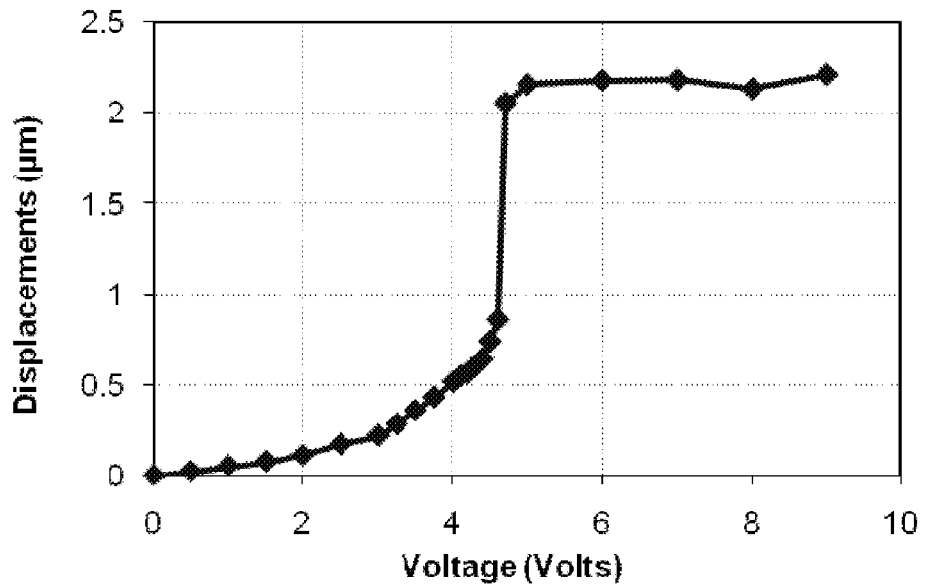
FIG. 28: Static displacement characterization of the active cantilever.

For the active cantilever characterization, a Veeco NT1000 noncontact interferometry based optical profiler is used to measure the static out-of plane displacement of the cantilever. The measuring region is located at the center of the plate of the cantilever. The fixed plate located on the handle layer is used as the reference plane for detecting vertical motion of the cantilever. We choose to measure at the plate of the cantilever instead of the tip of the cantilever because of the limited measuring area available at the tip and the difficulty finding a reference plane near the tip of the cantilever. FIG. 28 demonstrates the static displacement of the cantilever at the center of the tilt plate actuator. The pull-in voltage is about 4.6 volts with a maximum stable displacement about 0.85 microns, which is very close to the analytical prediction. The vertical displacement of the stage that holds the torsion bar and the cantilever is measured to be negligible within the measuring resolution. The lever arm effect should result in about 7 μm out-of-plane displacement at the tip of the cantilever.

Figure 29:
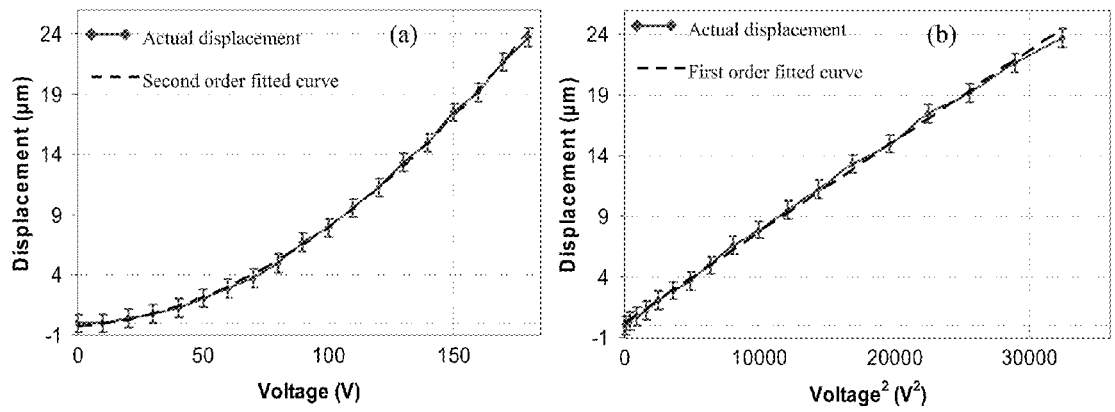
FIG. 29: Static displacement characterization of the XY stage. (a) Axis displacement as a function of actuation voltage (b) Axis displacement varying linearly with the square of the actuation voltage.

For the static displacement characterization of micro positing XY stage, a voltage is applied to the linear comb drive in increments of 10V and the resultant displacement is measured using a high resolution microscope with a resolution of 1 micron attached to the probe station. FIG. 29(a) shows the displacement of the comb drive that is aligned with the x-axis of the stage as a function of the actuation voltage. The comb drive moves by 24 μm under an actuation voltage of 180V. Additionally, FIG. 29(b) demonstrates that the displacement of the stage is linearly related to the square of the actuation voltage as predicted by the electrostatic actuation theory. The other comb has almost identical static displacement curves. The displacements of the stage at the different voltages were found to be repeatable within the resolution of the optical microscope. Additionally the maximum displacement of the stage is much less than the elastic working range of all the deforming elements vs. folded springs and flexure hinges. Hence, there is negligible material hysteresis of the complaint components of the stage mechanism. The displacement of the end effector can be reproduced accurately and repeatedly.

Figure 30:
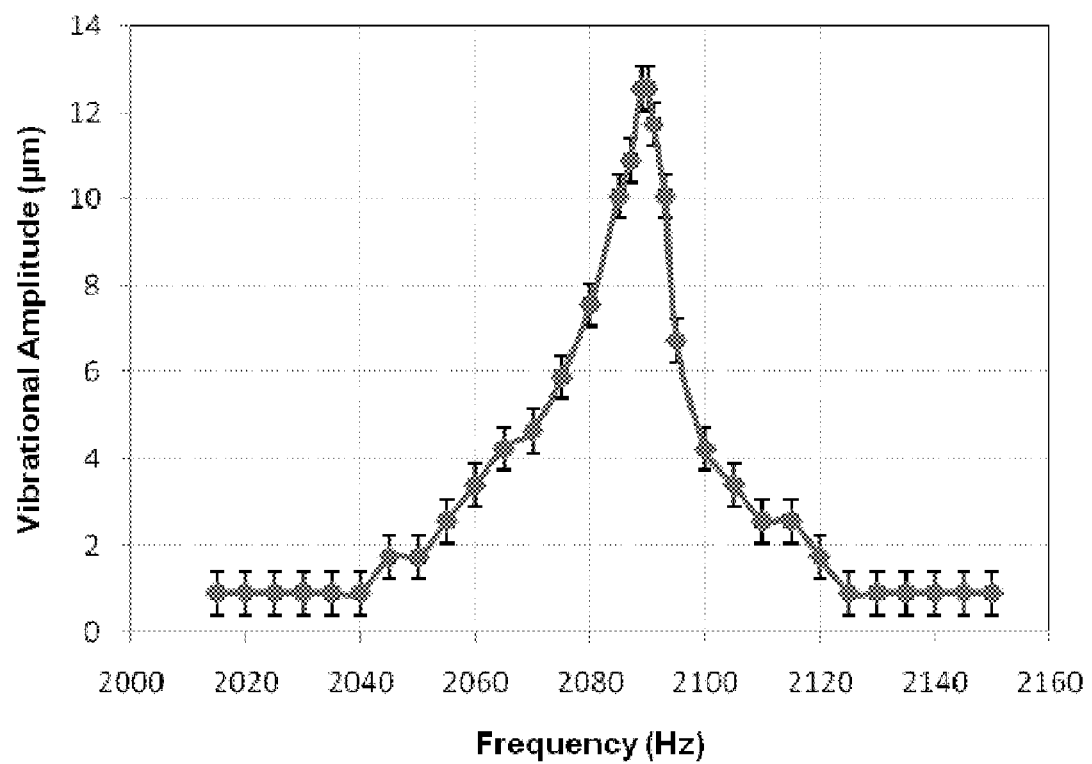
FIG. 30: Magnitude of vibration around resonant frequency in air.

The dynamic behavior (natural frequency) of the stage is tested experimentally. A signal generator (HP/Agilent 33220A) is used to generate sinusoid voltages with the required frequencies that are amplified by a voltage amplifier (Trek Model 623B) to 0 to 30 volts peak-to-peak (V=15+15 sin ωt). This output, with varying frequencies is used to actuate the comb drive actuators. The resultant vibrational amplitudes are optically recorded through the microscope. For each sampled frequency, the steady state response that is the vibration amplitude is measured optically with a resolution of 1 μm. After an initial sweep through the frequencies, the device's resonant frequency is located. Careful measurements are then made in a smaller frequency window around the device's resonant frequency to obtain the frequency response shown in FIG. 30. Clearly the resonant frequency of the device under test is about 2090 Hz, while the theoretical prediction from FEA is about 2113 Hz. The discrepancy comes from the dimensional variation from the fabrication process. Small changes in the dimensions between the design and actual device affect the stiffness of the fabricated structures, and thus the displacement and natural frequency. The frequencies with amplitudes equal to the $1/\sqrt{2}$ of the maximum peak are around 2084 Hz and 2094 Hz. Thus, the Q factor is approximately equal to $Q=f_0/\Delta f=2090/10\approx210$ in air. This relatively high Q factor is attributed to the high stiffness and good modal separation that result from the parallel kinematics stage design. The large modal separation avoids the superposition of the neighboring resonant peak. The superposed resonant peaks may enlarge the effective frequency band of the resonant peak $\Delta f$ and decrease Q factor. The other reason for the high quality factor is the etching away of the handle layer, which decreases the film damping between the stage and the handle wafer.

Conclusion: In this example, an active cantilever device integrated with high bandwidth nano-positioning XY stage that is based on a parallel-kinematics mechanism is designed, analyzed, fabricated and characterized. The cantilever is connected to the end effector of the XY stage through two torsion bars that provide the rotary compliance of the cantilever. The cantilever is actuated electrostatically through a separate electrode that is fabricated beneath the cantilever. The active cantilever as a functional manipulator is carried by a micro-positioning stage, which enables high-bandwidth scanning and manipulation in three dimensions. The parallel-kinematics based micro-positioning XY stage design produces linear kinematics in the operating motion range of the stage and generates well dispersed modal frequencies with the dominant modes being the desired translations. The relatively simple kinematics and dynamics facilitates future control design for a closed loop positioning system. FEA simulations verify the design objectives. The integrated cantilever device is fabricated on a Silicon-On-Insulator (SOI) die and high aspect of ratio features are fabricated by using deep reactive ion etching (DRIE) processes. The actuation electrode of the cantilever is fabricated on the handle layer, while the cantilever and XY stage are at the device layer of the SOI wafer. Experimental testing suggest that an estimated 7 μm out-of-plane motion of the cantilever tip is obtained at 4.5V and an observed 24 microns of lateral stage motion is achieved at 180V. The dominant natural frequency of the stage system is measured to be about 2090 Hz. A high Q factor (~200) is achieved due to the high stiffness parallel kinematic design. The fabricated stages are capable of use for chip-scale manufacturing and metrology tools for nanomanfacturing and nano metrology applications.

[1] G. Binnig, H. Rohrer, Ch. Gerber, E. Weibel. "Tunneling through a controllable vacuum gap," *Applied Physics Letters*, 40(2):178-180, 1982.

[2] G. Binnig, H. Rohrer, Ch. Gerber, E. Weibel, "Surface studies by scanning tunneling microscopy," *Physical Review Letters*, 49(1):57-61, 1982.

[3] G. Binnig, C. F. Quate, Ch. Gerber, "Atomic force microscope," *Physical Review Letters*, 56(9):930-933, March 1986.

[4] B. Bhushan. *Handbook of Micro/Nano Tribology*. CRC Press, second edition, 1999.

[5] E. Meyer, H. J. Hug, R Bennewitz, *Scanning Probe Microscopy: The Lab on a Tip*, Springer, $1^{st}$ edition, 2003.

[6] Yeolho Lee, Geunbae Lim, Wonkyu Moon, "A piezoelectric micro-cantilever bio-sensor using the mass-micro-balancing technique with self-excitation," *Microsystems Technology*, (2007) 13: 563-567

[7] F. M. Battiston, J. P. Ramseyer, H. P. Lang, M. K. Bailer, C. Gerbe, J. K, Gimzewski, E. Meyer, H. J. Güntherodt, "A chemical sensor based on a microfabricated cantilever array with simultaneous resonance-frequency and bending readout," *Sensors and Actuators B*, 77(1-2):122-131, 2001

[8] R. D. Piner, J. Zhu; F. Xu, S. Hong, C. A. Mirkin, "Dip Pen Nanolithography," *Science*, 1999, 283, 661-663.

[9] P. Vettiger, M. Despont, U. Drechsler, U. Durig, W. Haberle, M. I. Lutwyche, H. E. Rothuizen, R. Stutz, R. Widmer, and G. K. Binnig, "The "Millipede"—More than one thousand tips for future AFM data storage," *IBM Journal of Research and Development*, 44(3), pp. 323-340, 2000.

[10] W. P. King, T. W. Kenny, K. E. Goodson, G. L. W. Cross, M. Despont, U. Dürig, H. Rothuizen, G. Binnig, and P. Vettiger, "Atomic Force Microscope Cantilevers for Combined Thermomechanical Data Writing and Reading," *Applied Physics Letters*, 78, 1300-1302, 2001.

[11] C. F. Quate, "Scanning Probes as a lithography tool for nanostructures," *Surface Science*, vol. 386, 259-264 (1997).

[12] X. Wang, D. A. Bullen, J. Zou, C. Liu, C. A. Mirkin, "Thermally actuated probe array for parallel dip-pen nanolithography," *Journal of Vacuum Science & Technology B: Microelectronics and Nanometer Structures*, 22(6), pp. 2563-2567, 2004.

[13] D. Lee, T. Ono, M. Esashi, "High-Speed Imaging by Electro-Magnetically Actuated Probe with Dual Spring," *Journal of microelectromechanical systems*, 9(4), pp. 419-4124, 2000

[14] J. H. Park, T. Y. Kwon, D. S. Yoon, H. Kim, T. S. Ki, "Fabrication of Microcantilever Sensors Actuated by Piezoelectric $Pb(Zr_{0.52}Ti_{0.48})O_3$ Thick Films and Determination of Their Electromechanical Characteristics," *Advanced Functional Materials*, 15(12), 2021-2028, 2005

[15] S. S. Lee, R. M. White, "Self-excited piezoelectric cantilever oscillators," *Sensors and Actuators A: Physical*, 52(1-3), 41-45, 1996

[16] W. M. Huang, Q. Y. Liu, L. M. He, J. H. Yeo, "Micro NiTi—Si cantilever with three stable positions," *Sensors and Actuators A: Physical*, 114(1), 118-122, 2004.

[17] D. A. Bullen, C. Liu, "Electrostatically actuated dip pen nanolithography probe arrays," *Sensors and Actuators A: Physical*, 125(2), pp. 504-511, 2006

[18] V. P. Jaecklin, C. Linder, N. F. de Rooij, J. M. Moret, R. Bischof, F. Rudolf, "Novel polysilicon comb actuators for xy-stages," *Proc IEEE Micro Electro Mech Syst Workshop*, 1992, p 147-149.

[19] Chris S. B. Lee, S. Han, N. C. MacDonald, "Single crystal silicon (SCS) XY-stage fabricated by DRIE and IR alignment," *Proceedings of the IEEE Micro Electro Mechanical Systems (MEMS)*, 2000, p 28-33

[20] C. H. Kim, Y. K. Kim, "Micro XY-stage using silicon on a glass substrate," *Journal of Micromechanics and Microengineering*, v 12, n 2, February 2002, p 103-107

[21] P. F. Indermuhle, V. P. Jaecklin, J. Brugger, C. Linder, N. F. de Rooij, M. Binggeli, "AFM imaging with an xy-micropositioner with integrated tip," *Sensors and Actuators, A: Physical*, v 47, n 1-3 pt 4, March-April 1995, p 562-565

[22] C. H. Kim, H. M. Jeong, J. U. Jeon, Y. K. Kim, "Silicon micro XY-stage with a large area shuttle and no-etching holes for SPM-based data storage," *IEEE Journal of Microelectromechanical Systems*, v 12, n 4, August 2003, p 470-478

[23] T. Harness, R. A. Syms, "Characteristic modes of electrostatic comb-drive X-Y microactuators," *Journal of Micromechanics and Microengineering*, v 10, n 1, March 2000, p 7-14

[24] K. Takahashi, H. N. Kwon, K. Saruta, M. Mita, H. Fujita, H. Toshiyoshi, "A two-dimensional f-θ micro optical lens scanner with electrostatic comb-drive XY-stage," *IEICE Electronics Express*, Vol. 2 (2005), No. 21 pp. 542-547

[25] K. Takahashi, M. Mita, H. Fujita, H. Toshiyoshi, "A high fill-factor comb-driven XY-stage with topological layer switch architecture," *IEICE Electronics Express*, Vol. 3 (2006), No. 9 pp. 197-202

[26] J. Dong, D. Mukhopadhyay, P. M. Ferreira, "Design, Fabrication and Testing of Silicon-on-Insulator (SOI) MEMS Parallel Kinematics XY Stage", *Journal of Micromechanics and Microengineering*, 17(6), 1154-1161 (2007).

[27] D. Mukhopadhyay, J. Dong, E. Pengwang and P. M. Ferreira, "A SOI MEMS-based 3-DOF Planar Parallel-Kinematics Nanopositioning Stage", *Sensors and Actuators A: Physical*, 147(1), 340-351, (2008).

[28] D. Mukhopadhyay, J. Dong, P. M. Ferreira, "Parallel Kinematic Mechanism based monolithic XY micro-positioning stage", *SPIE Photonics West, MOEMS-MEMS Conference*, San Jose, Calif., January 2008.

[29] Q. Yao, J. Dong, P. M. Ferreira, "Design, Analysis, Fabrication and Testing of a Parallel-Kinematic Micropositioning XY Stage," *International Journal of Machine Tools and Manufacture*, Vol 47 (6). 2007 pp 946-961

[30] Q. Yao, J. Dong, P. M. Ferreira, "A Novel Parallel-Kinematics Mechanisms for Integrated, Multi-axis Nanopositioning. Part 1: Kinematics and Design for Fabrications", *Precision Engineering*, 32(1), 7-19 (2008).

[31] J. Dong, Q. Yao, P. M. Ferreira, "A Novel Parallel-Kinematics Mechanism for Integrated, Multi-axis Nanopositioning. Part 2: Dynamics, Control and Performance Analysis", *Precision Engineering*, 32(1), 20-33 (2008).

[32] J. Dong, P. M. Ferreira, "Simultaneous Actuation and Displacement Sensing for Electrostatic Drives", *Journal of Micromechanics and Microengineering*, 18(3), 035011 (10 pp) (2008).

[33] M. Bao, *Analysis and Design Principles of MEMS Devices*, Elsevier Science (Jun. 10, 2005)

[34] J. M. Paros, L. Weisbord, "How to design flexure hinges," *Machine Design*, 37 (1965), 151-156.

[35] R. Legtenberg, A. W. Groeneveld, M. Elwenspoek, "Comb-drive actuators for large displacements," *Journal of Micromechanics and Microengineering*, v 6, n 3, September 1996, p 320-329.

Statements Regarding Incorporation by Reference and Variations

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups, are disclosed separately. When a Markush group or other grouping is used herein, all individual members of the group and all combinations and subcombinations possible of the group are intended to be individually included in the disclosure.

Every formulation or combination of components described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A MEMS stage comprising:
   an end effector;
   a first linear comb drive actuator mechanically connected to said end effector for translating said end effector in a first direction corresponding to a y-axis direction;
   a second linear comb drive actuator mechanically connected to said end effector for translating said end effector in a second direction corresponding to an x-axis direction;
   a first plurality of folded springs mechanically connected to said first linear comb drive actuator;
   a second plurality of folded springs mechanically connected to said second linear comb drive actuator; and
   a first and a second four bar linkage mechanism, each including a plurality of flexure hinges, wherein said first four bar linkage mechanism connects said first linear comb drive actuator to said end effector and said second four bar linkage mechanism connects said second linear comb drive actuator to said end effector; said four bar linkage mechanism comprising:
      a pair of central platforms, each of said central platforms having a first central platform end connected to a first bar linker and a second central platform end connected to a second bar linker, wherein said first bar linkers connect said central platform to said end effector and said second bar linkers connect said central platform to said first or second linear comb drive actuator, wherein the bar linker connected to the central platform is formed by the flexure hinge;
   wherein said MEMS stage delivers translational motion along the X and Y axes, and restricts all rotational degree of freedom of said end effector during translation in said first or second direction and decouples motion in said first direction from motion in said second direction.

2. The MEMS stage of claim 1, further comprising:
   a cantilever connected to said end effector; and
   a tilt plate actuator operably connected to said cantilever to provide translational motion of said cantilever along a Z-axis direction.

3. The MEMS stage of claim 2, further comprising:
   a torsion bar that mechanically connects said cantilever to said end effector.

4. The MEMS stage of claim 1, further comprising a plurality of linear comb drive actuators for translating said MEMS stage in a third direction, wherein said plurality of linear comb drive actuators are mechanically connected to said MEMS stage.

5. The MEMS stage of claim 1, wherein said MEMS stage comprises an integrated silicon on insulator wafer.

6. A micro electro mechanical positioning stage comprising:
   a movable end effector;
   a first comb drive actuator and a second comb drive actuator that provide multiaxial positioning of said movable end effector;
   a first flexure hinge that mechanically connects said first comb drive actuator to said end effector and a second flexure hinge that mechanically connects said second comb drive actuator to said end effector, wherein each flexure hinge is part of a four bar linkage mechanism and said four bar linkage mechanisms decouple movement of said movable end effector in an x and a y direction and restricts all rotational degree of freedom of said movable end effector during movement of said movable end effector; and
   a pair of first and a second folded spring, each folded spring comprising two clamped beams positioned in series relative to each other, wherein a first beam is operably connected to an anchor at one end and a truss at a second end, and the second beam is operably connected to said truss at one end and said flexure hinge at a second end, and one pair of folded spring is connected to opposing sides of said first comb drive actuator and said other pair of folded spring is connected to opposing sides of said second comb drive actuator;
   wherein said four bar linkage mechanism comprises a pair of central platforms, each central platform having:
      a first central platform end connected to a first bar linker, wherein said first bar linker is connected to said movable end effector is formed by a first flexure hinge, and
      a second central platform end that is opposite said first central platform end, said second central platform end connected to a second bar linker, wherein said second bar linker is connected to said first or second comb drive actuator is formed by a second flexure hinge.

7. The stage of claim 6, further comprising a probe arm connected to said movable end effector.

8. The stage of claim 7, wherein said probe arm is a cantilever, said stage further comprising a tilt-plate actuator to provide vertical motion of said cantilever.

9. The stage of claim 6, further comprising a silicon-on-insulator substrate, wherein said stage is integrated with said silicon-on-insulator.

10. The stage of claim 6, wherein said comb drive actuator is a linear comb drive actuator or a rotary comb drive actuator.

11. The stage of claim 6 further comprising one or more additional stages arranged in an opposed configuration relative to another stage, wherein said opposed probe arms form opposed tips configured to secure a material between said opposed tips.

12. The stage of claim 11, wherein at least one stage generates a force on a material secured by said opposed tips and at least one stage senses a physical parameter, said physical parameter selected from the group consisting of: force; velocity; acceleration; and displacement.

13. A device comprising the stage of claim 6 and a positioning system of the device operably connected to the stage, said device selected from the group consisting of:

a scanning probe microscope;
a direct-write manufacturing system;
a probe system; and
a material tester.

14. The MEMS stage of claim 1, wherein the first and second actuators provide pure translation of said end effector along a circular path.

15. The MEMS stage of claim 1, wherein said plurality of folded springs are connected to opposite sides of said linear comb drive actuator.

16. The MEMS stage of claim 15, wherein said folded spring comprises two clamped beams positioned in series relative to each other, wherein a first beam is operably connected to an anchor at one end and a truss at a second end, and the second beam is operably connected to said truss at one end and said linear comb drive actuator at a second end.

* * * * *